(12) United States Patent
Steenwyk et al.

(10) Patent No.: US 8,469,177 B2
(45) Date of Patent: Jun. 25, 2013

(54) DIVERTER FOR SORTER AND METHOD OF DIVERTING

(75) Inventors: Matthew A. Steenwyk, Grandville, MI (US); Mohan A. Ramankutty, Grand Rapids, MI (US); Martin J. Stanish, Grand Rapids, MI (US); Thomas H. Triesenberg, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 303 days.

(21) Appl. No.: 12/861,553

(22) Filed: Aug. 23, 2010

(65) Prior Publication Data

US 2011/0042181 A1 Feb. 24, 2011

Related U.S. Application Data

(60) Provisional application No. 61/274,986, filed on Aug. 24, 2009.

(51) Int. Cl.
*B65G 47/46* (2006.01)

(52) U.S. Cl.
USPC .................................................. 198/370.02

(58) Field of Classification Search
USPC ....................................... 198/370.02, 370.03
See application file for complete search history.

(56) References Cited

U.S. PATENT DOCUMENTS 2,722,396 A * 11/1955 Carr ................................. 251/81
3,710,923 A * 1/1973 Fromme et al. .......... 198/370.02

(Continued)

FOREIGN PATENT DOCUMENTS

JP 61-24500 7/1986
JP 8-319022 12/1996
WO WO2007127697 A2 * 8/2007

OTHER PUBLICATIONS

International Search Report and Written Opinion of the International Searching Authority from corresponding Patent Cooperation Treaty (PCT) Application No. PCT/US10/46332, mailed Oct. 18, 2010.

(Continued)

*Primary Examiner* — Gene Crawford
*Assistant Examiner* — Keith R Campbell
(74) *Attorney, Agent, or Firm* — Gardner, Linn, Burkhart & Flory, LLP

(57) ABSTRACT

A positive displacement sorter and method of diverting articles includes providing a plurality of interconnected parallel slats defining an endless web that travels in a longitudinal direction, an upper surface of which defines an article-conveying surface and a plurality of pusher shoes. Each of the shoes travels along at least one of the slats in order to laterally divert articles on the conveying surface. Each of the shoes has a diverting member extending below the conveying surface. A plurality of diverting rails below the conveying surface are each capable of engaging the diverting member to cause the associated shoe to travel laterally to divert an article. A plurality of diverters are provided for selectively diverting at least one of the diverting members from a non-diverting path extending longitudinally along the sorter to one of said diverting rails in a diverting state. At least one of the diverters has a gate having a diverting surface. The gate is selectively moveable between the diverting state and a non-diverting state. An actuator moves the gate between the non-diverting state and the diverting state. The actuator may include a rotary actuator having a generally horizontal axis of rotation. An electronic divert control may be provided to apply an activation control signal to the actuator to move the gate between one of the states and the other of the states. The control monitors movement of the gate and adjusts the activation control signal as a function of the movement of the gate.

41 Claims, 60 Drawing Sheets

U.S. PATENT DOCUMENTS

| | | | |
|---|---|---|---|
| 4,711,341 A | | 12/1987 | Yu et al. |
| 4,817,779 A | | 4/1989 | Beck et al. |
| 4,895,242 A | * | 1/1990 | Michel ................. 198/370.04 |
| 5,038,912 A | | 8/1991 | Cotter |
| 5,165,515 A | * | 11/1992 | Nitschke et al. ........ 198/349.95 |
| 5,217,105 A | | 6/1993 | Sapp et al. |
| 5,275,273 A | * | 1/1994 | Veit et al. ................... 198/890 |
| 5,333,715 A | | 8/1994 | Sapp |
| 5,409,095 A | | 4/1995 | Hoshi et al. |
| 5,441,142 A | * | 8/1995 | Schneider ................... 198/442 |
| 6,041,909 A | * | 3/2000 | Shearer, Jr. ............. 198/370.02 |
| 6,139,240 A | | 10/2000 | Ando |
| 6,283,271 B1 | * | 9/2001 | van den Goor ......... 198/370.02 |
| 7,086,519 B2 | * | 8/2006 | Veit et al. ............... 198/370.02 |
| 7,261,198 B2 | * | 8/2007 | Tatar et al. ............. 198/370.02 |
| 7,357,242 B2 | | 4/2008 | Enomoto |
| 7,549,527 B2 | * | 6/2009 | Neiser et al. ............ 198/370.02 |
| 7,798,306 B2 | * | 9/2010 | Brayman et al. ........ 198/370.02 |
| 7,886,891 B2 | * | 2/2011 | Ranger et al. .......... 198/370.02 |
| 2003/0132143 A1 | | 7/2003 | Cochran et al. |
| 2006/0070352 A1 | | 4/2006 | Momich |
| 2007/0209906 A1 | * | 9/2007 | Ranger et al. .......... 198/370.07 |
| 2008/0035450 A1 | * | 2/2008 | Haan et al. ............. 198/370.02 |

OTHER PUBLICATIONS

International Preliminary Report on Patentability from corresponding Patent Cooperation Treaty (PCT) Patent Application No. PCT/US2010/046332, mailed Mar. 8, 2012.

* cited by examiner

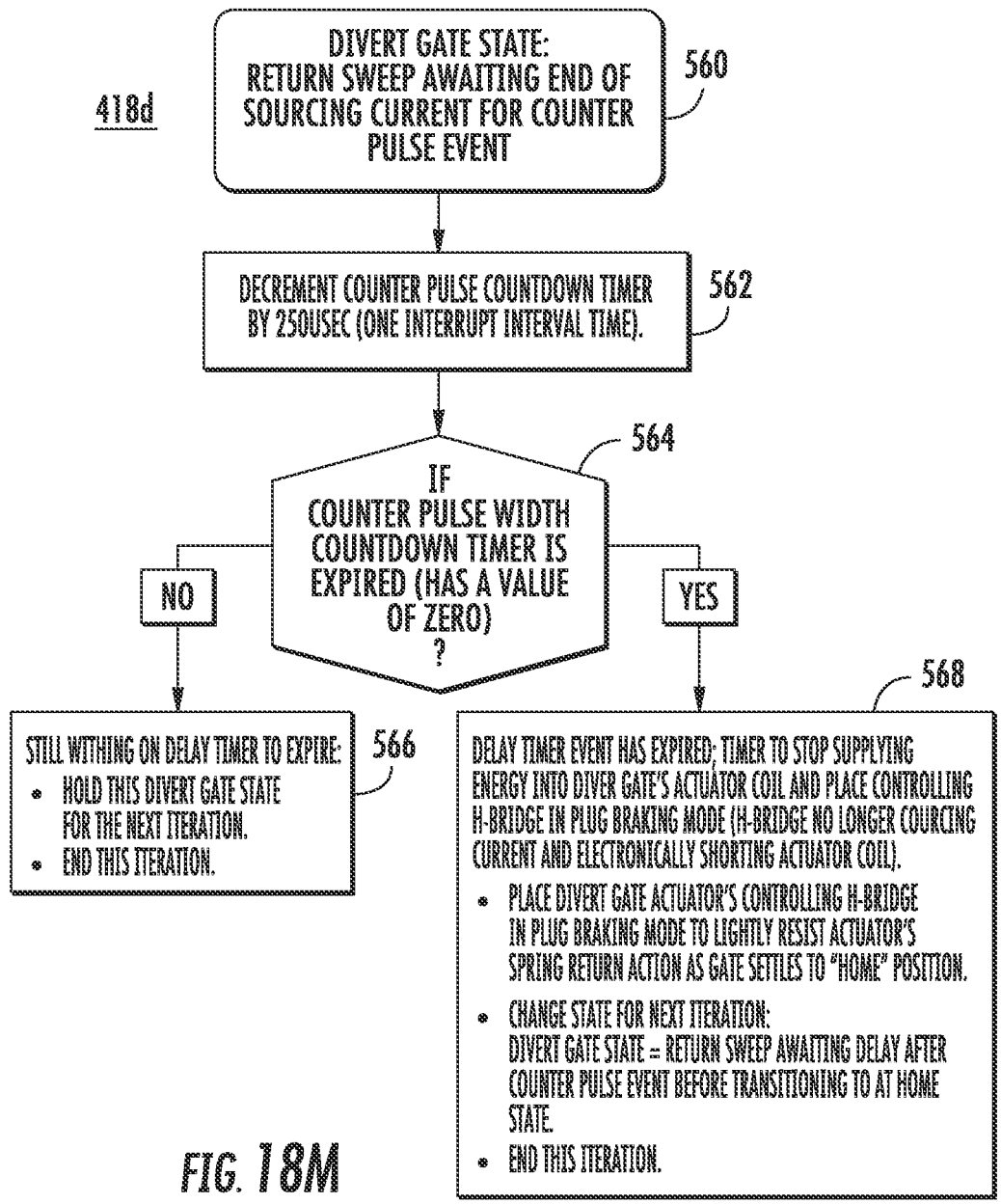

DIVERTER FOR SORTER AND METHOD OF DIVERTING

CROSS-REFERENCE TO RELATED APPLICATION

This application claims priority from U.S. provisional patent application Ser. No. 61/274,986, filed on Aug. 24, 2009, the disclosure of which is hereby incorporated herein by reference in its entirety.

BACKGROUND OF THE INVENTION

The present invention is directed to a conveyor system and, in particular, to a diverter for use with a positive displacement sorter made up of a travelling web, the upper surface of which defines a longitudinally travelling conveying surface. The web is defined by a series of interconnected laterally elongated slats and pusher shoes that travel along the slats. Diverting members extending below the conveying surface on each of the shoes are engaged by a particular diverting rail in order to laterally divert an article travelling on the conveying surface. The diverter selectively transfers one or more of the diverting members to an associated diverting, rail to initiate the divert.

SUMMARY OF THE INVENTION

A positive displacement sorter and method of diverting articles with a positive displacement sorter, according to an aspect of the invention, includes providing a plurality of interconnected parallel slats defining an endless web that travels in a longitudinal direction, an upper surface of which defines an article-conveying surface. A plurality of pusher shoes each travels along at least one of the slats in order to laterally divert articles on the conveying surface. Each of the shoes has a diverting member extending below the conveying surface. A plurality of diverting rails below the conveying surface are each capable of engaging the diverting member to cause the associated shoe to travel laterally to divert an article. A plurality of diverters each selectively diverts at least one of the diverting members from a non-diverting path extending longitudinally along the sorter to one of the diverting rails in a diverting state.

A diverter includes a gate having a diverting surface. The gate is selectively moveable between the diverting state and a non-diverting state. An actuator moves the gate between the non-diverting state and the diverting state. The actuator is a rotary actuator having a generally horizontal axis of rotation. The rotary actuator may be a rotary solenoid or a brushless torque actuator. The gate may rotate between the diverting and non-diverting states about another horizontal axis that is generally concentric with the generally horizontal axis of rotation. A slip joint may be provided between the rotary actuator and the gate. The slip joint resists diverting motion being transferred from the gate to the rotary actuator.

A sensor may be provided that monitors operation of the diverter. The sensor senses the diverting state of the gate and/or the non-diverting state of the gate. An electronic divert control may be provided that applies an activation control signal to the actuator to operate the gate between one of the states and the other of the states. The control monitors the sensor and adjusts the activation control signal as a function of the movement of the gate. The control may adjust the activation control signal to provide critical damping of movement of the gate between states.

The gate may include a mechanical bias tending to return the gate to the one of the states. The control may provide a return control signal when the gate is moving to the one of the states. The return control signal at least partially counteracts the bias. The control may adjust the return control signal as a function of movement of the gate. The control may adjust the return control signal in order to provide critical damping of movement of the gate between the states.

The gate may include a flexible member defining the diverting surface. The flexible member absorbs impact from contact between the diverting member and the diverting surface. The diverting member may include a rotary bearing and a pin extending below said bearing with the gate positioning the diverting surface to engage the bearing in the diverting state. The diverting surface may be in the form of a curved surface. Alternatively, the gate may position the diverting surface to engage the pin when in the diverting state.

The generally horizontal axis of the actuator may be oriented at least partially in the longitudinal direction. The generally horizontal axis of the actuator may be oriented at least partially in the lateral direction, or some intermediate orientation between longitudinal and lateral.

A positive displacement sorter and method of diverting articles with a positive displacement sorter, according to another aspect of the invention, includes providing a plurality of interconnected parallel slats defining an endless web that travels in a longitudinal direction, an upper surface of which defines an article-conveying surface. A plurality of pusher shoes each travels along at least one of the slats in order to laterally divert articles on the conveying surface. Each of the shoes has a diverting member extending below the conveying surface. A plurality of diverting rails below the conveying surface are each capable of engaging the diverting member to cause the associated shoe to travel laterally to divert an article. A plurality of diverters each selectively diverts at least one of the diverting members from a non-diverting path extending longitudinally along the sorter to one of the diverting rails in a diverting state.

A diverter includes a gate having a diverting surface. The gate is selectively moveable between the diverting state and a non-diverting state. An actuator moves the gate between the non-diverting state and the diverting state. An electronic divert control applies an activation control signal to the actuator to move the gate between one of the states and the other of the states. The control monitors movement of the gate and adjusts the activation control signal as a function of the movement of the gate.

The control may adjust the activation control signal to provide critical damping of movement of the gate between the one of the states and the other of the states. The control may adjust the activation control signal in order to apply a minimal duration actuation current that is capable of causing the gate to change states. The activation control signal may include an actuation signal applied to the actuator and the control may discontinue the actuation signal before the gate reaches the other state and commences a gate hold signal approximately when the gate reaches the other state. The control may adjust either the actuation signal or the gate hold signal as function of a comparison of the time it takes the gate to change from the one of the states to the other of the states.

The control may compare the recent time that it takes the gate to move between the one of the states and the other of the states to a historic time that it takes the gate to move between the one of the states and the other of the states and indicate an error condition if the recent time is substantially different than the historic time.

The gate may include a mechanical bias tending to return the gate to the one of the states. The control may provide a return control signal when said gate is moving to the one of the states. The return control signal counteracts the bias. The control may adjust the return control signal as a function of movement of the gate. The control may adjust the de-actuation signal in order to provide critical damping of movement of the gate between the other of the states and the one of the states. The control may apply a minimal duration of a de-actuation current that is capable of causing the gate to substantially avoid mechanical shock when returning to the one of the states. The control may adjust the return control signal as a function of a comparison of the time it takes the gate to change from the other of the states to the one of the states.

A positive displacement sorter and method of diverting articles with a positive displacement sorter, according to yet another aspect of the invention, includes providing a plurality of interconnected parallel slats defining an endless web that travels in a longitudinal direction, an upper surface of which defines an article-conveying surface. A plurality of pusher shoes each travels along at least one of the slats in order to laterally divert articles on the conveying surface. Each of the shoes has a diverting member extending below the conveying surface. A plurality of diverting rails below the conveying surface are each capable of engaging the diverting member to cause the associated shoe to travel laterally to divert an article. A plurality of diverters each selectively diverts at least one of the diverting members from a non-diverting path extending longitudinally along the sorter to one of the diverting rails in a diverting state.

A diverter includes a gate having a diverting surface. The gate is selectively moveable between the diverting state and a non-diverting state. An actuator moves the gate between the non-diverting state and the diverting state. An electronic divert control controls the actuator to move the gate between one of the states and the other of the states. The gate includes a mechanical bias tending to return the gate to the one of the states. The control provides a return control signal when said gate is moving to the one of the states. The de-actuation signal at least partially counteracts the bias.

The control may adjust the return control signal as a function of movement of the gate. The control may adjust the return control signal in order to provide critical damping of movement of the gate between the other of the states and the one of the states. The control may apply a minimal duration of a de-actuation current that is capable of causing the gate to substantially avoid mechanical shock when returning to the one of the states. The control may adjust the return control signal as a function of a comparison of the time it takes the gate to change from the other of the states to the one of the states.

A positive displacement sorter and method of diverting articles with a positive displacement sorter and diverter assembly, according to yet another aspect of the invention, includes providing a plurality of interconnected parallel slats defining an endless web that travels in a longitudinal direction, an upper surface of which defines an article-conveying surface. A plurality of pusher shoes each travels along at least one of the slats in order to laterally divert articles on the conveying surface. Each of the shoes has a diverting member extending below the conveying surface. A plurality of diverting rails below the conveying surface are each capable of engaging the diverting member to cause the associated shoe to travel laterally to divert an article. A plurality of diverter assemblies are provided that are capable of selectively diverting at least one of the diverting members from a non-diverting path extending longitudinally along the sorter to one of the diverting rails. At least one of the diverter assemblies includes first and second redundant diverters. Each of the redundant diverters is capable of selectively diverting at least one of the diverting members from the non-diverting path to one of the diverting rails.

The first redundant diverter may be a magnetic diverter that utilizes magnetic force to at least partially divert at least one of the diverting members from the non-diverting path to one of the diverting rails. The second redundant diverter may be a mechanical diverter that utilizes mechanical force to at least partially divert at least one of said diverting members from the non-diverting path to one of the diverting rails.

An actuator assembly, according to another aspect of the invention, includes an actuator having a shaft and a coil. The shaft is selectively moveable between a first state and a second state. The coil moves the shaft between the first state and the second state. An electronic control applies an activation control signal to the coil to move the shaft between one of the states and the other of the states. The control monitors movement of the shaft and adjusts the activation control signal as a function of movement of the shaft to provide critical damping to the movement of the shaft.

An actuator assembly, according to another aspect of the invention, includes an actuator having a shaft and a coil. The shaft is selectively moveable between a first state and a second state. The coil moves the shaft between the first state and second state. An electronic control controls the coil to move the shaft between one of the states and the other of the states. The shaft includes a mechanical bias tending to return the shaft to one of the states. The control provides a return control signal when the shaft is moving to the one of the states. A return control signal at least partially counteracts the bias.

These and other objects, advantages and features of this invention will become apparent upon review of the following specification in conjunction with the drawings.

DESCRIPTION OF THE PREFERRED EMBODIMENT

Figure 1:
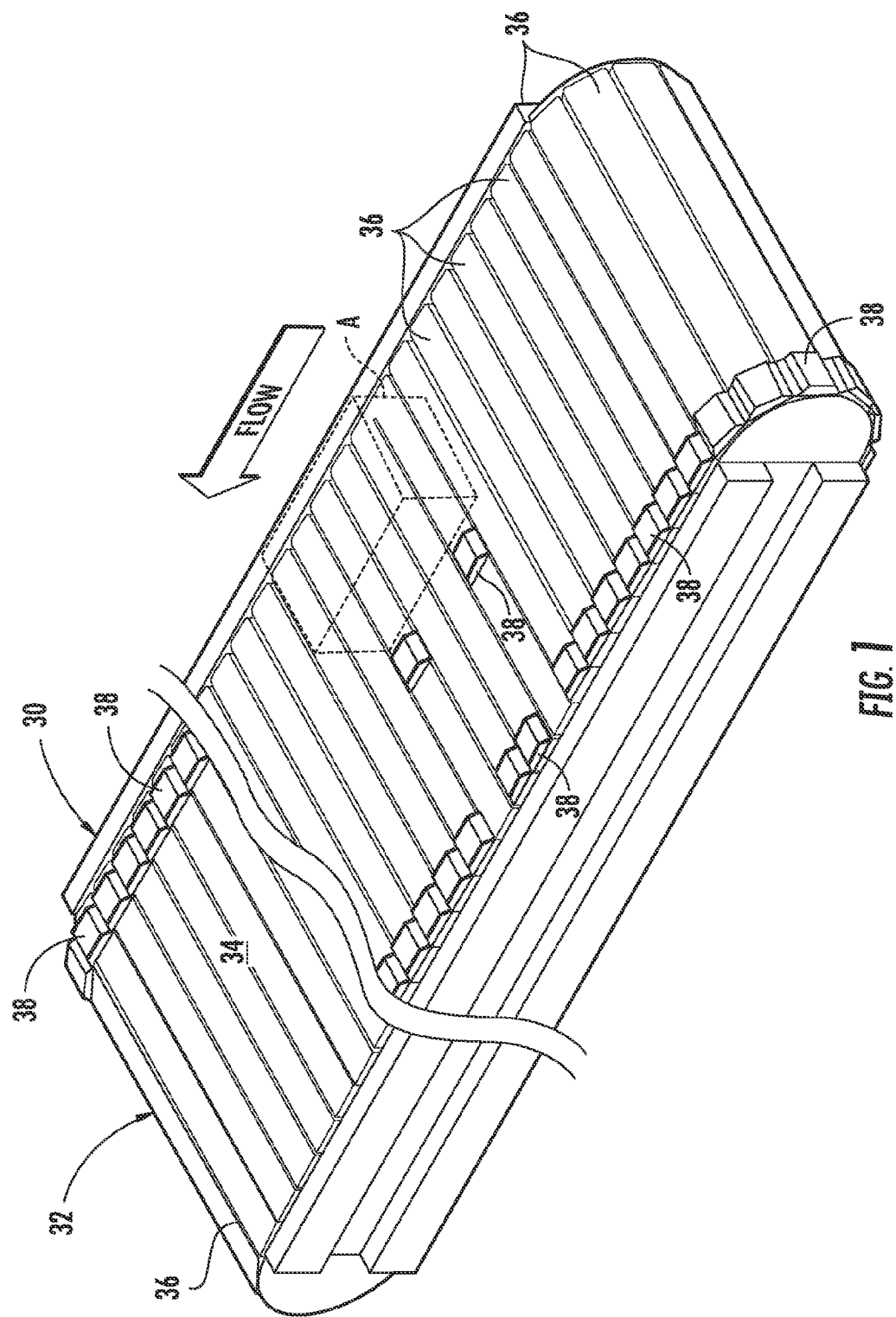
FIG. 1 is a perspective view of a positive displacement sorter useful with the present invention.

Referring now to the drawings and the illustrative embodiments depicted therein, a positive displacement sorter 30 includes an endless web 32 travelling in a longitudinal direction, the upper surface of which defines an article-conveying surface 34 (FIG. 1). Web 32 is defined by a series of laterally elongated parallel slats 36 interconnected at their ends. A plurality of pusher shoes 38 travel along one or more of the slats in order to laterally divert an article A on conveying surface 34, such as to a particular chute (not shown). Sorter 30 may be any type known in the art, such as of the type disclosed in commonly assigned U.S. Pat. Nos. 5,127,510; 6,814,216; 6,860,383; 6,866,136; 7,086,519; 7,117,988; 7,513,356; and 7,240,781, the disclosures of which are hereby incorporated herein by reference.

Figure 2:
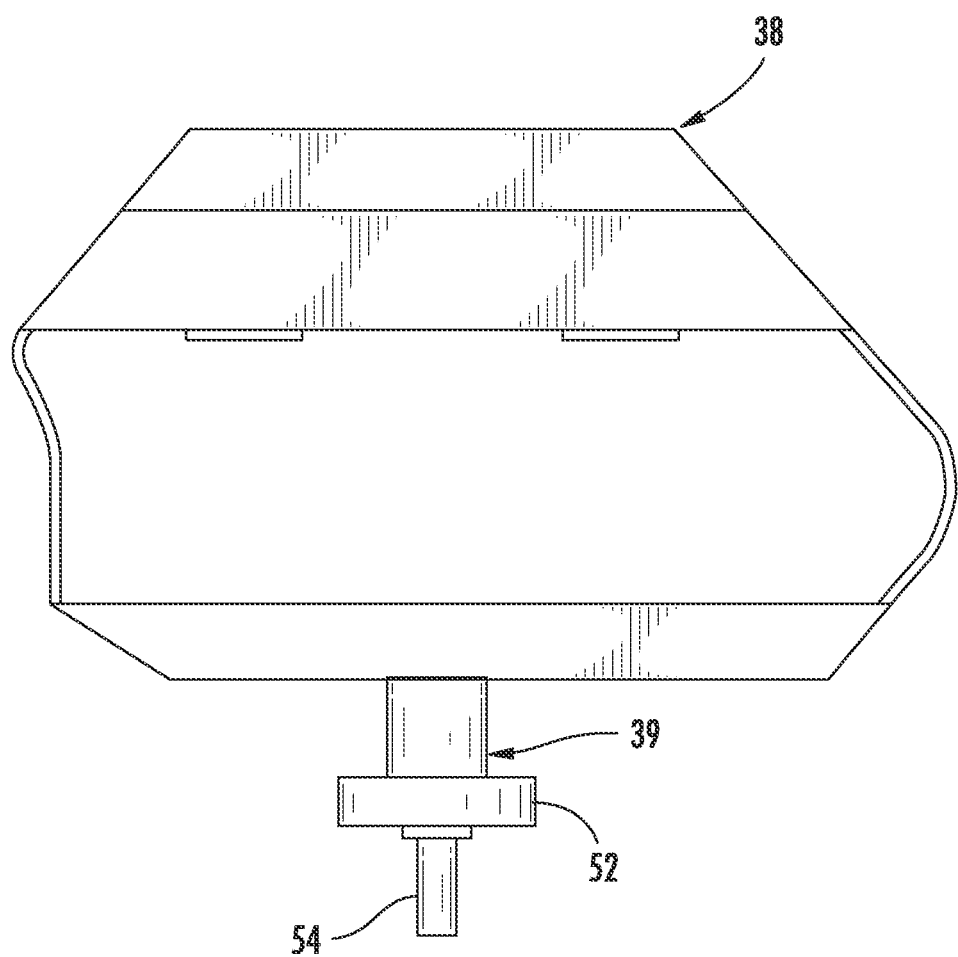
FIG. 2 is a side elevation of a pusher shoe used with the sorter in FIG. 1.

Each of shoes 38 includes a diverting member 39 extending below conveying surface 34 in order to laterally displace the pusher shoe, as will be described in more detail below (FIG. 2). Diverting member 39 may include a bearing 52 and a pin 54 extending coaxially below the bearing.

Figure 3:
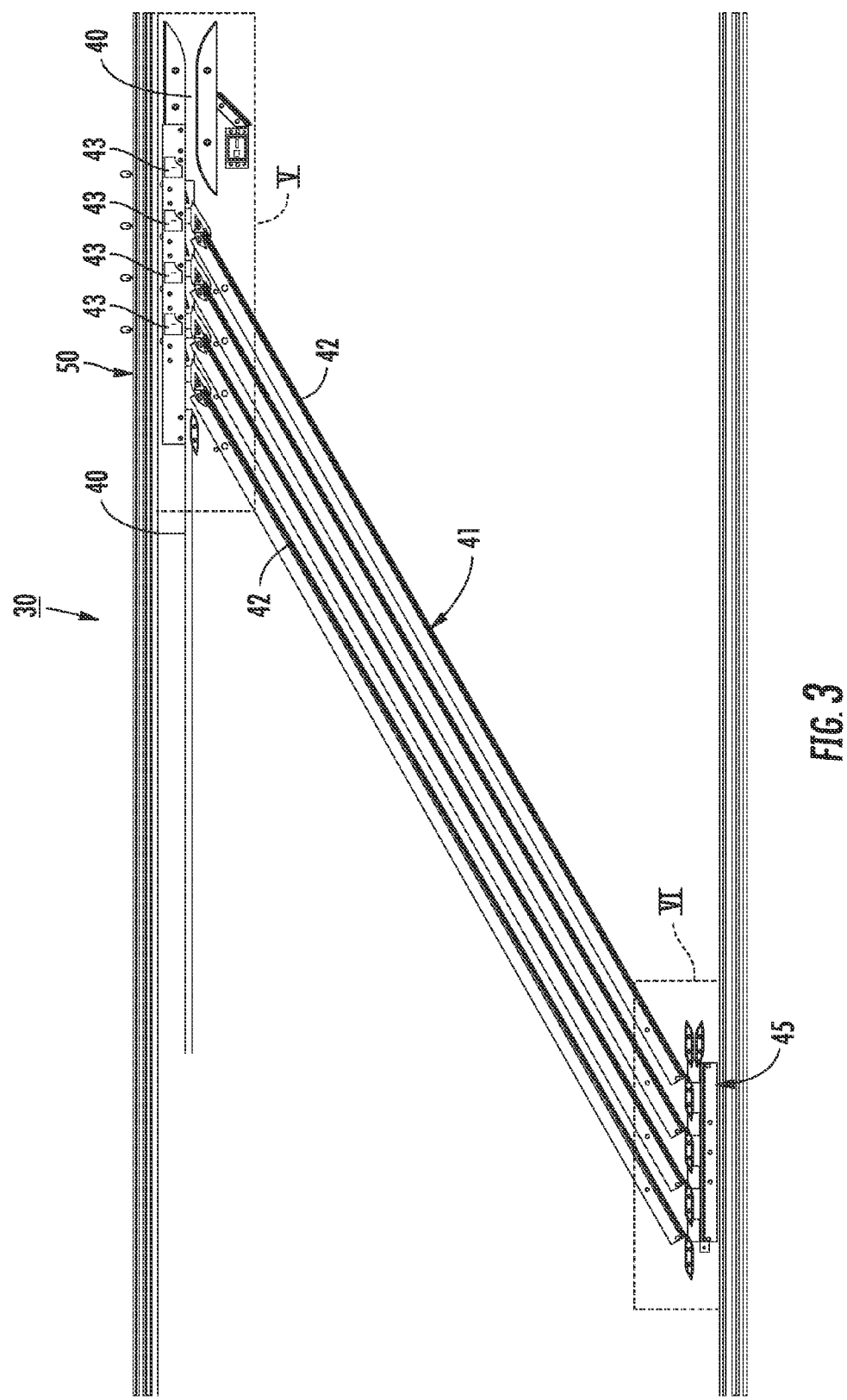
FIG. 3 is a top plan view of a diverting assembly for a takeaway location.
Figure 4:
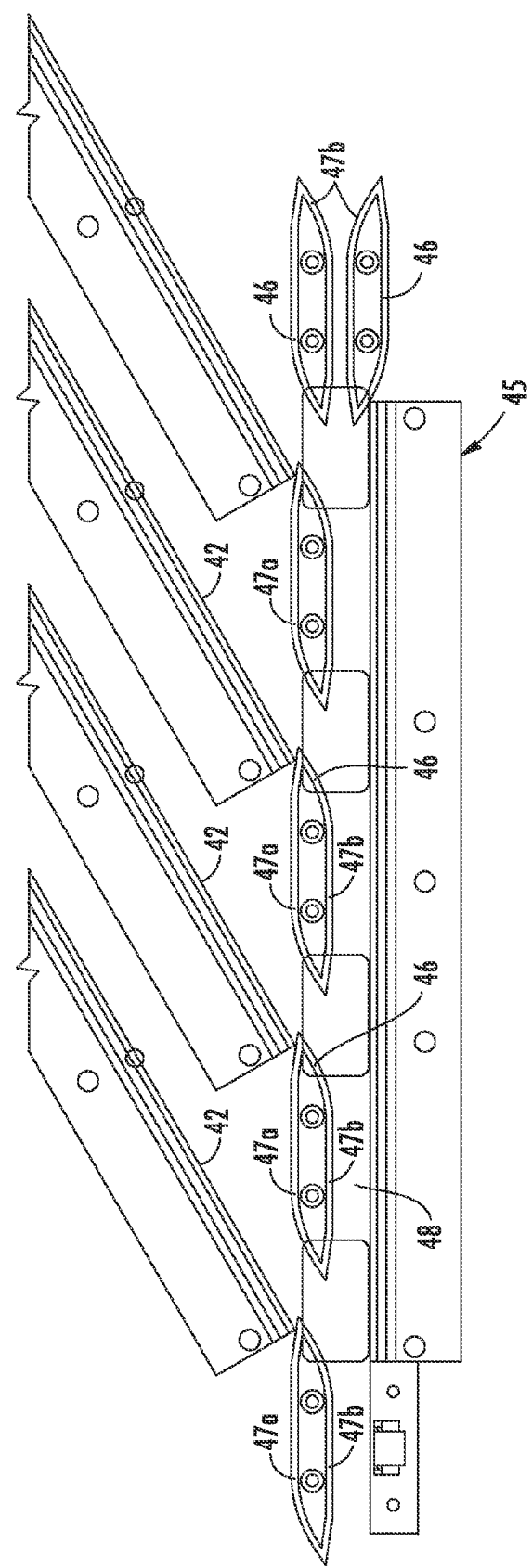
FIG. 4 is an enlarged view of the area indicated at IV in FIG. 3.
Figure 5:
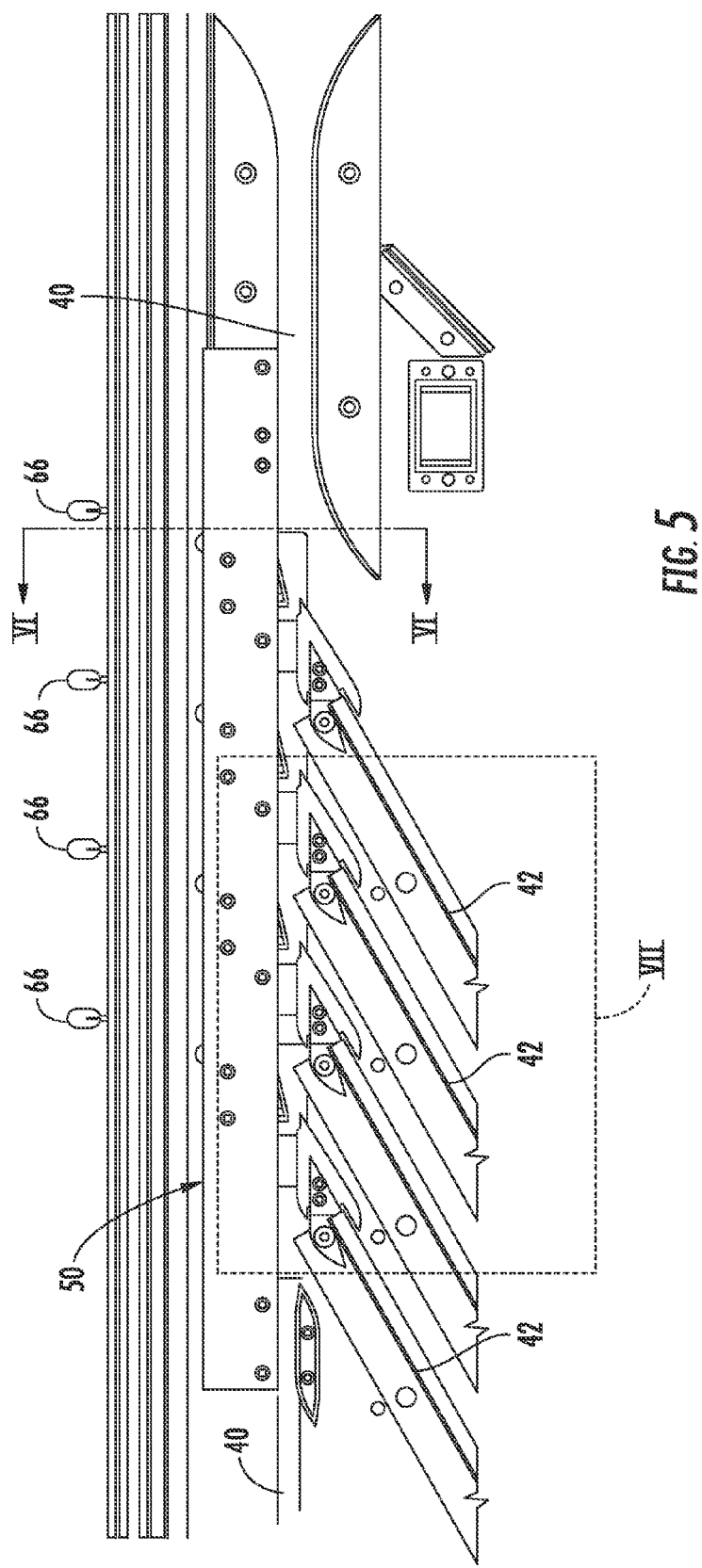
FIG. 5 is an enlarged view of the area indicated at V in FIG. 3.
Figure 6:
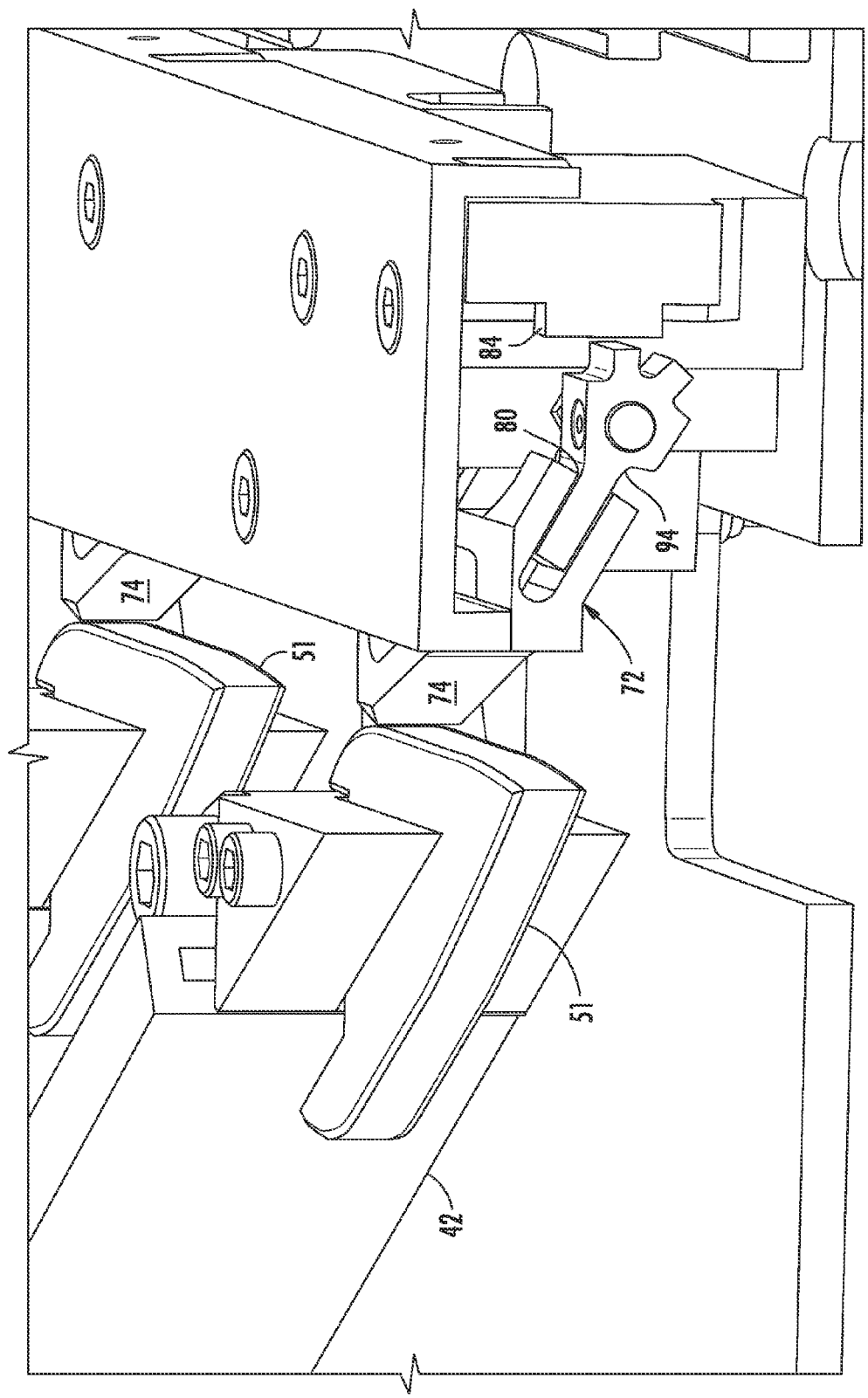
FIG. 6 is a sectional view taken along the lines VI-VI in FIG. 5 showing the diverter in a diverting state.
Figure 7:
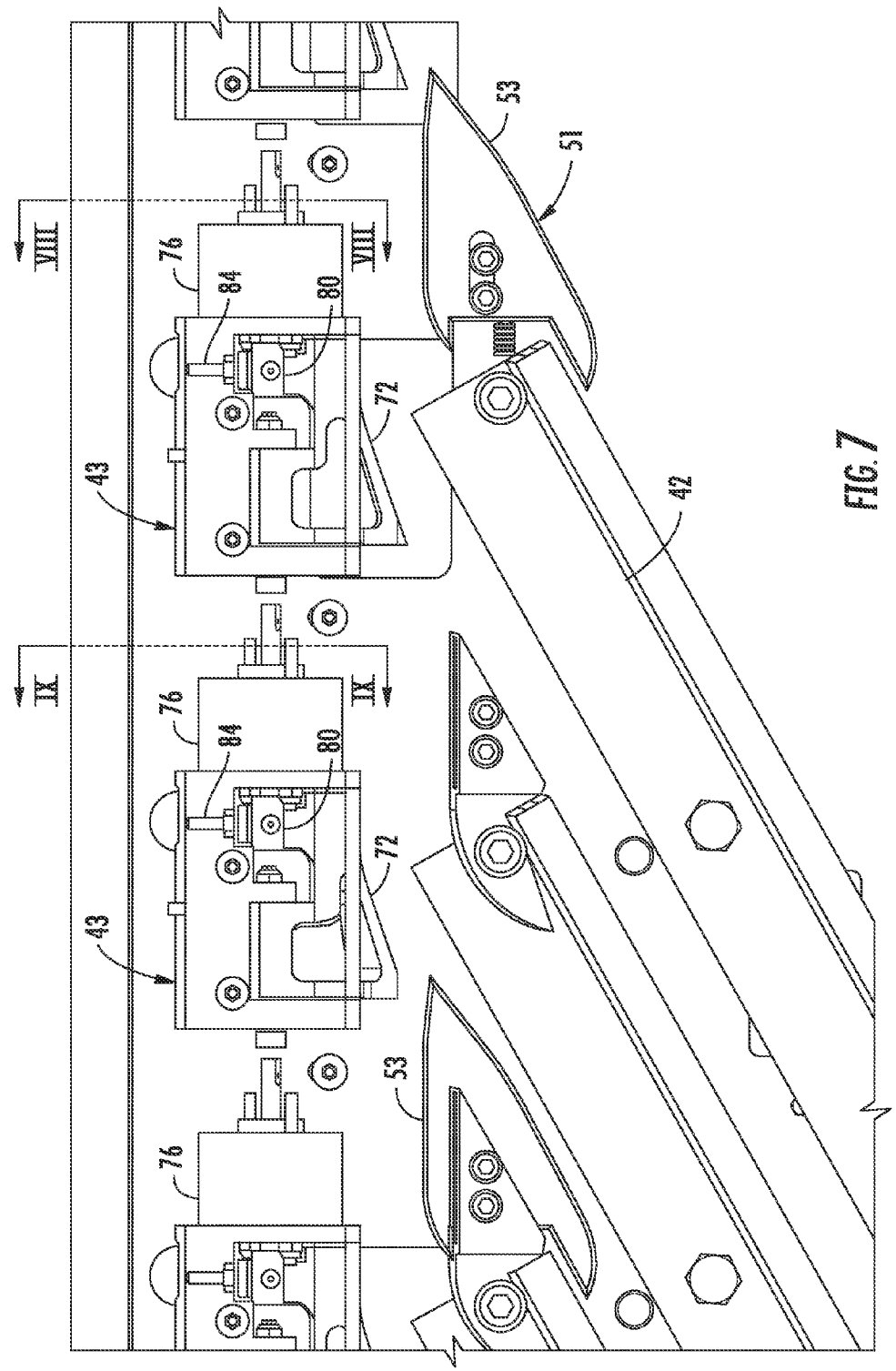
FIG. 7 in an enlarged view of the area indicated at VII in FIG. 5 with covers removed to reveal internal details thereof.
Figure 8:
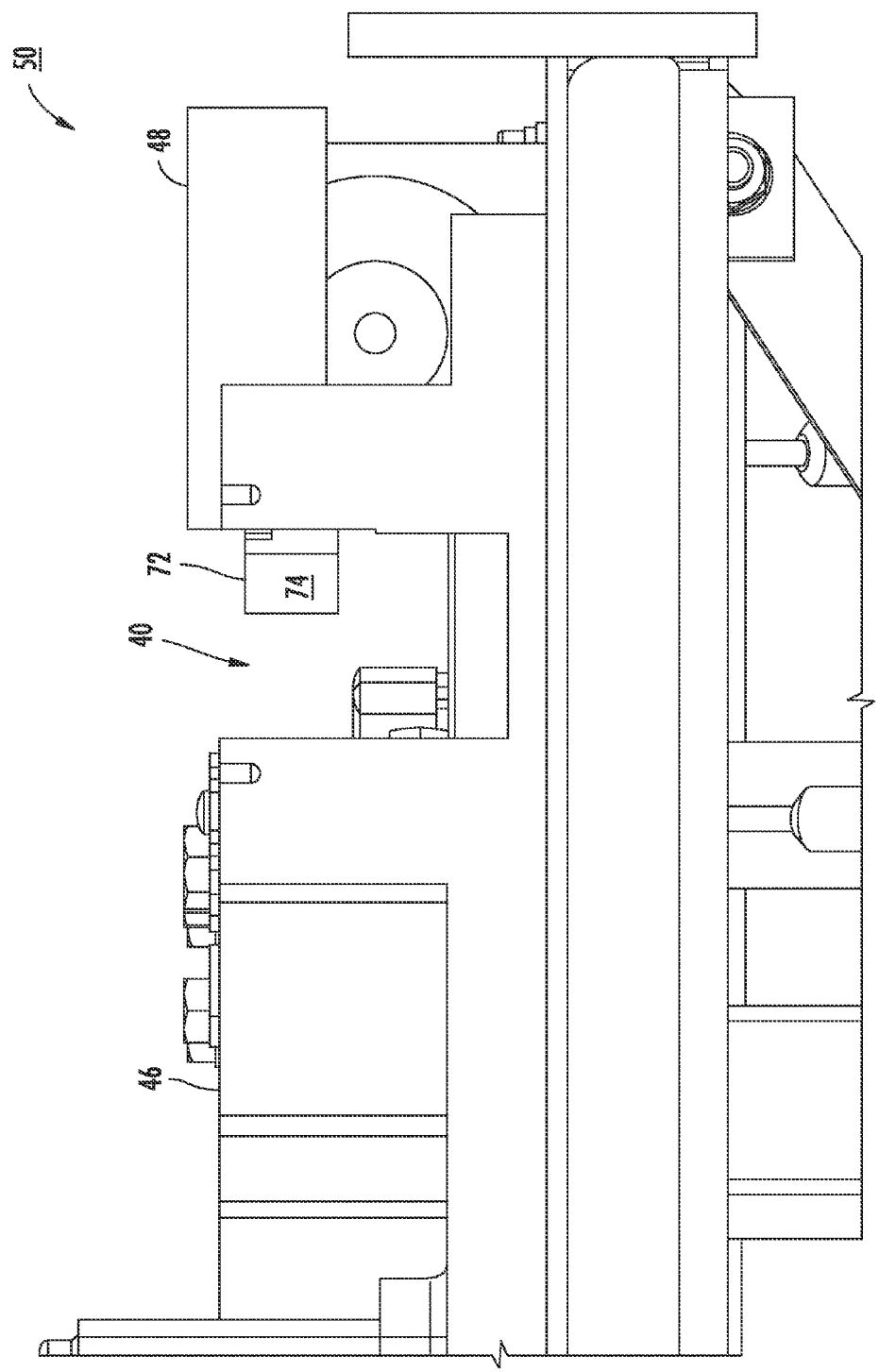
FIG. 8 is a sectional view taken along the lines VIII-VIII in FIG. 7 showing the diverter in a diverting state.
Figure 9:
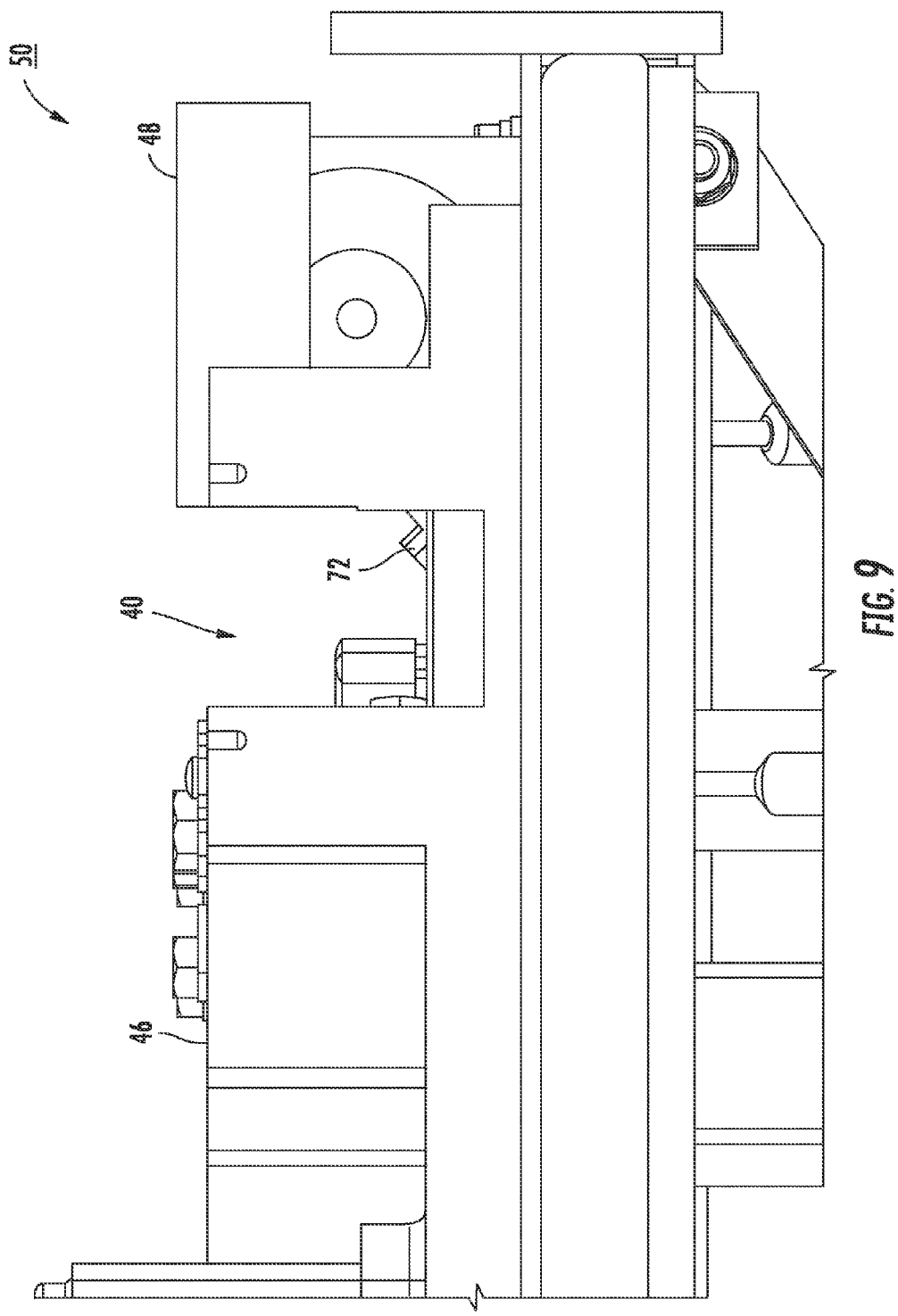
FIG. 9 is a sectional view taken along the lines IX-IX in FIG. 7 showing the diverter in a non-diverting state.
Figure 10:
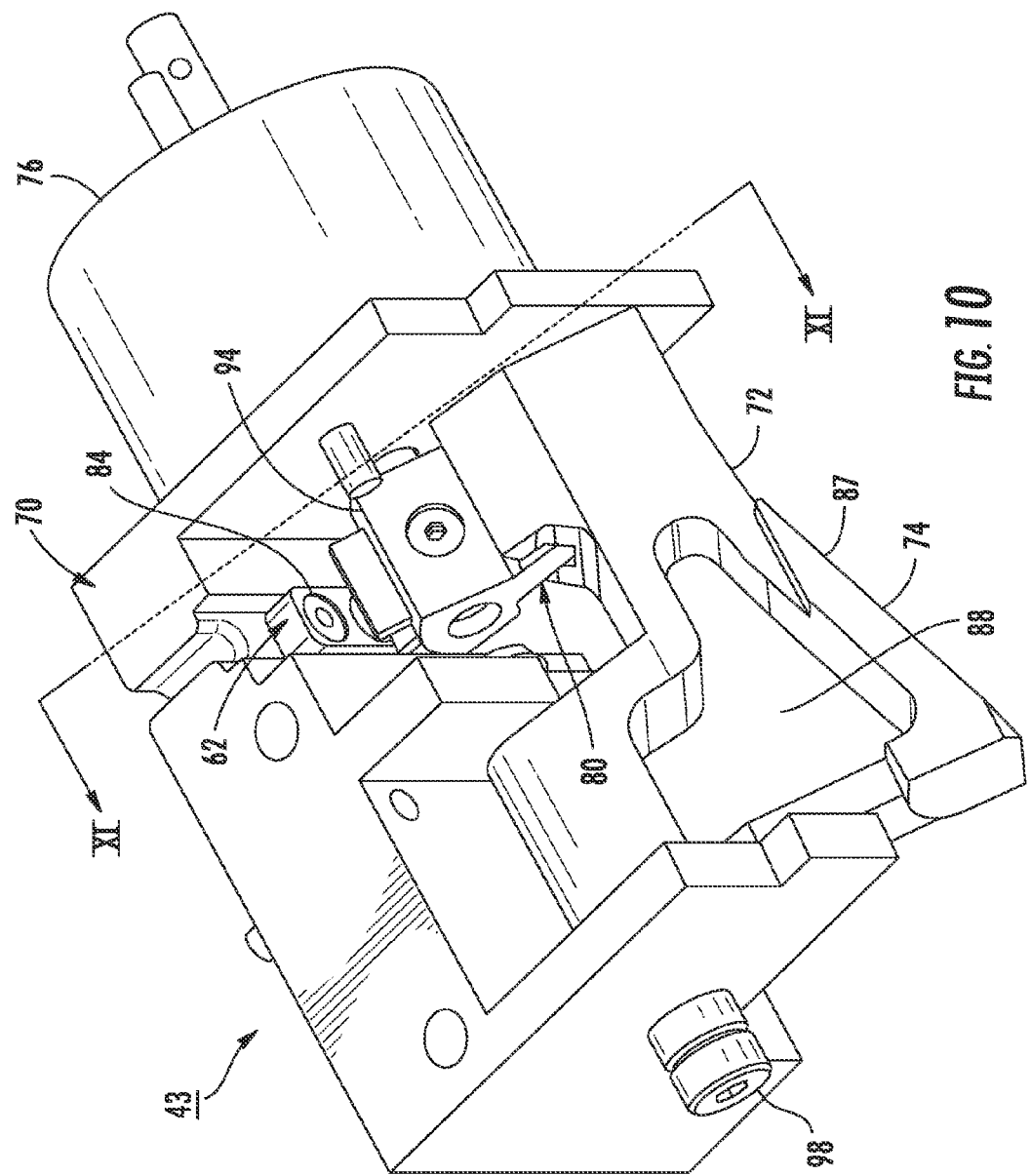
FIG. 10 is a perspective view of a diverter.
Figure 11:
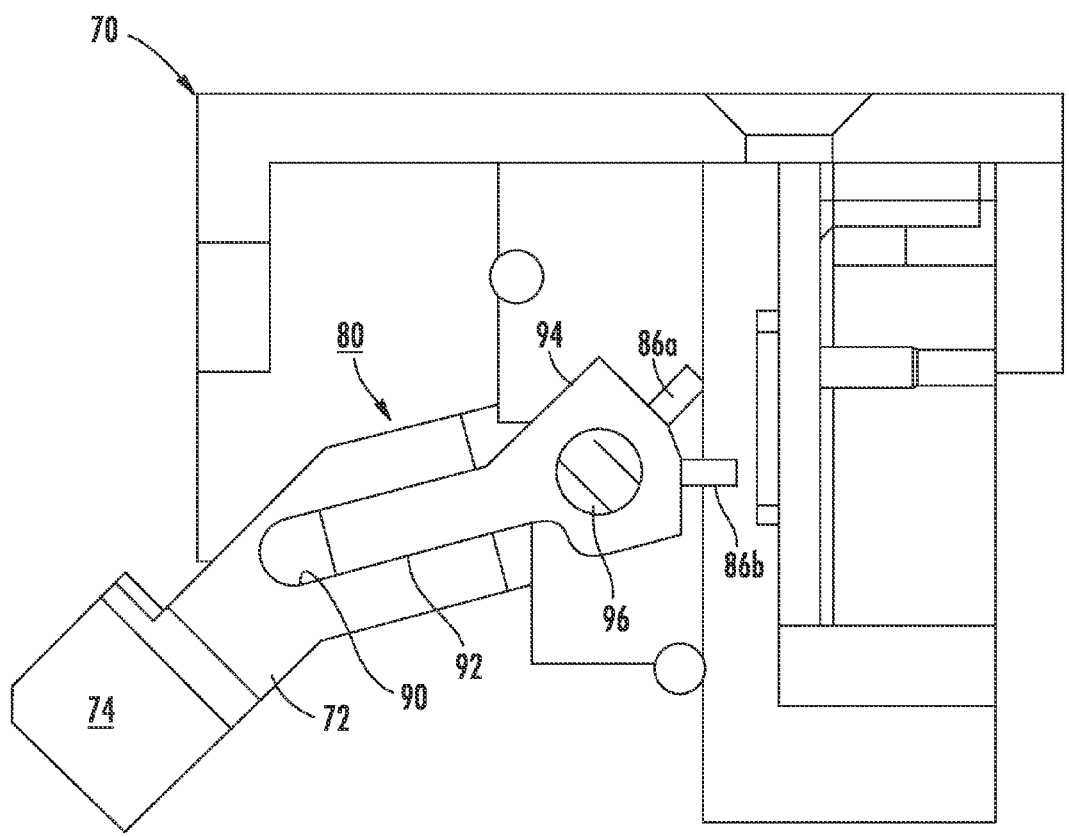
FIG. 11 is a sectional view taken along the lines XI-XI in FIG. 10.
Figure 12:
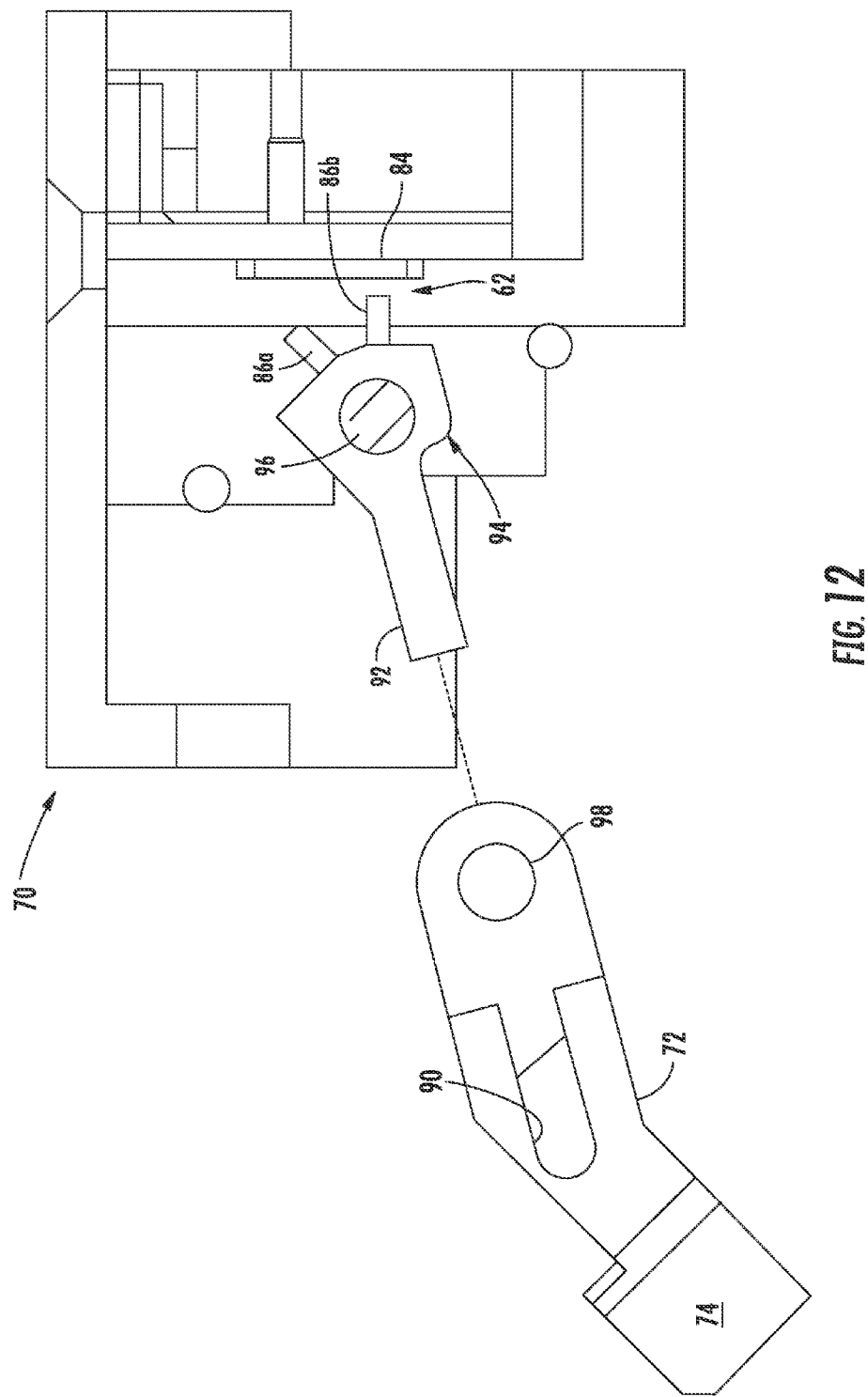
FIG. 12 is the same view as FIG. 11 showing an exploded side elevation of the slip joint.
Figure 13:
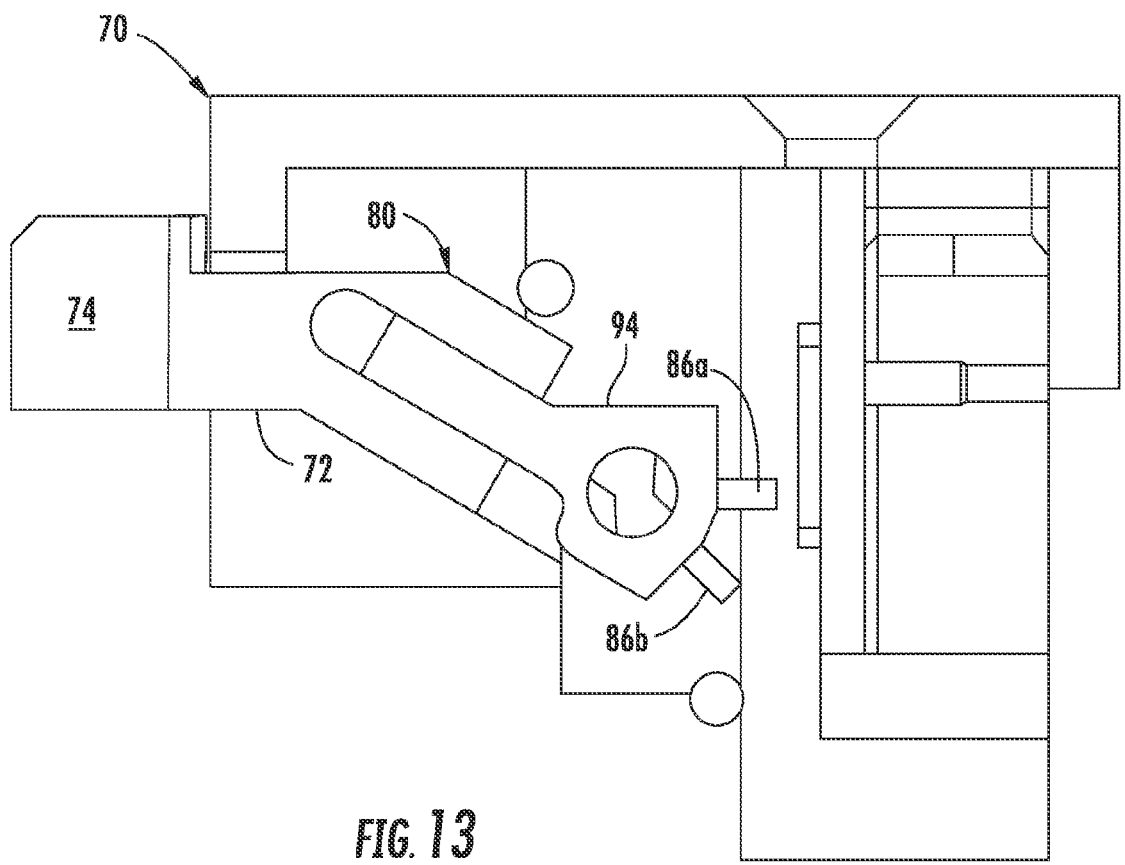
FIG. 13 is the same view as FIG. 11 showing the gate in a diverting state.
Figure 14:
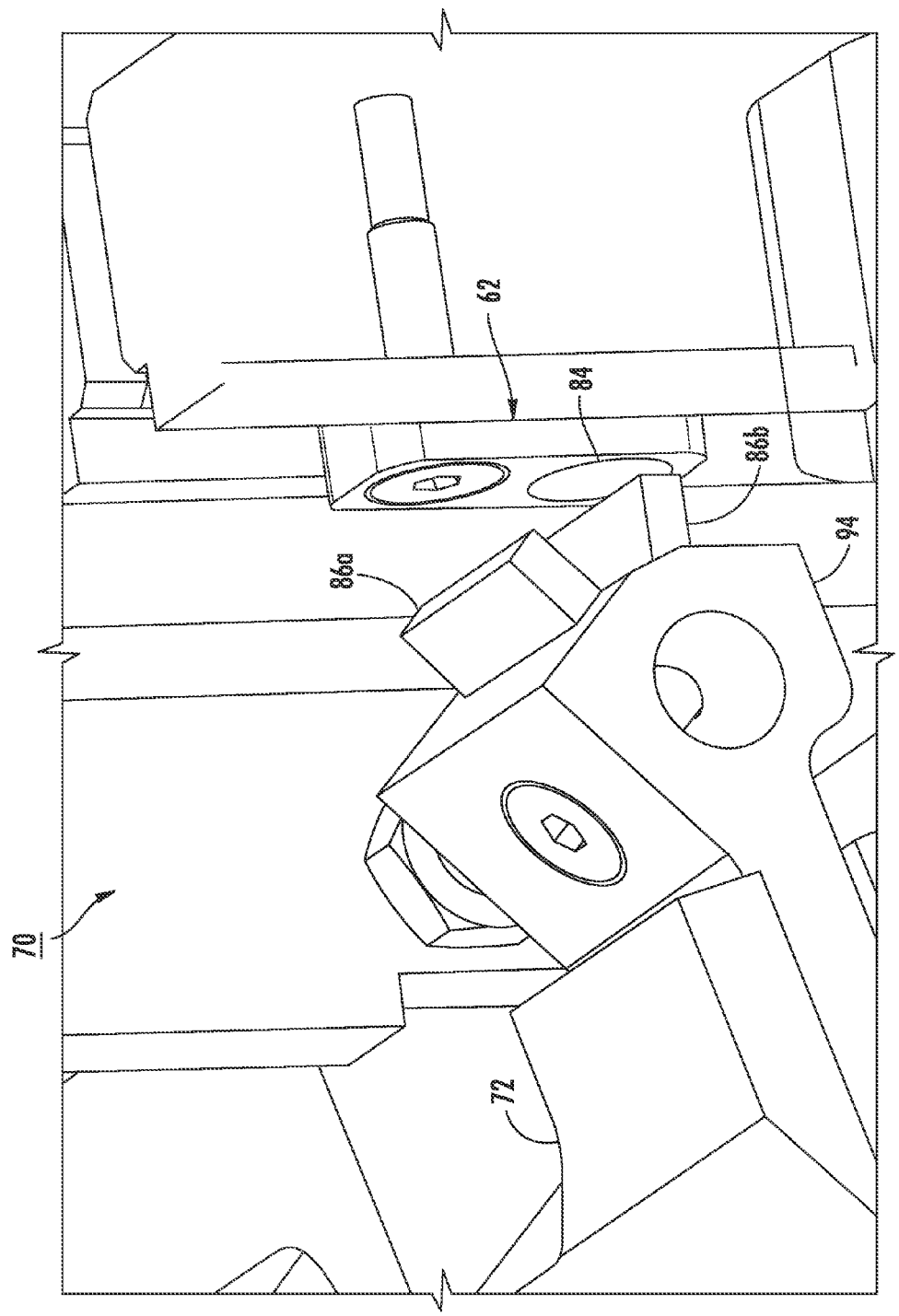
FIG. 14 is a perspective view of a gate state sensor in combination with the gate in the non-diverting state illustrated in FIG. 11.
Figure 15:
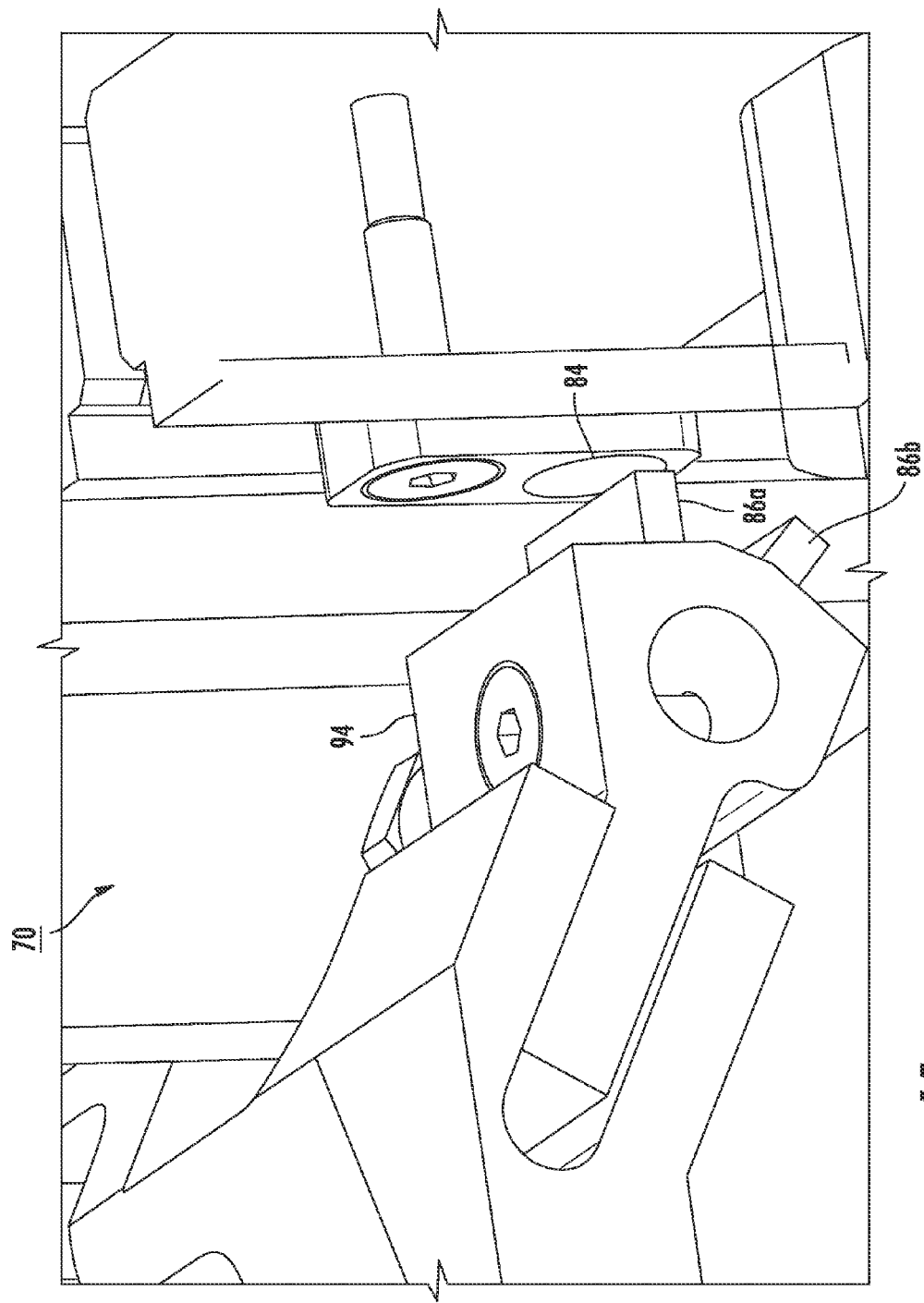
FIG. 15 is the same view as FIG. 14 showing the gate in the diverting state illustrated in FIG. 13.

Sorter 30 further includes a diverting assembly 41 below conveying surface 34 for each divert destination (FIG. 3). Diverting assembly 41 includes a diverter module 50 made up of a plurality of diverters 43 and one or more diverting rails 42 which terminate at a terminal assembly 45. Each diverter 43 is capable of selectively diverting one or more diverting members 39 from a non-diverting path 40, to a diverting rail 42 extending from that diverter assembly in order to cause the associated pusher shoe 38 to travel laterally across conveying surface 34 to thereby laterally displace an article A travelling on the conveying surface. Non-diverting path 40 extends longitudinally along sorter 30 under conveying surface 34 to guide diverting member 39 of shoes until they are diverted. Each of diverting rails 42 is capable of engaging diverting member 39, such as at bearing 52 or alternatively at pin 54, to cause the associated shoe 38 to travel laterally to divert an article. Each diverting rail 42 may be combined with a nose 51 having a moveable member 53 that is capable of being deflected if struck head-on by a diverting member 39 of a pusher shoe in a manner that tends to increase the opening to the corresponding diverting rail 42 and thereby completes a partial divert as disclosed in more detail in commonly assigned U.S. Pat. Application Publication No. 2009/0139834 A1, the disclosure of which is hereby incorporated herein by reference (FIG. 7).

Terminal assembly 45 includes a series of generally boat-shaped buffers 46 having first surfaces 47a that guide a diverting member 39 travelling along an associated diverting rail 42 to a diverted path 48. Buffers 46 further include a second surface 47b that guide a diverting member 39 travelling along diverted path 48. In the illustrated embodiment, buffers 46 have a symmetrical configuration that allows them to be usefully installed irrespective of orientation: Diverting rails 42 may be made of a structural plastic material, such as Nylon, over a vertical steel support plate to reduce noise and/or expense. The buffers 46 and other portions of diverting assembly 41 may also be made of structural plastic, such as UMHW.

Figure 16:
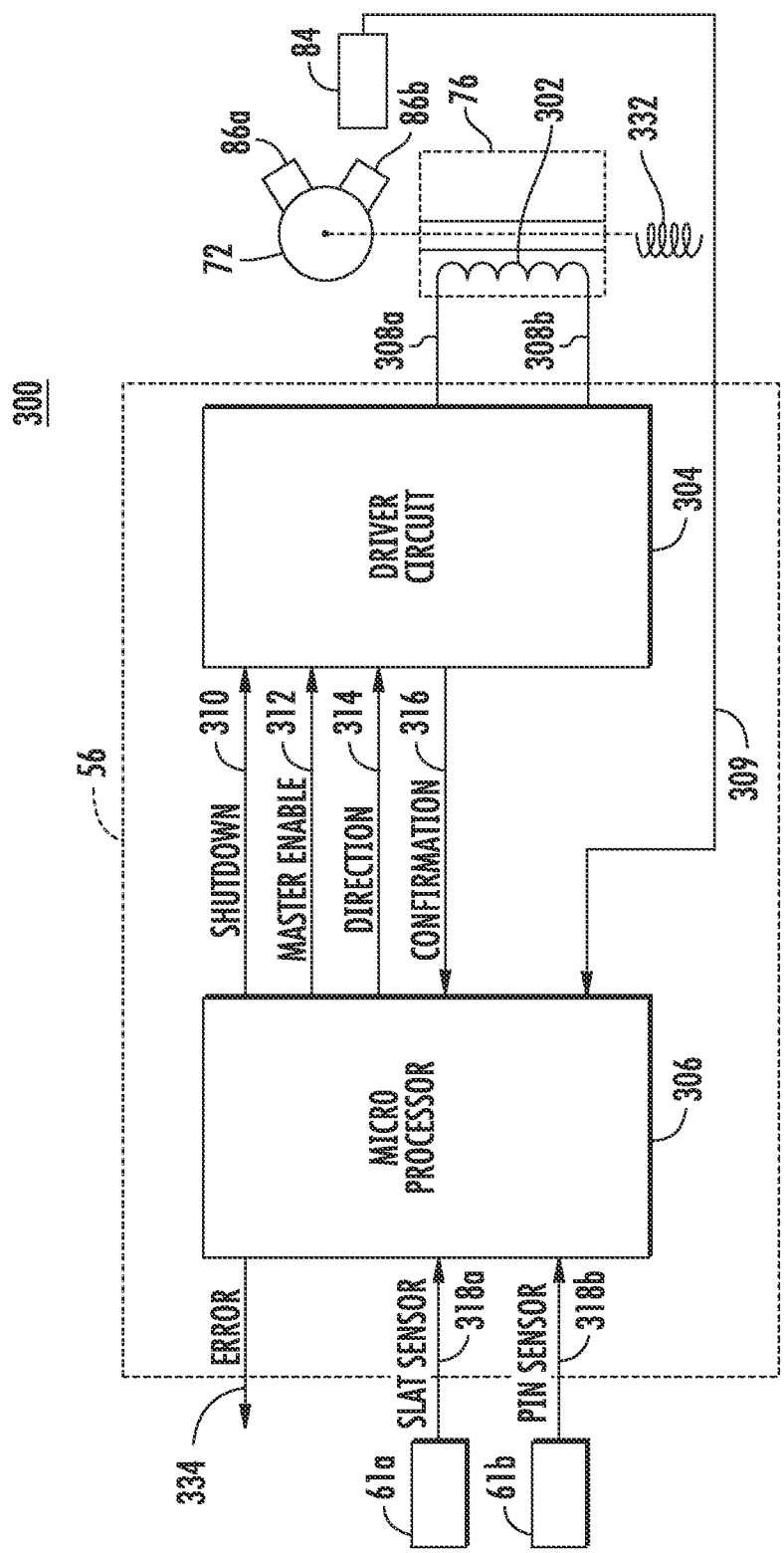
FIG. 16 is a block diagram of an electronic divert control.

Each diverter 43 is a mechanical diverter that utilizes mechanical force to at least partially divert diverting members 39 in a diverting state from non-diverting path 40 to the associated one of diverting rails 42 (FIGS. 6-11). Each diverter 43 may be actuated by an electronic divert control 56 that is illustrated in FIG. 16 and described in more detail below. Electronic divert control 56 receives a timing input 318a from a slat sensor 61a. In the illustrated embodiment, slat sensor 61a is a proximity sensor that monitors movement of slats 36 in order to actuate diverters at an appropriate time to engage a selected diverting member 39 without interfering with diverting members that are not selected for actuation by that diverter. However, other types of sensors are possible. Electronic divert control 56 may also receive a timing input 318b from a pin sensor 61b. In the illustrated embodiment, pin sensor 61b is a proximity detector that senses bearing 52 of a pusher shoe 38 in order to allow divert control 56 to combine inputs 318a, 318b to more accurately determine the position of diverting member 39.

A plurality of diverters 43 may be combined in a diverter module 50. Such a diverter module may be used to mount the diverter assemblies and at least a portion of the diverting rails 42 associated with one divert location, such as a chute or takeaway conveyor, if the sorter is a parallel divert sorter. Each diverter 43 includes a gate 72 having a diverting surface 74. Gate 72 is selectively moveable between a diverting orientation or diverting state, illustrated in FIGS. 6 and 8, and a non-diverting orientation or non-diverting state, illustrated in FIGS. 9 and 10. Diverting surface 74 is capable of selectively diverting one or more diverting members 39 from non-diverting path 40 to its associated diverting rail 42 when gate 72 is in the diverting state. The position of diverting surface 72 allows one or more diverting members 39 to continue to travel along non-diverting path 40 when gate 72 is in the non-diverting state. In the illustrated embodiment, gate is formed from a durable polymeric material, such as Delrin, or the like.

Diverter 43 further includes an actuator 76 that is capable of actuating gate 72 between its non-diverting state and its diverting state. Actuator 76 is a rotary actuator having a generally horizontal axis of rotation. Rotary actuator 76 may be in the form of a rotary solenoid of the type that is known in the art. Alternatively, rotary actuator 76 may be in the form of a brushless torque actuator 78, illustrated in FIG. 37, having a connector 66 for connection with electronic divert control 56. Gate 72 is rotatably mounted to a shaft 98 to rotate between the diverting and non-diverting orientations about another horizontal axis that is concentric with the generally horizontal axis of rotation of rotary actuator 76.E A slip joint 80 may be provided between rotary actuator 76 and gate 72 in order to resist diverting motion being transferred from gate 72 to rotary actuator 76. In the illustrated embodiment, slip joint 80 is defined by a slot 90 in gate 72 that is engaged by an extension 92 of a paddle-shaped member 94 mounted to generally horizontal shaft 96 of rotary actuator 76. Extension 92 is free to move within slot 90 radially and/or axially with respect to both shafts 96 and 98, thus preventing transfer of shock from diverting surface 74 to shaft 96. The presence of a slip joint avoids difficulties associated with known mechanical diverters utilizing a rotary solenoid having a vertically oriented axis. In such known systems, shock and vibration induced in the diverter from contact by the diverting member can be transferred directly to the rotary solenoid, thereby reducing the useful life of the rotary solenoid.

Diverter 43 may include a sensor 62 for monitoring operation of the diverter. Sensor 62 senses rotation of paddle member 94 in order to determine when the gate has arrived at a particular state. In the illustrated embodiment, sensor 62 is made up of a proximity sensor 84 that senses one or more flags 86a, 86b positioned at paddle member 94, but may be positioned at other portions of the gate. As gate 72 rotates, flags 86a, 86b move out of, and then into, sensing range of sensor 84 to indicate change of state of the gate.

Gate 72 may include a flexible member 87 that defines diverting surface 74. Flexible member 87 absorbs impact from contact between a diverting member 39 and diverting surface 74. In the illustrated embodiment, a portion of gate 72 is excavated to define a void at 88 behind diverting surface 74. The presence of void 88, the thickness of Member 87 and the material-defining gate 72 may be selected to impart a desired degree of flexibility to member 87 as would be within the capabilities of one of ordinary skill in the art.

Gate 72 is configured to position diverting surface 74 to engage the bearing 52 of the diverting member 39 when the gate is in its diverting orientation. This tends to reduce wear on diverting surface 74 because it is engaging a member that is free to rotate. Therefore, the movement of diverting member 39 with respect to diverting surface 74 during the divert is at least partially one of rotation not slipping. In order to enhance the interaction between diverting surface 74 and bearing 52, member 87 may be configured to provide a curved surface for the diverting surface. However, it should be understood that other embodiments of the invention provide a gate that positions a diverting surface to engage pin 54 when in the diverting orientation, as will be described in detail below. In the illustrated embodiment, no special material is applied to diverting surface 74 to increase its hardness. Diverting surface 74 is defined by the polymeric material forming gate 72.

In diverter 43, the generally horizontal axis of rotary actuator 76 is generally longitudinally oriented to be aligned with the motion of web 32. However, other horizontal orientations of the axis of rotation of the rotary actuator are possible. For example, in embodiments that will be described in more detail below, the horizontal orientation of the axis of rotation of the rotary actuator may be generally laterally orientated to be aligned perpendicular to the motion of web 32 or may be at an angle between lateral and longitudinal orientation.

In the illustrated embodiment, gate 72 is selectively moveable by an actuation system 300 from the non-diverting state to the diverting state under the motive force of actuator 76 and returns to the non-diverting state under the bias of a mechanical biasing device 332, which may be a mechanical spring, or the like (FIGS. 16-19). Alternatively, the actuator may move the gate from the diverting state to the non-diverting state and return the gate to the diverting state with biasing device 332. Actuation system 300 includes electronic divert control 56 that applies an actuation current at output 308a, 308b to coil 302 of actuator 76 according to an activation control signal 219 to move gate 72 between one of the states and the other of the states and to hold it in that state. Control 56 is made up of a driver circuit 304 and a programmed microprocessor 306 or other logic control circuit of the type that are well known in the art. Microprocessor 306 receives input 318a from slat sensor 61a, which senses the leading and trailing edges of slats 36 and input 318b for pin sensor 61b, which senses bearing 52 in order to provide timing signals for driver circuit 304 to move gate 72 at the proper time to intercept a desired diverting member 39 to be diverted and not interfere with any leading or trailing diverting member 39 that is not intended to be diverted by that gate. Microprocessor 306 also receives a gate motion input 309 from proximity sensor 84 in order to monitor movement of gate 72 and to adjust activation control signal 219 as a function of the movement of the gate, as will be described in more detail below. Activation control signal 219 is made up of an actuation signal 320, a flux dissipation interval 322, and a gate hold signal 324.

In order to control driver circuit 304, microprocessor 306 supplies a shut-down mode signal 310, a master enable signal 312 and a direction signal 314 to circuit 304. Shut-down mode signal 310 affects the manner in which driver circuit 304 discontinues actuation signal 320 and dissipates the magnetic flux built up in coil 302 during flux dissipation period 322, as will be explained in more detail below. Master enable signal 312 instructs driver circuit 304 to start and stop actuation signal 320 and gate hold signal 324. Direction signal 314 causes outputs 308a, 308b to drive current in one direction through coil 302 to produce actuation signal 320 to move actuator 76 and gate hold signal 324 to hold the actuator; or in the opposite direction through coil 302 to produce a demagnetization pulse 326 to rapidly dissipate the magnetic flux in coil 302. Driver circuit 304 supplies a confirm signal 316 to microprocessor 306 to confirm that current is being supplied to coil 302. This confirm signal 316 is used by microprocessor 306 to assist in monitoring motion of gate 72 so that microprocessor 306 will be able to distinguish whether flag 86a or flag 86b is being sensed by proximity sensor 84.

Figure 17A:
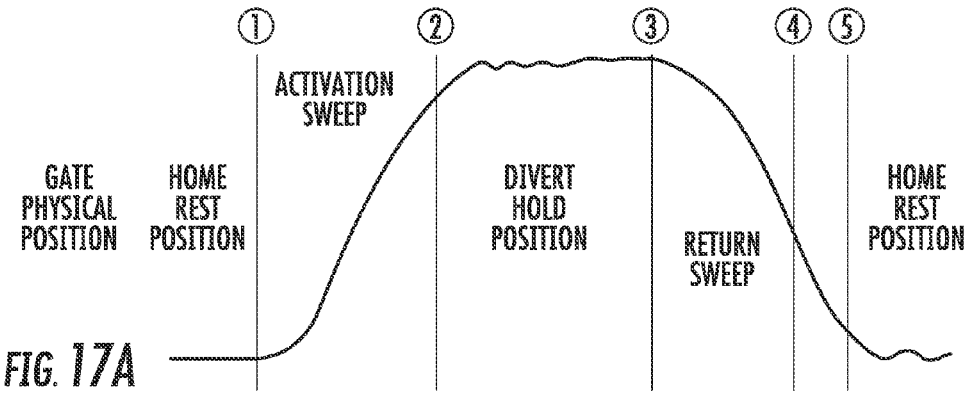
FIGS. 17A-17D are timing diagrams illustrating operation of the divert control module in FIG. 16.
Figure 17B:
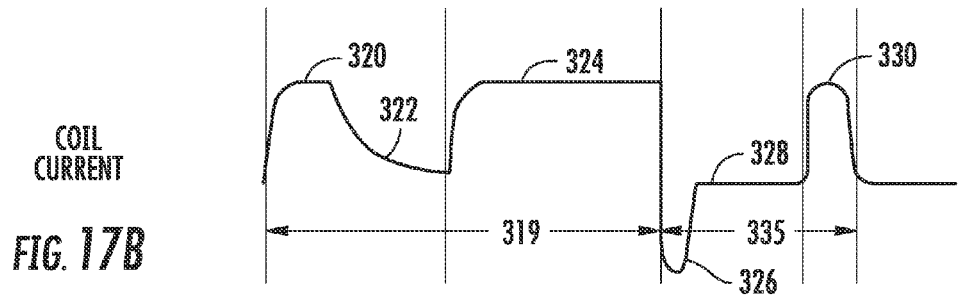
Figure 17C:
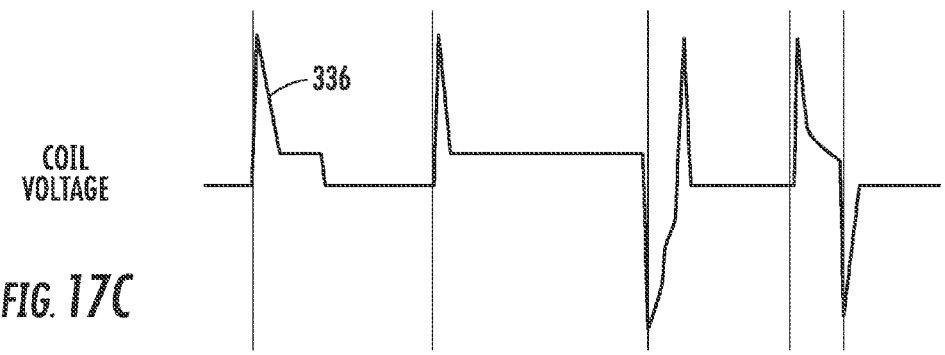
Figure 17D:
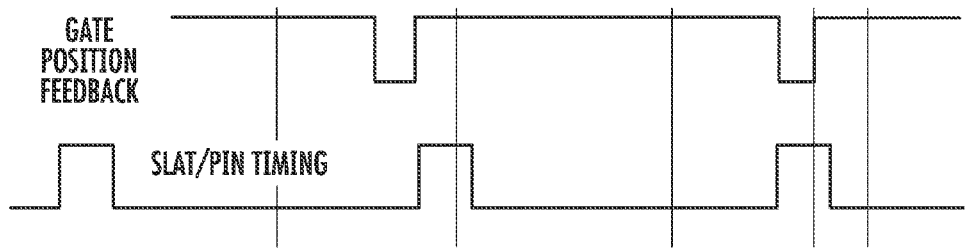

The manner in which actuation system 300 operates may be seen by reference to FIGS. 17a-17d. FIG. 17a illustrates movement of gate 72 during an activation sweep (from time mark 1 to time mark 2) when actuator 76 is moving gate 72 from one state to the other state against the bias of biasing device 332. During a hold position (from time mark 2 to time mark 3), actuator 76 is holding gate 72 in the other state against the bias of biasing device 332. In a return sweep period (from time mark 3 to time mark 5) the bias of biasing device 332 is returning gate 72 to the one, or home, position from the other position. FIG. 17b, which is aligned with the time marks of FIG. 17a, illustrates current being supplied to coil 302 by driver circuit 304. In order to begin movement of gate 72 to the other position, driver circuit 304 applies an activation control signal 319 that begins with an actuation signal 320 that is applied to coil 302. This causes gate 72 to begin moving. Before gate 72 reaches the other position, actuation signal 320 is discontinued and the flux in coil 302 is dissipated during a flux dissipation interval 322. About the time that the gate reaches the other state (at time mark 2), a gate hold signal 324 is applied to the temporarily motionless gate in order to hold the gate in the other state for the duration of the hold position (from time mark 2 to time mark 3) against the bias of biasing device 332.

As will be described in more detail below, the relative times of actuation signal flux dissipation interval 322 and gate hold signal 324 that collectively make up activation control signal 319 may be adjusted in a feedback loop in order to provide critical damping to movement of gate 72 during its activation sweep. In particular, this critical damping is to cause the bias of biasing device 332 to stop gate 72 approximately as the gate reaches the other state. When microprocessor 306 has determined from slat sensor input 318a and pin sensor input 318b that it is time to return gate 72 to the original position, a return control signal 325 is carried out. Return control signal 325 may optionally provide a demagnetization pulse 326 (at time mark 3) in order to rapidly dissipate the magnetic flux in coil 302 so that gate 72 can immediately begin the return sweep. Demagnetization pulse 326 is optional and may not be required if coil 302 is not large. Following demagnetization pulse 326 (if any), coil 302 enters a no action period 328 (from the end of the demagnetization pulse to time mark 4) during which no current is applied to the coil. During no action period 328, the bias of biasing device 332 moves gate 72 toward its home state. Before the gate reaches the home state, the driver circuit applies a de-actuation signal 330 (between timing mark 4 and timing mark 5) that operates against biasing device 332 in order to arrest the movement of gate 72 approximately as it reaches the home position. The timing of return control signal 325 may be controlled in a feedback loop in order to provide critical damping of the movement of gate 72 during the return sweep.

Thus, it may be seen that divert control 56 may adjust activation control signal 319 and/or return control signal 325 in order to provide critical damping of movement of gate 72 between the one of the states and the other of the states. Divert control 56 may adjust activation control signal 319 in order to apply a minimal duration of the actuation current that is capable of causing the gate to change states. Divert control module 56 may discontinue actuation signal 320 during flux dissipation interval 322 before the gate reaches the other state. Critical damping of movement of gate 72 may be achieved by divert control module 56 adjusting activation control signal 319 as function of a comparison of velocity of gate 72 which is determined from the time it takes gate 72 to change from one, or home, state to the other or activated state during the present or prior activation cycles. This may be accomplished by adjusting the activation control signal 319. In the illustrated embodiment, this is accomplished by having a constant duration actuation signal 320 and adjusting the start time of gate hold signal 324. However, the duration of actuation signal 320 could, alternatively, be varied.

By providing critical damping to actuation of the diverter gate, the actuation system is capable of minimizing the amount of time it takes to move from one state to the other state. This is because it is not necessary to wait for the gate to settle down from the mechanical bounce that would otherwise be experienced when the gate reaches the mechanical limit of travel. As is understood by one skilled in the art, the ability to reduce the time it takes diverter 43 to reliability change from a home position to an actuated position allows web 32 to move at a faster speed for a given slat pitch. Moreover, the critical damping of movement of gate 72 may eliminate the need for a mechanical buffer at the end of travel of the gate at the actuated state. Also, the avoidance of mechanical shock against the mechanical stop at the actuated state from the critical damping may extend the useful life of the diverter and its actuator.

Moreover, divert control module 56 may retain a running average of the time it takes for gate 72 to move from one state to the other state. (Time can be converted to gate velocity and, therefore, will be used herein interchangeably with velocity.) Control module 56 may compare a more recent time that it takes the gate to move between states to the historic time that it takes the gate to move between states to indicate an error condition on an error indication output 334 if the recent time is substantially different than the historic time. This lengthening of time may be a result of accumulation of debris in the diverter, which operates in a relatively harsh environment. Such lengthening of time usually is first noticed during the return sweep (from time mark 3 to time mark 5) when movement of the gate is guided by mechanical biasing device 332.

The error indication output 334 may be supplied, for example, to an upper level control (not shown) to call for maintenance of sorter 30.

As previously observed, divert control module 56 is capable of providing a return control signal 325 when gate 72 is moving from the actuated state to the home state in a return sweep. Return control signal 325 includes a de-actuation signal 330 that counteracts the bias provided by mechanical biasing device 332. Divert control 56 may adjust each occurrence of return control signal 325 as a function of the movement of the gate 72. In particular, divert control 56 may adjust return control signal 325 in order to provide critical damping of the movement of the gate between the other, or actuated, of the states and the one, or home, of the states. This may be accomplished by divert control 56 applying a minimal level of de-actuation signal 330 that is capable of causing gate 72 to avoid mechanical shock when returning to the home state. Divert control 56 may adjust return control signal 325 as function of a comparison of the time it takes gate 72 to change from the actuated to home states to the same time during this or previous cycles of diverter 43.

By providing critical damping through the use of a return control signal, the system is capable of further minimization of the amount of time it takes to move between states. This is because it is not necessary to wait for the gate to settle down at the home state from the mechanical bounce that would otherwise be experienced when the gate reaches the home state under operation of biasing device 332. As is understood by one skilled in the art, the ability to reduce the time it takes diverter 43 to reliability change from an actuated state to the home state allows web 32 to move at an even faster speed for a given slat pitch. Moreover, the critical damping of movement of gate 72 may eliminate the need for a mechanical buffer at the end of travel of the gate at the home state. Also, the avoidance of mechanical shock against the mechanical stop at the home state from the critical damping returning to the home state may extend the useful life of the diverter and its actuator.

Figure 19A:
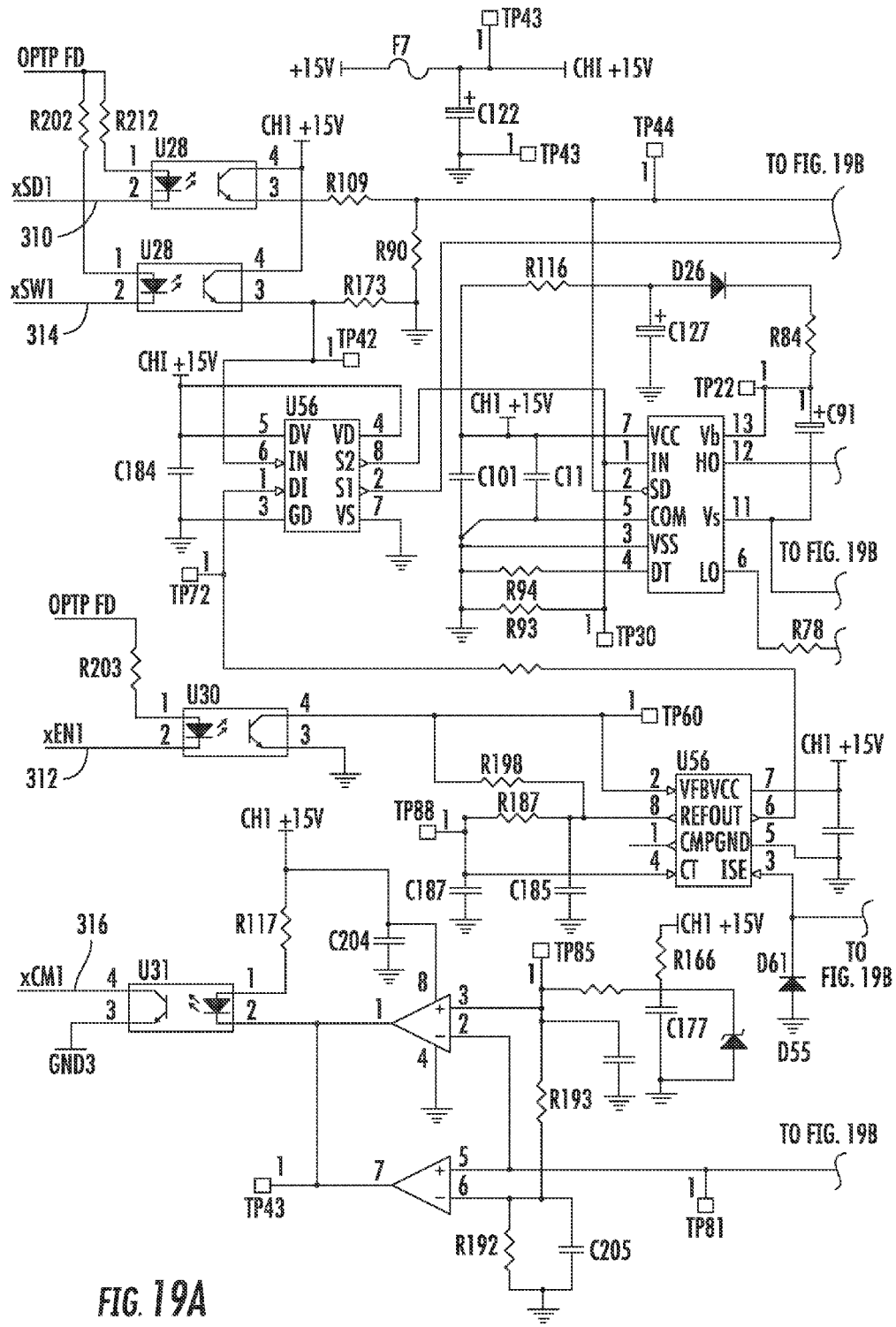
FIGS. 19A and 19B are an electrical schematic diagram of a driver circuit.
Figure 19B:
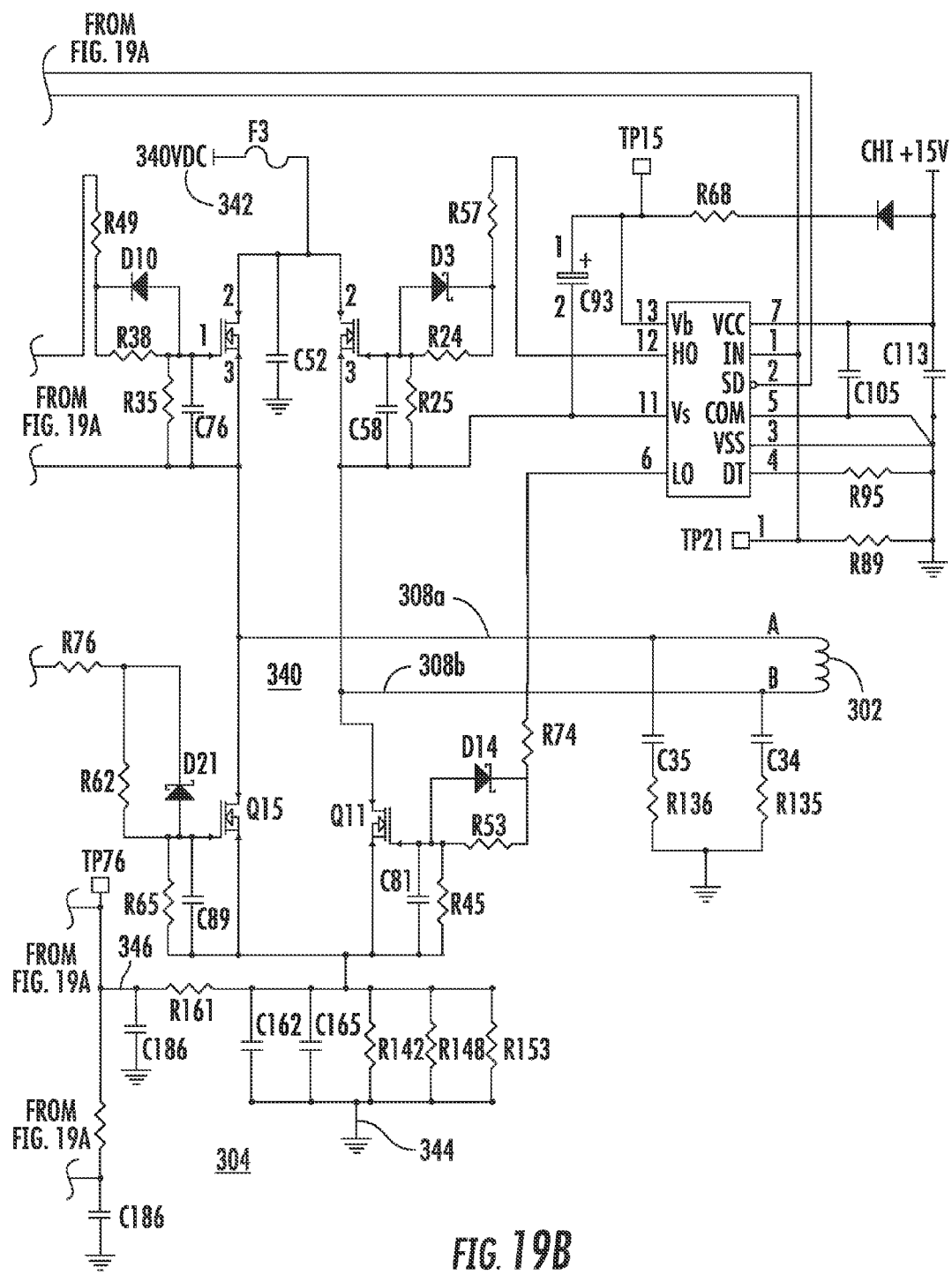

In the illustrated embodiment, driver circuit 304 is a controlled current circuit. For reference, the voltage that would be measured across coil 302 is shown as a voltage signal 336 seen in FIG. 17c. However, it should be understood that driver circuit 304 could, alternatively, operate as a controlled voltage circuit, as would be understood by the skilled artisan. In the illustrated embodiment, driver circuit 304 utilized an H-bridge configuration to produce current in coil 302 through actuation/de-actuation lines 308a, 308b (FIG. 19). Control circuit 304 includes an H-bridge 340 made up of separate arms, one made up of series transistors Q7 and Q15 and the other of series transistors Q3 and Q11, with the arms connected in parallel between a DC voltage source 342 and ground 344. The node between transistors Q7 and Q15 supplies one line 308a to coil 302. The node between transistors Q3 and Q11 supplies the other line 308b to coil 302. A set of precision resistors R142, R148 and R153 connected in parallel with each other is used to sense the current flowing through coil 302 on a current sense line 346. In the illustrated embodiment, voltage source 342 is operated at 340 VDC. However, a greater or lesser voltage may be used.

A pair of half-bridge driver circuits U22 and U23 each drive one half of bridge 340. In particular, driver circuit U22 operates transistors Q7 and Q15 in order to turn the transistors on and off in proper sequence so that only one transistor is on at a time. In a similar fashion, driver circuit U23 operates transistors Q3 and Q11. A pulse-width modulation (PWM) circuit U48 coordinates the operation of half-bridge driver circuits U22 and U23 to produce a controlled current in coil 302 by producing PWM to the coil. PWM circuit U48 senses the voltage on current sense line 346 and regulates half-bridge driver circuits U22 and U23 to produce controlled current in coil 302. In order to produce actuation signal 320, gate hold signal 324 and de-actuation signal 330, transistors Q7 and Q11 are turned on and off and transistors Q3 and Q15 remain off or open.

Master enable signal 312 from microprocessor 306 causes half-bridge driver circuits U22 and U23 to activate bridge 340. Shut down mode signal 310 from microprocessor 306, in conjunction with master enable signal 312, instructs driver circuits U22 and U23 what mode to use to dissipate flux in coil 302, such as when actuation signal 320 is discontinued during flux dissipation period 322. For example, in a mode known as "plugging" mode, either both top transistors Q7 and Q3 or both bottom transistors Q15 and Q11 are turned on together in order to dissipate the flux in coil 302 resulting in a deceleration of the divert gate's motion. Alternatively, in a mode known as "regenerative" mode, all transistors Q3, Q7, Q11 and Q15 are opened in order to more rapidly dissipate flux in coil 302 back through voltage source 342. In the plugging mode, the slower flux dissipation is used in the illustrated embodiment during flux dissipation interval 322 in order to provide the ability to provide more control of the relationship between the actuation signal 320 and flux dissipation interval 322. However, the regenerative mode could alternatively be used. In order to produce a demagnetization pulse 326, transistors Q3 and Q15 are turned on in order to produce a reverse current in coil 302 and transistors Q7 and Q11 remain off or open.

Confirmation signal 316 responds to voltage at current sense node 346 in order to inform microprocessor 306 that current is flowing through coil 302. This allows microprocessor 306 to validate the proper electrical operation of the combination of the H-bridge driver circuit 304 and the divert gate's actuator coil 302.

Figure 18A:
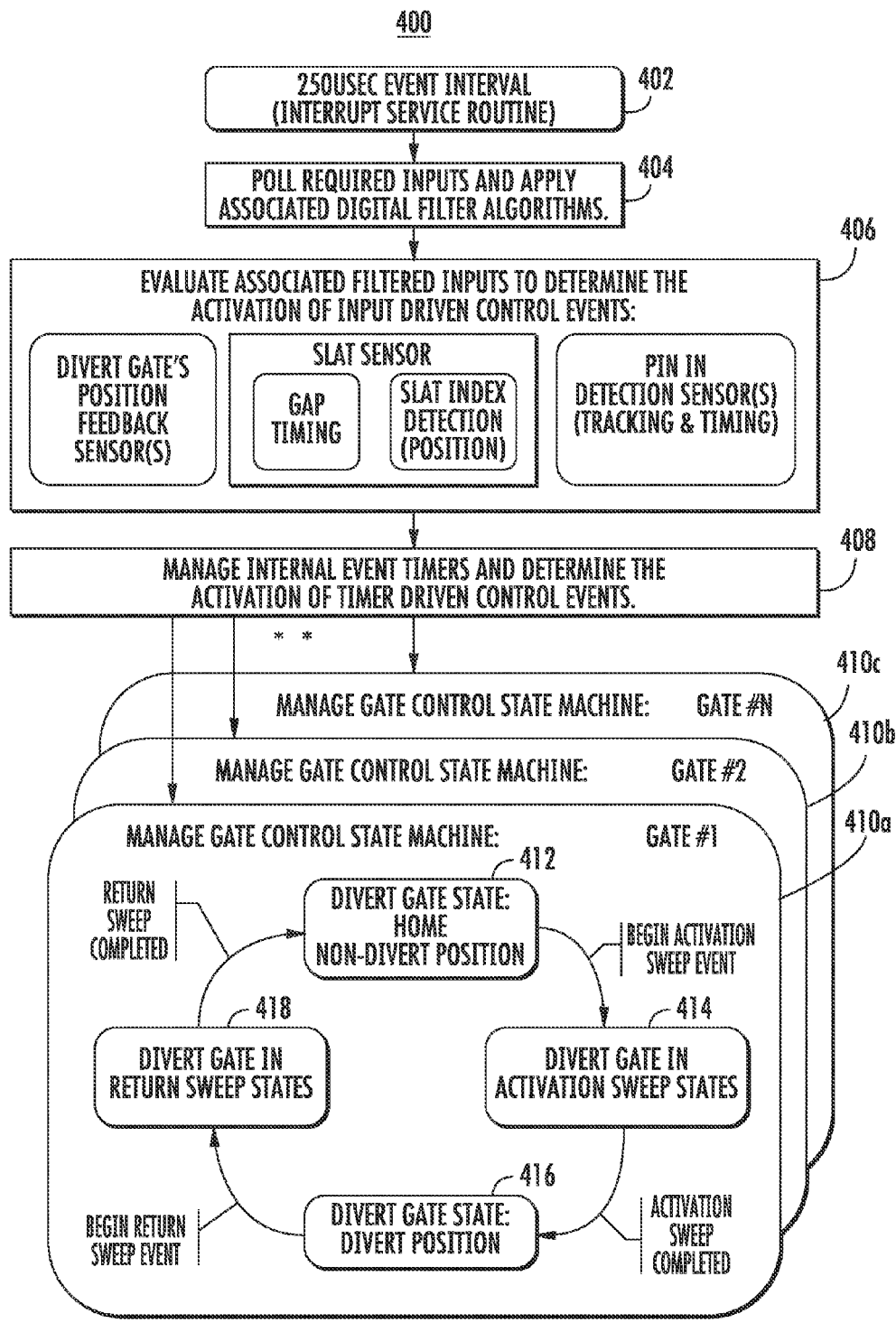
FIGS. 18A-18N and 18P-18Q are a flowchart of a divert control program.
Figure 18B:
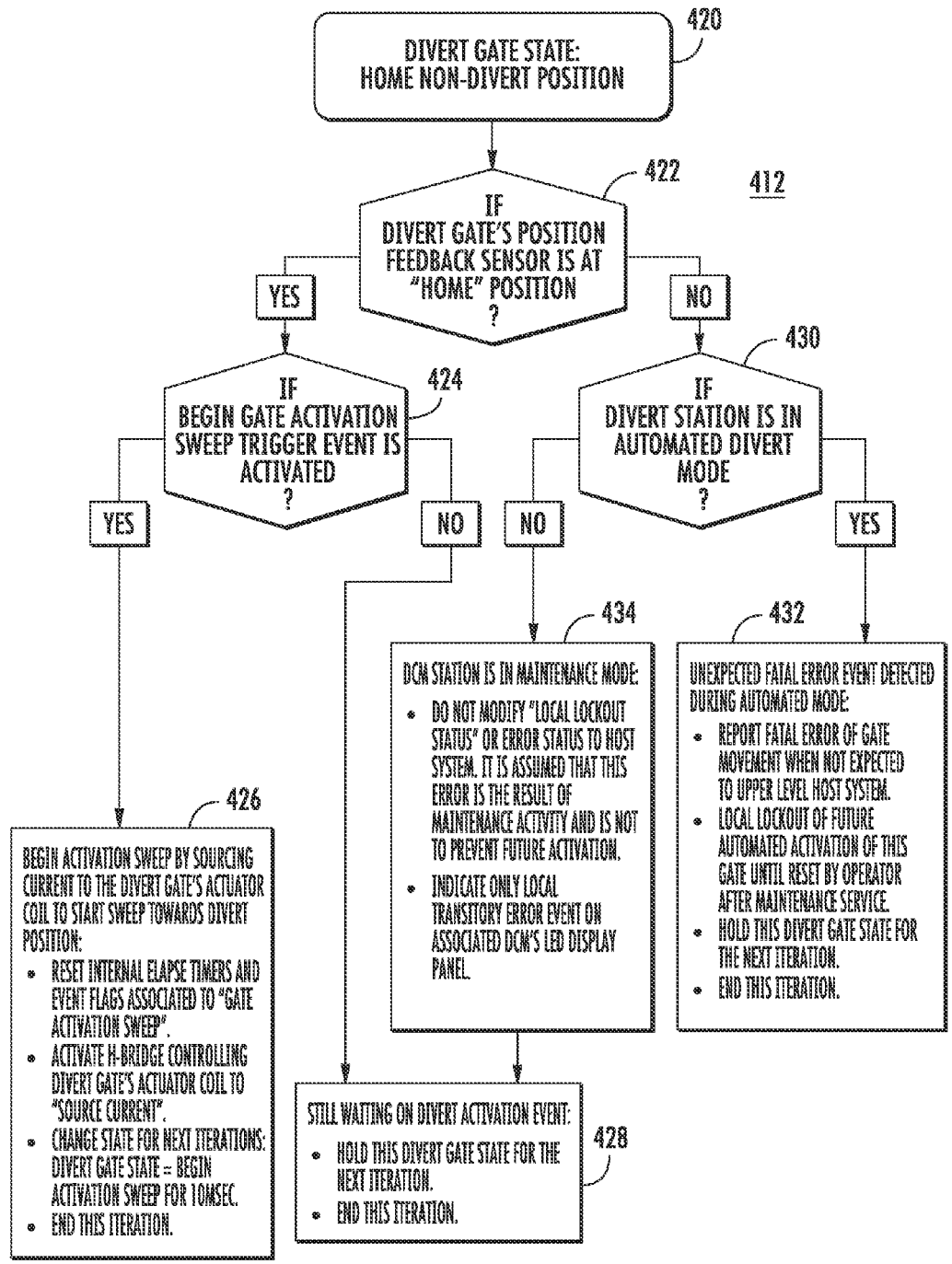
Figure 18C:
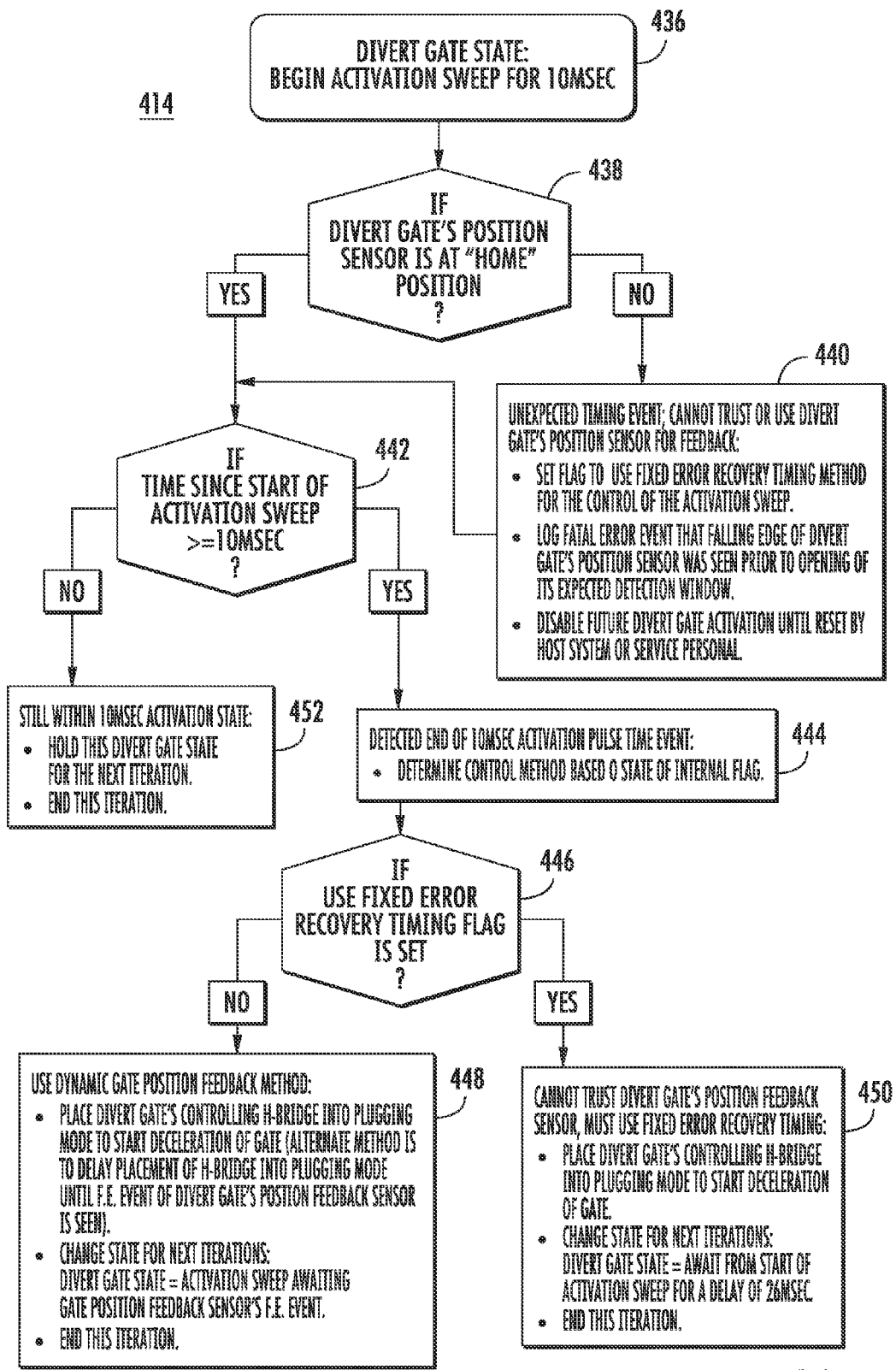
Figure 18D:
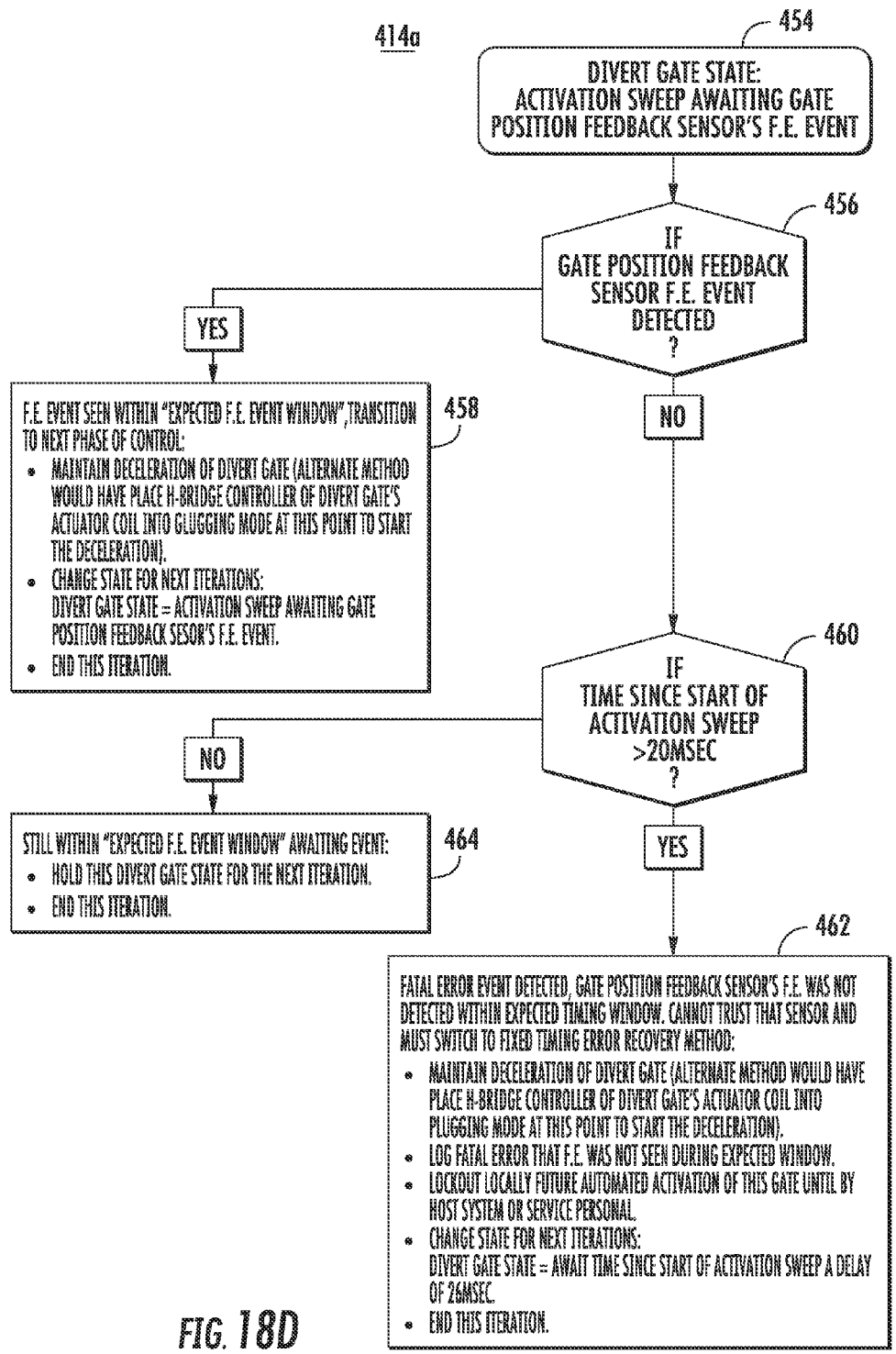
Figure 18E:
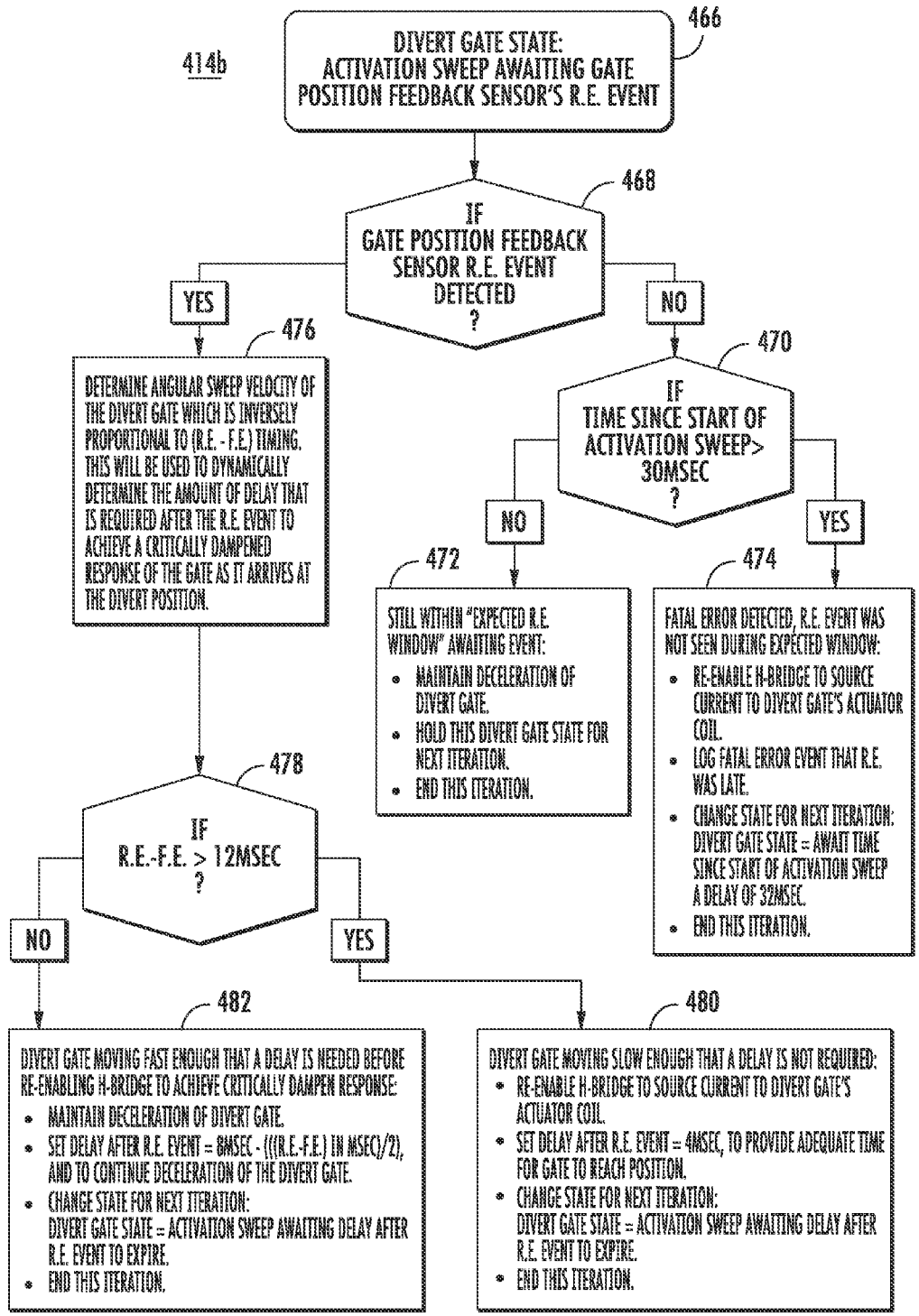
Figure 18F:
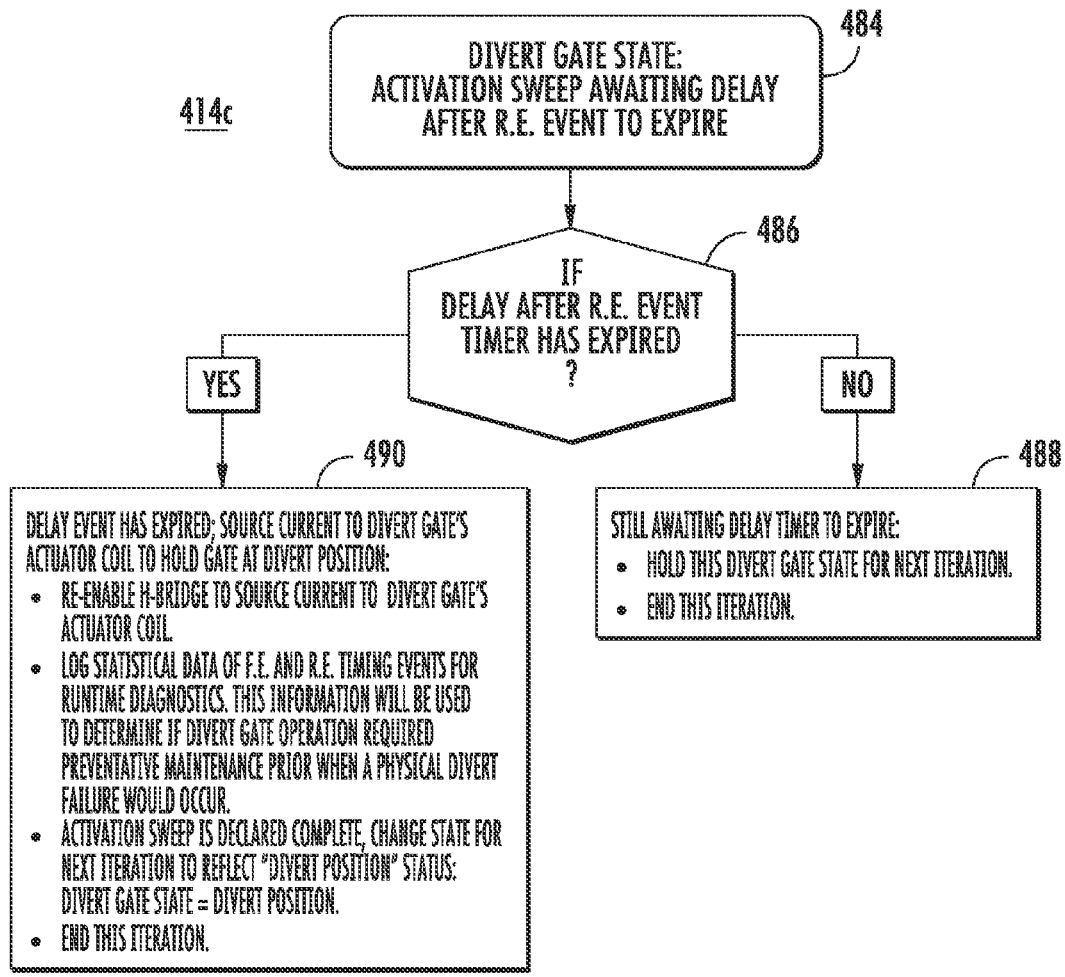
Figure 18G:
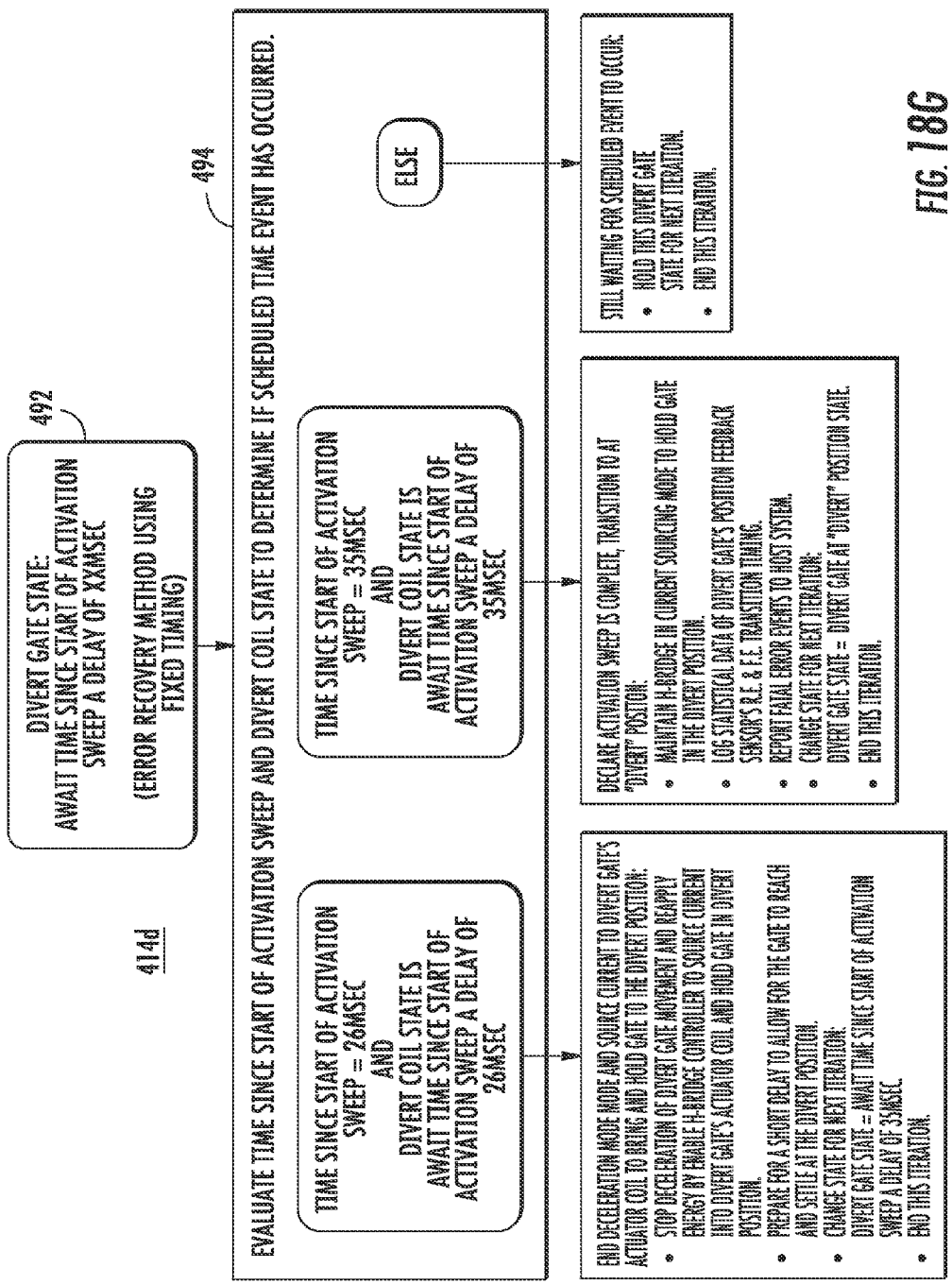
Figure 18H:
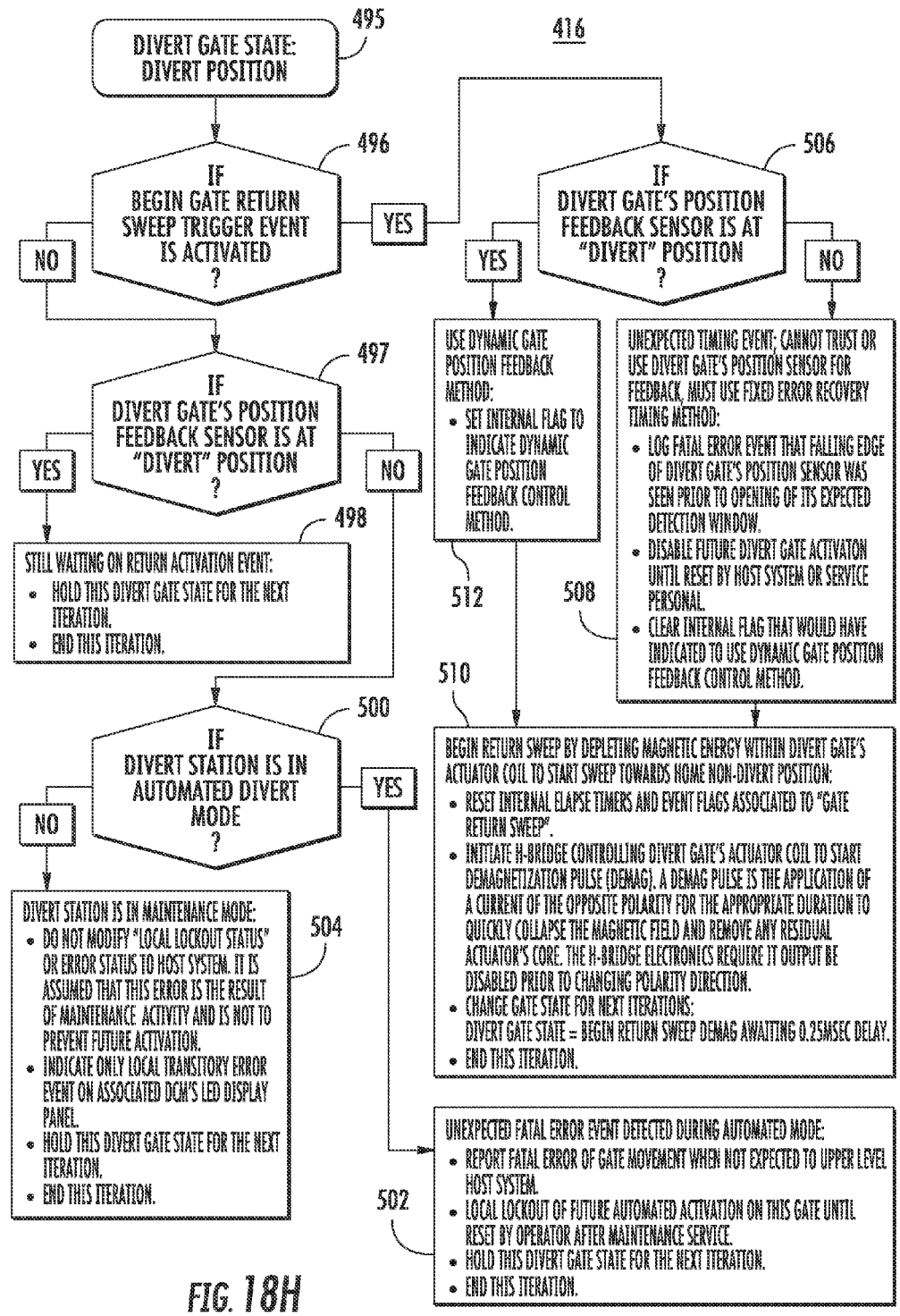
Figure 18I:
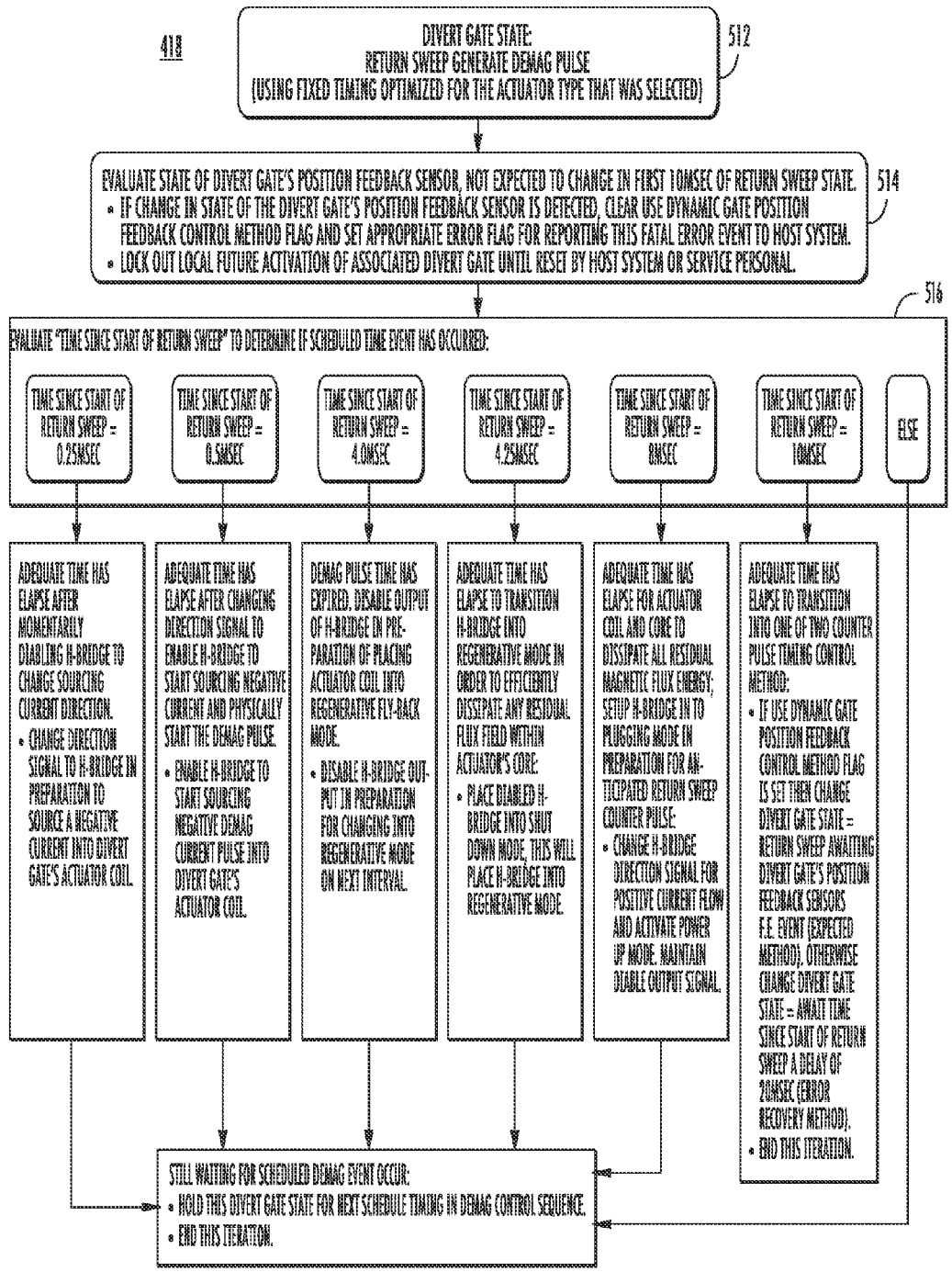
Figure 18J:
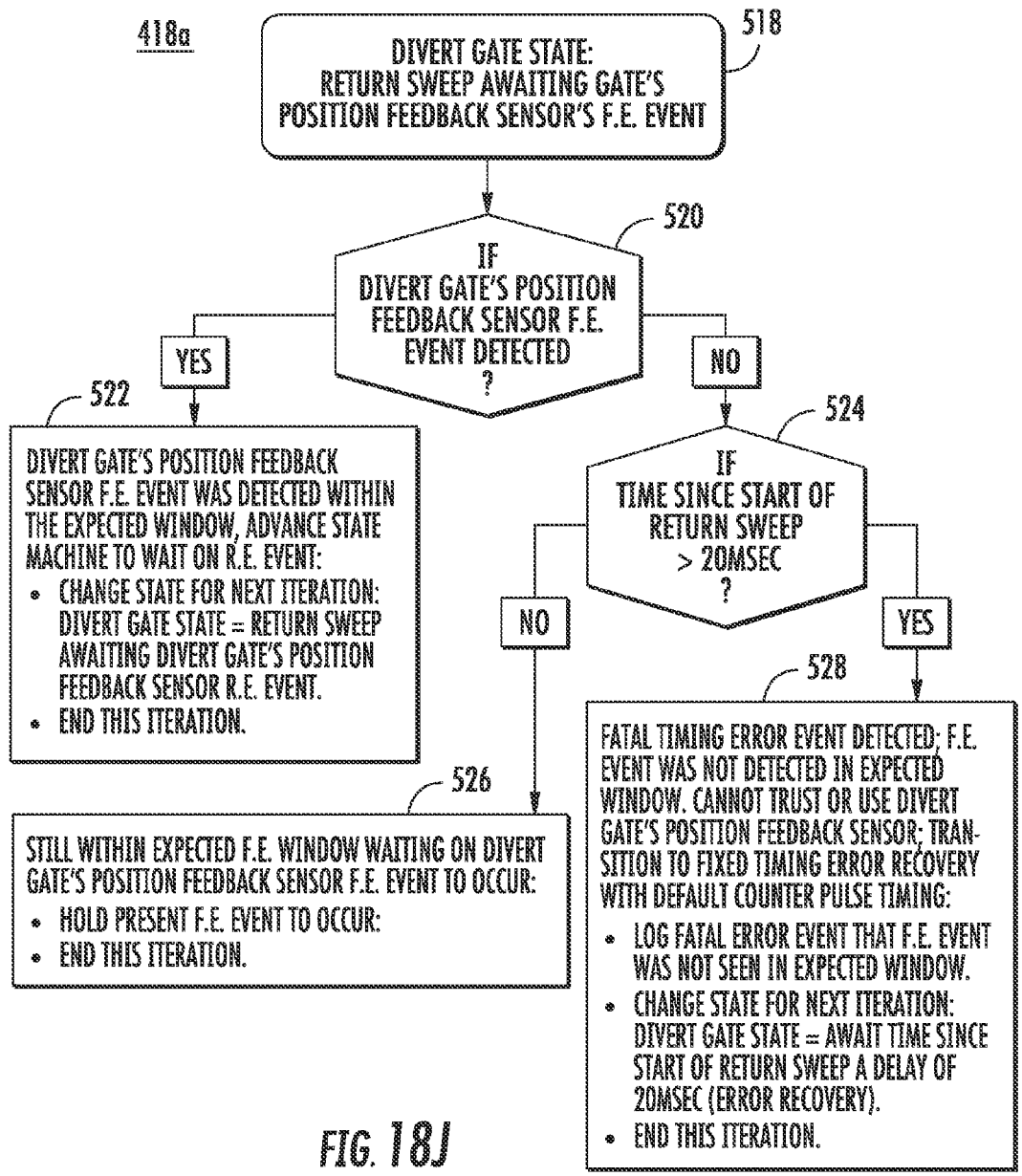
Figure 18K:
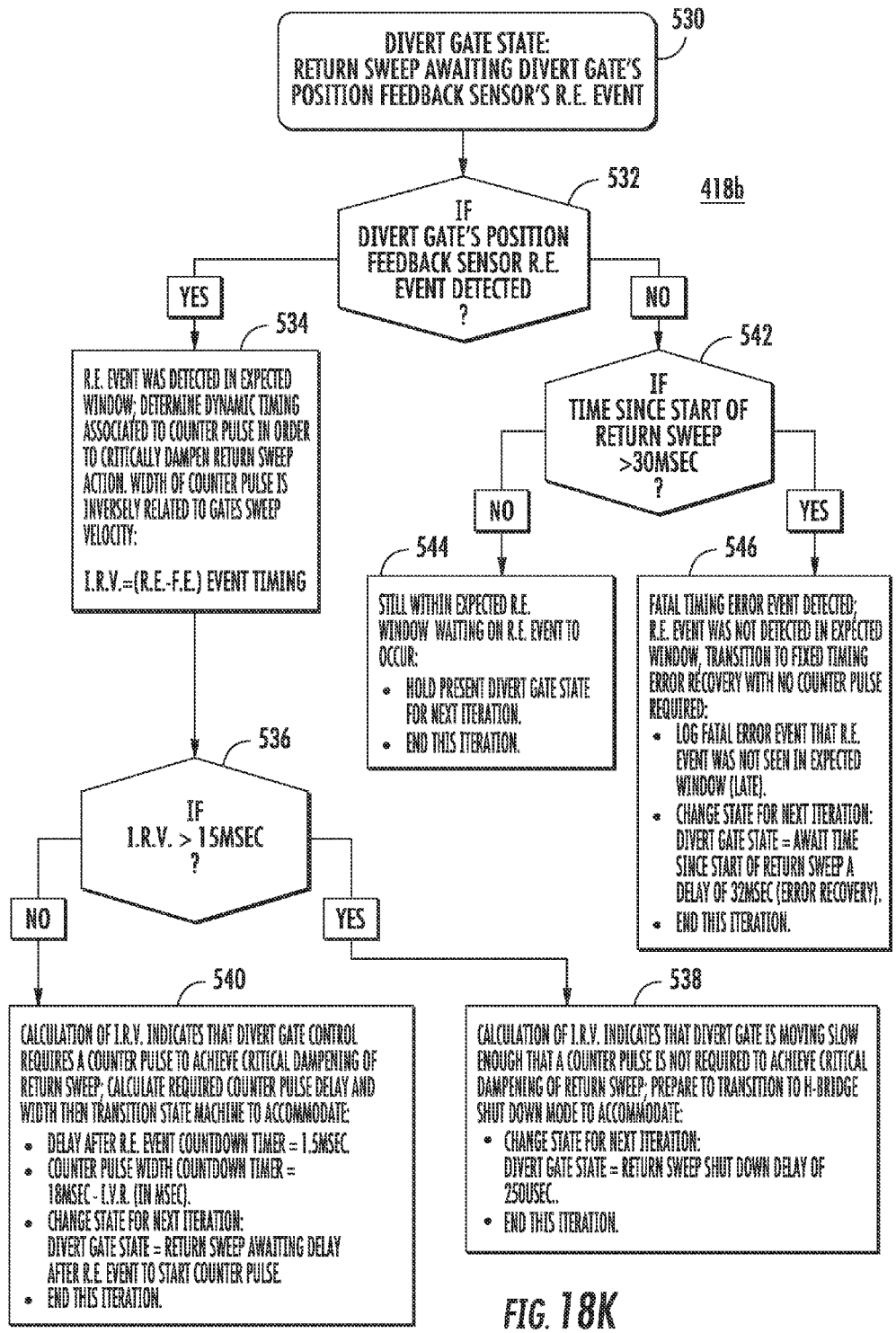
Figure 18L:
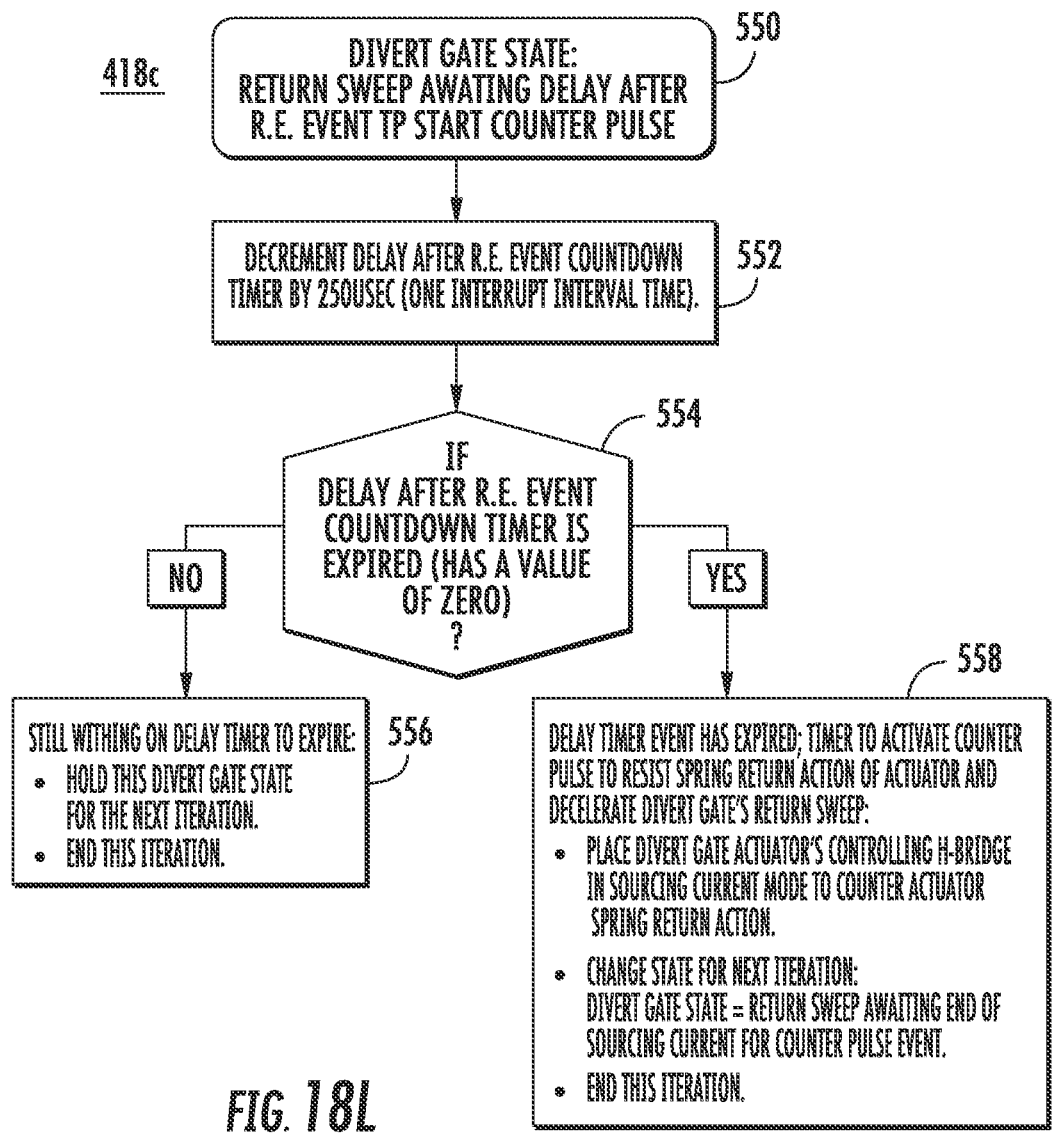
Figure 18N:
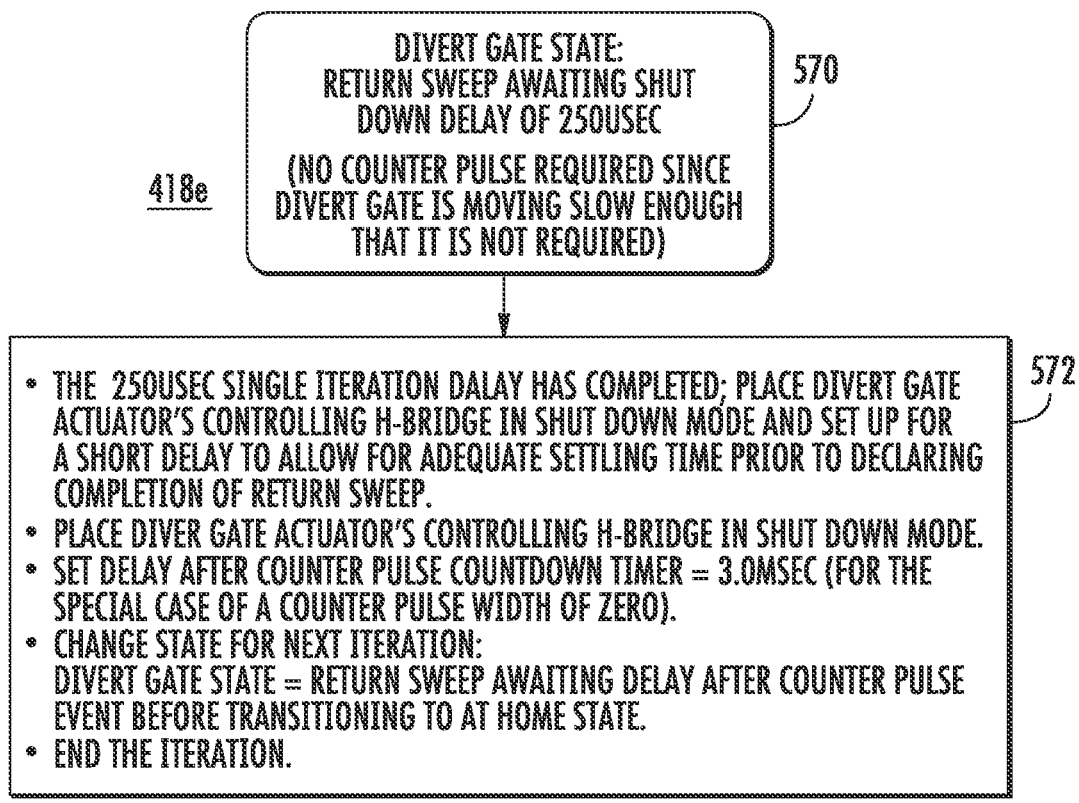
Figure 18P:
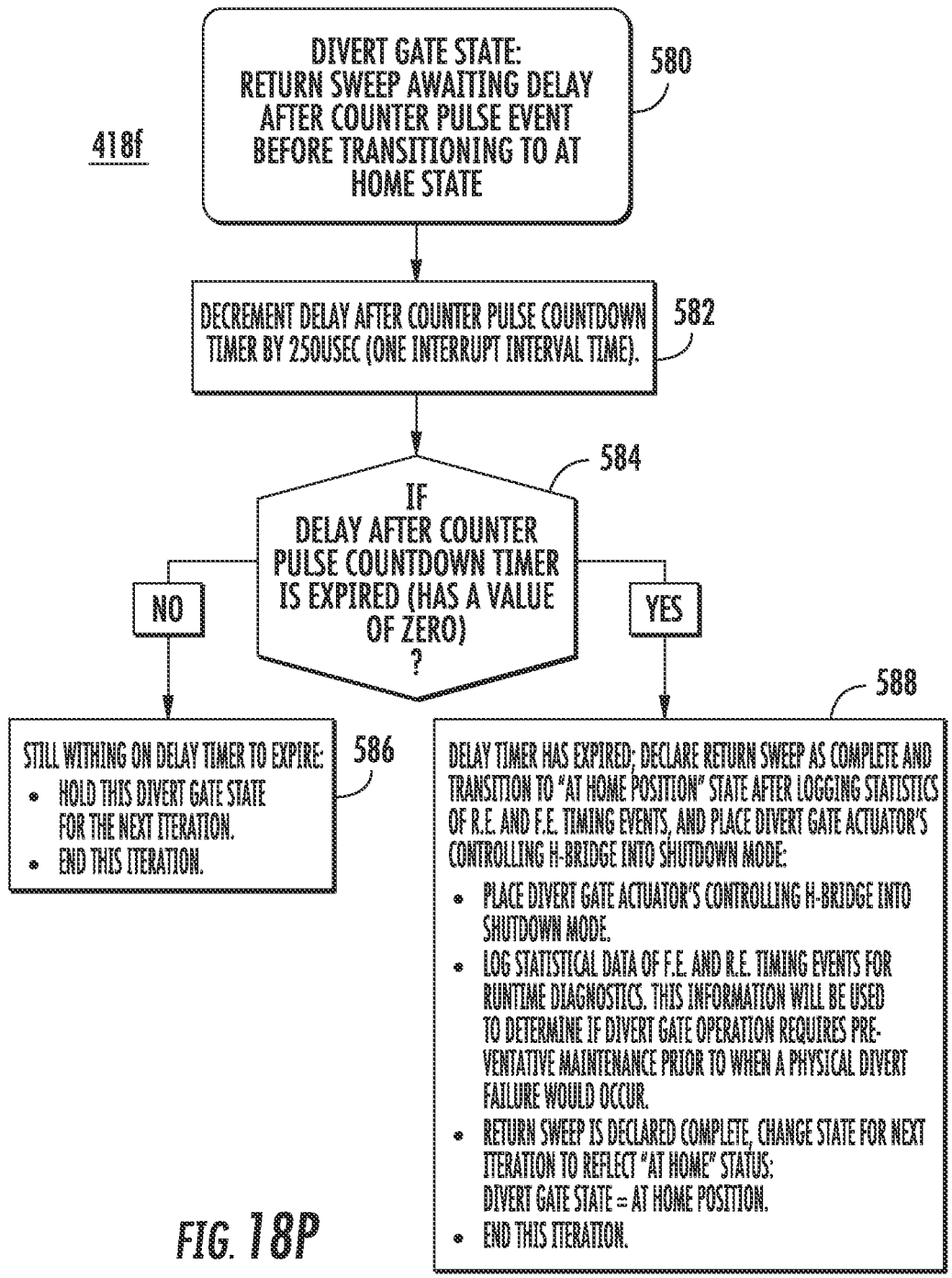
Figure 18Q:
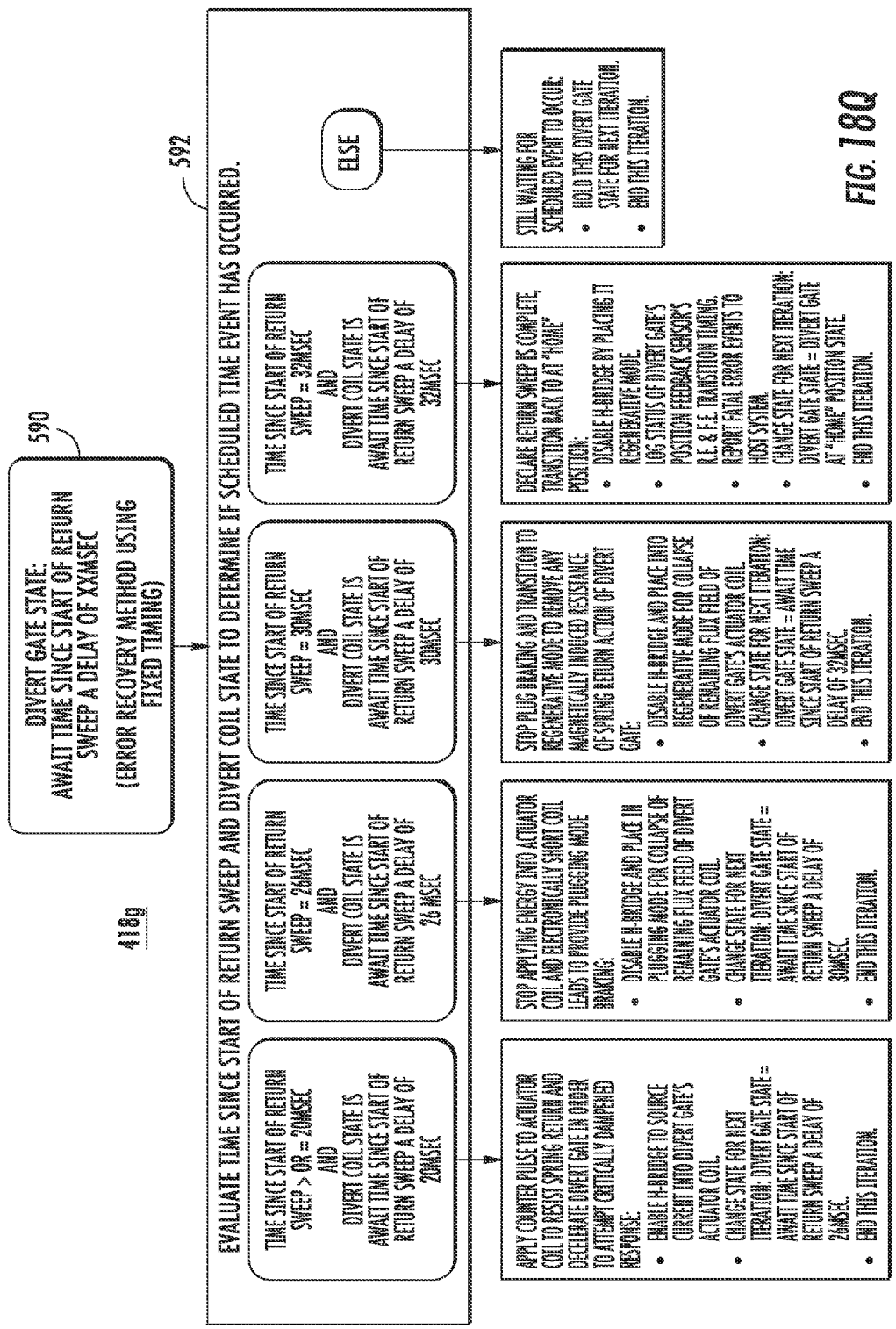

A divert control program 400 runs on microprocessor 306. In the illustrative embodiment, program 400 is an interrupt driven routine that is carried out repetitively according to an interrupt signal generated, for example, every 250 ms (FIGS. 18a-18q). When an interrupt occurs (402), the program polls all of its inputs (404) and evaluates the current state of the inputs (406) for use in the program's subsequent evaluation in a gate control state machine (410a, 410b . . . 410n). After performing additional housekeeping tasks (408), program 400 then accesses the gate control state machines (410a, 410b . . . 410n). One state machine is provided and managed per interrupt interval for ea diverter 43.

State machine 410a accesses different portions of program 400 depending upon whether diverter 43 is in a home position (412), undergoing an activation sweep to the divert position (414, 414a . . . 414d), at the divert position (416), or undergoing a return sweep to the home position (418, 418a . . . 418g).

When in home state 412 and at the home non-divert position (420), the program determines if the state of proximity sensor element 84 monitors flags 86a and 86b to confirm that the divert gate is within the range of home position (422). If so, it is determined if an activation sweep trigger event is activated (424). If not, the program retains state 420 for re-evaluation on subsequent interrupts until the activation sweep trigger event occurs (428). The present iteration of this state machine (410a) is ended, allowing the processor to progress through the state machine associated with the other gates (410b . . . 410n). If it is determined at 424 that a state activation sweep trigger event has occurred, a sweep activation is initiated by sourcing current to actuator 76 (426) and the state machine is advanced for the management of the activation sweep on the next interrupt driven iteration of this gate's state machine. The current iteration of this state machine is ended.

If it is determined at 422 that proximity sensor 84 does not confirm that the gate is at a home position, it is determined if the divert station is in the automatic divert mode (430). If so, it is concluded that a fatal error event has been detected during an automated mode which results in an error indication in line 334 and a lockout of future automated activation of this gate until examined by a maintenance technician (432). This prevents the "begin activation sweep trigger event" from activating while in the automatic mode. If it is determined at 430 that the divert station is not in an automated divert mode, it is concluded that the station is in a maintenance mode and the gate will be allowed to be activated in subsequent iterations (434). The current iteration of state machine (410a) is ended. For all process blocks within the flowchart that contains an end iteration statement, this is the means by which the program suspends the state of the present divert gate state machine, progress through the state machines associated to the other gates until all have been processed, and then finally exits the interrupt routine to await for the next 250 microsecond interrupt event to occur.

When the gate control state machine 410a changes to the activation sweep sub-state 414, the program retains this sub-state (436) for a fixed period of time, such as 10 ms in the illustrated embodiment. While this state is active (the duration of the predetermined period), current is sourced to the gate's actuator coil to actively drive the gate towards the divert position (actuation signal 320 of FIG. 17b). It is also expected that, during this early stage of the activation sweep, the associated gate sensor element 84 will continue to indicate that the gate is in the range of the home position (438). If not, an error flag is set and that divert gate is disabled from future activation (440). However, the current activation will be completed. The unexpected change in status that was reported within this early stage of activation is an indication that the gate position sensor is defective or misaligned and thus cannot be trusted. An internal flag is set such that when the predetermined activation pulse time is completed (444, 446), control of the activation sweep will transition to the fixed error recovery timing method (450). Otherwise, at the end of the activation pulse, the control transitions to use the dynamic gate position feedback method (448).

For each interaction of this sub-state (414), the program entered at point 436 and both the gate position status reported (438) by sensor element 84 and the internal timer (442) are evaluated once per iteration until it is determined at 442 that the timer has expired resulting in the flag being set at 444, and the internal error flag (446) being set during the time since the start of the activation sweep. If the flag is set (450), the state machine is advanced to use the fixed timing error recovery method (sub-state 414d). If not, the state machine is advanced to use the dynamic gate position feedback method (sub-state 414a). In either case, in this embodiment, both transitions result in control of the gate actuator coil (302) to be placed in the plugging mode which will begin the flux dissipation interval 322. This has the effect of decelerating the gate's movement towards the divert position.

When the sub-state 414c is active (within the dynamically controlled method sequence of gate activation control), the program will begin processing the gate state machine at point 484 on each iteration of 410a. It begins by testing if the delay timer has expired (486). If so, the delay after the R.E. event is complete (490) and the H-bridge drive circuit 304 to the divert gate's actuator coil 302 is re-enabled to source the hold current 324 (if not already done so in process block 480 of FIG. 18e). The state machine then declares the "Activation Sweep Complete" and transitions to the "Divert Position" state for the next iteration (transition to major state 416 for the associated divert gate). If not, then the present sub-state machine is held (414c) for re-evaluation on the next interrupt driven iteration (488).

If an error flag was set during the activation sweep sequence (sub-states 414, 414a, or 414b) the program would have transitioned to the appropriate staging within the error recovery sub-state 414d, after setting the appropriate internal error flags and control of the divert gate's drive circuit, in order to cleanly recover from the associated error event. When the error recovery sub-state is active on each interrupt driven evaluation interval, the program enters at point 492 and then the time since start of activation sweep is checked and performs the appropriate action in accordance with the scheduled timing events (494) for the control of the drive circuit until completion of the activation sweep is declared and the state machine is finally advanced to the Divert Position State (416).

Upon completion of the activation sweep state 414, gate control state machine 410a enters the "Divert Position" state 416. While this state is active, it is expected that the gate will hold the divert position because the hold current 324 should maintain the gate in the divert position against the return spring 332 action; until such time that a "begin gate return sweep trigger" event has occurred. To that end, the program enters at point 495 on each iteration of 410a when the 416 state is active. It then determines (496) if the "begin gate return sweep trigger" event has occurred. If not, it is then determined if the divert gate position feedback sensor 84 indicates the gate is at the divert position (497). If it is, the program retains the Divert Position state (416) for re-evaluation on subsequent iterations until an occurrence of a return activation event occurs (498). If it is determined at 497 that the gate position feedback sensor is not reporting the divert position, then unexpected divert gate movement has occurred.

The severity of the error reporting is dependent on whether the divert station is in Automatic Divert mode or not (500). If the divert station is set to a maintenance mode (504), then the error reporting is local and the "begin gate return sweep request" will be initiated by the service personal's manual mode override control (this means in which maintenances mode was activated by service personal). If it is determined at 500 that the divert station is in the automated divert mode, it is then determined that a fatal event has occurred (502). An error flag is set, a "begin gate return sweep request" is issued, and automatic activation of the gate is locked out until reset by an operator or the host system. In either case, if the divert mode is determined at 500, the divert position state is retained until the "begin gate return sweep request" is synchronized with slat position timing for the "begin gate return trigger event" to be activated and subsequently evaluated of the gate's state machine 410a. The state machine then advances to the return sweep state 418.

If it is determined at 496 that the "begin gate return sweep trigger" event is active, then it is determined if the gate position feedback sensor 84 is indicating that the gate is at the divert position (506). If not, it is concluded that an unexpected timing event has occurred and that the program cannot deem the output of sensor 84 to be reliable (508). An error flag is set and future activation is disabled until reset.

If it is determined at 506 that the gate position feedback sensor is indicating the gate is in the divert position, the dynamic gate position feedback technique is initiated during the return sweep state by setting an internal flag (512). In either case (508, 512), the process block 510 will be executed and the return sweep state 418 is initiated by the activation of a demagnetization pulse (326). The skilled artisan will recognize that a demagnetization pulse is not strictly required and that the regenerative mode could be used in its place for the initial portion, such as the first 8 ms, of the return sweep sequence. The advantage of a demagnetization pulse is that it more efficiently depletes residual magnetism within the coils core over that of the regenerative mode. This advantage becomes more significant in shortening the return sweep action as the inductance value and/or size of the core of a chosen core (302) becomes larger. However, the demagnetization pulse 326 is optional and may not be necessary for small core and low inductance values of coil 302.

The transition from divert position state (416) in this embodiment will always begin the return sweep by initiating the demagnetization pulse thus the transition is to sub-state 418 where the control of the demagnetization pulse is managed using fixed timing (time pre-determined to maximize the performance of the chosen coil 302).

When the sub-state demagnetization (418) is active, the program will begin processing at point 512. On each iteration of 410a, it will then begin (514) the evaluation of the divert gate's feedback sensor element 84 to verify that the gate remains in the range of the divert position (flag 86a being seen by sensor element 84) for the first 10 ms of the time since the start of the return sweep. If not, it will flag the fixed error recovery timing method that is used on the transition out of this sub-state. After the evaluation of the feedback sensor, the evaluation of the "time since start of return sweep" is made to sequence the driver circuit through its required stages, at the appropriate time intervals, in order to generate the desired demagnetization pulse (516). The demagnetization sub-state is held for re-evaluation on subsequent intervals until the 10 ms event becomes active; at which point, the internal error flag that would have been set if unexpected gate movement was seen is used to select between one of two sub-state transitions. If gate movement was seen, then it is concluded that the sensor element 84 cannot be trusted and fixed return sweep error recovery timing must be used (transition to sub-state 418g with the "Await Time Since Start of Return Sweep A Delay of 20 ms" flagging activated). Otherwise, use the dynamic gate position feedback method by transitioning to await the falling edge (F.E.) event from the sensor 84.

If the return sweep sub-state 418a is activated, the program will begin processing the gate state machine at point 518 on each iteration of the divert gates state machine (410a). It will then be determined if the falling edge (F.E.) event of sensor element 84 has occurred (520). If so, the F.E. event has occurred within the expected timing window (522) and the dynamic timing sequence can continue by transitioning for the next iteration to await on the rising edge (R.E.) event (transition to sub-state 418b). If it is determined at 520 that the F.E. event did not occur, then it is determined (524) whether the time since the beginning of the returning sweep has exceeded the expected F.E. window (20 ms for the illustrated embodiment). If not, the program retains the present sub-state for re-evaluation on subsequent iterations (526). If it is determined at 524 that the time since the start of the return sweep has exceeded the expected F.E. window, the appropriate error flags are set and the state machine transitions (528) to the fixed return sweep error recovery timing sub-state (418g).

If the return sweep sub-state 418b is activated, the program will begin processing the gate state machine at point 530 on each iteration of divert gates state machine (410a). It is then determined if the R.E. event of sensor element 84 has occurred (532). If so, the R.E. event has occurred within the expected timing window (534) and the dynamic timing sequence can continue by calculating the velocity associated to the gates movement; which is inversely proportional to (R.E.-F.E) event timing relative to the start of the return sweep. It is then determined if the gate velocity is fast enough to require a de-actuation signal 330 to provide deceleration (536). If it is determined at 536 that additional deceleration is required, a delay of 1.5 ms is initiated and the width of the counter pulse is calculated inversely proportionally to the prior calculated gate return velocity (540). The state machine is then transitioned to manage the remaining control sequence (transition to sub-state 418c to await the expiration of the 1.5 ms delay). If it is determined at 536 that the gate was moving slowly enough that a de-actuation signal is not required, then preparations are made to transition the H-bridge driving circuit from the plugging mode into the regenerative mode (538). This is done by transitioning to the sub-state 418e for the next iteration of 410a. If it is determined at 532 that the R.E. event did not occur, then it is determined at 542 whether or not the time since the beginning of the returning sweep has exceeded the expected R.E. window (30 ms for the illustrated embodiment). If not, the program retains the present sub-state for re-evaluation on subsequent iterations of 410a (544). If it is determined at 542 that the time since the start of the return sweep has exceeded the expected R.E. window, it is declared that the gate return movement is outside acceptable limits and a fatal error has occurred (546). The appropriate error flags are set and the state machine transitions to the fixed return sweep error recovery timing sub-state with no de-actuation signal to be applied (transition to sub-state 418g).

If the return sweep sub-state 418c is activated, the program will begin processing the gate state machine at point 550 on each iteration of divert gates state machine (410a). It will decrement the associated delay after R.E. event countdown by the interrupt interval time (552) and determine if the delay time has then expired (554). If not, the present sub-state is held for re-evaluation on subsequent intervals of 410a until the timer expires (556). If the determination of 554 is that the delay timer has expired then the H-bridge drive circuit 340 is energized to generate the counter pulse 330 and transition to the sub-state to await the expiration of the timer controlling the width of the counter pulse (558) (transition to sub-state 418d).

If the return sweep sub-state 418d is activated, the program will begin processing the gate state machine at point 560 on each iteration of divert gates state machine (410a). It will decrement the associated Counter Pulse Width Countdown Timer by the interrupt interval time (562) and determine if the pulse width time has then expired (564). If not, the present sub-state is held for re-evaluation on subsequent intervals of 410a until the timer expires (566). If it is determined at 564 that the pulse width timer has expired, then the H-bridge drive circuit 340 is placed in plugging mode to lightly resist the springs return action and complete the critically dampening effect of gate motion (568). A short delay is initiated to provide the gate to physically complete return to the "HOME" position. The state machine transitions to sub-state 418f to wait on the expiration of this short delay (3 ms in the illustrated embodiment).

If it was determined at 438 that no de-actuation signal was required, the sub-state 418e is activated to perform the housekeeping task of setting the H-bridge driver circuit 304 into shutdown mode. This is a single iteration sub-state and, as such, will result in a 250 microsecond delay (570) prior to performing the control housekeeping of the H-bridge and initiating a delay, such as 3 ms, to provide adequate physical time for the gate to reach the "HOME" position (572). The delay countdown is initiated by block 572 concluding by transitioning to sub-state 418f to wait on the expiration of the delay.

If the return sweep sub-state 418f is activated, the program will begin processing the gate state machine at point 580 on each iteration of divert gates state machine (410a). It will then decrement the associated delay countdown timer by the interrupt interval time (582) and determine if the delay time has then expired (584). If not, the present sub-state is held for re-evaluation on subsequent intervals of 410a until the timer expires (586). If it is determined at 584 that the delay has expired, then the H-bridge drive circuit 340 is placed in shutdown mode, internal housekeeping is preformed, and the return sweep is declared complete (588). The state machine transitions to the "Home" position state of 412.

If an error was detected during the return sweep's sub-states (418, 418a . . . 418c), then the state machine would have transitioned to the error recovery sub-state 418g. When this sub-state is activated, the program will begin processing the gate state machine at point 590 on each iteration of divert gates state machine (410a). It will then perform the associated fixed timing event to control of the H-bride drive circuit to complete the return sweep (592). Once the "time since start of return sweep" is evaluated to be 32 ms, the return sweep is declared complete and the associated housekeeping is preformed, and the state machine transitions to the "HOME" non-divert state of 412 with the error signal 334 being active.

Thus, it is seen that program 400 achieves stability through critical damping of the motion of gate 72 during actuation by an activation control signal. The activation control signal includes a flux dissipation period 322 that allows biasing spring 332 to apply a braking force to the gate after a predetermined time of applying actuation signal 320. The program then monitors digital feedback of gate position sensor 84. The time delay within expected timing windows between the first falling edge (F.E.) and rising edge (R.E.) of the signal produced by proximity sensor 84 sensing flags 86a, 86b is used to determine a relative rotational velocity of the gate activation sweep to determine dynamically when to apply gate hold signal 324 to give critical damping to the mechanical activation response. For the case of the return sweep, since it is achieved by the action of biasing device 332, return control signal 325 includes applying de-actuation signal 330 to decelerate the action of the gate. Again, the time measurement of the falling edge and rising edge of the signal produced by gate sensor 84 that occur within an expecting timing window are used to determine the relative velocity of the gate during the return sweep. This timing measurement is used to determine a time offset and duration of de-actuation signal 330 to provide critical damping to mechanical control of the gate. In addition, during the start of the return sweep phase, an optional demagnetization pulse 326 may be used to quickly remove any residual magnetic flux within the inducted core of the actuator. This translates into improved response at the start of the gate return sweep.

The monitoring of the rising edge and falling edge of gate position sensor 84 may also be used to determine overall operation performance of the movement of the gate. This information may be used to detect any degradation in performance and statistically determine if preventative maintenance is required prior to an actual failure of the diverter. At a higher level of system control, this information may be used to determine a maximum speed that sorting may be carried out by sorter 30 or to allow the associated sortation destination lane to be disabled until repairs are made.

In the illustrated embodiment, actuator 76 is a slightly modified version of a commercially available brushless torque actuator that is marketed by Sala-Burgess, Inc. under Model DTA-5 Series. However, other forms of rotary solenoids may be used.

Also, certain aspects of the disclosed embodiments may be used with other forms of actuators. For example, although illustrated for use with a rotary actuator that rotates a gate in order to change states, actuation system 300 and divert control program 400 may be used with other forms of actuators, such as linear actuators that move in a line between states. Certain aspects may also be used with other forms of actuation, such as pneumatic actuation, hydraulic actuation, and the like. Also, the actuator may be used for other control operations than moving a diverter gate through a sweep motion and may be used in other applications besides sorters. Although sensor 84 monitors portions of the gate to determine movement of the gate, it should be understood that various encoders can be positioned on the gate shaft, the actuator shaft, or the like.

Figure 20:
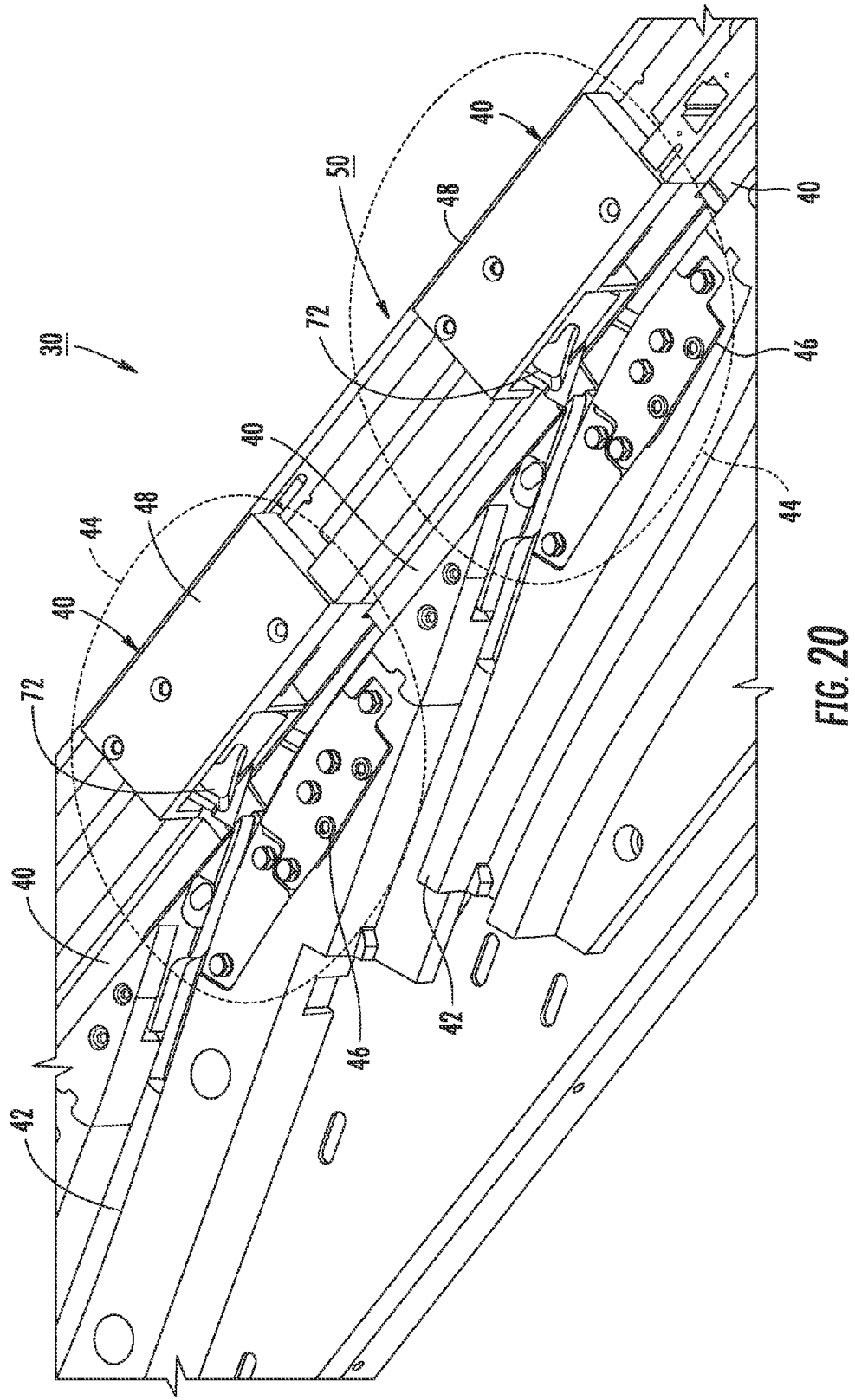
FIG. 20 is a perspective view of a diverter assembly having redundant diverters with the mechanical diverters shown in a non-diverting state.
Figure 21:
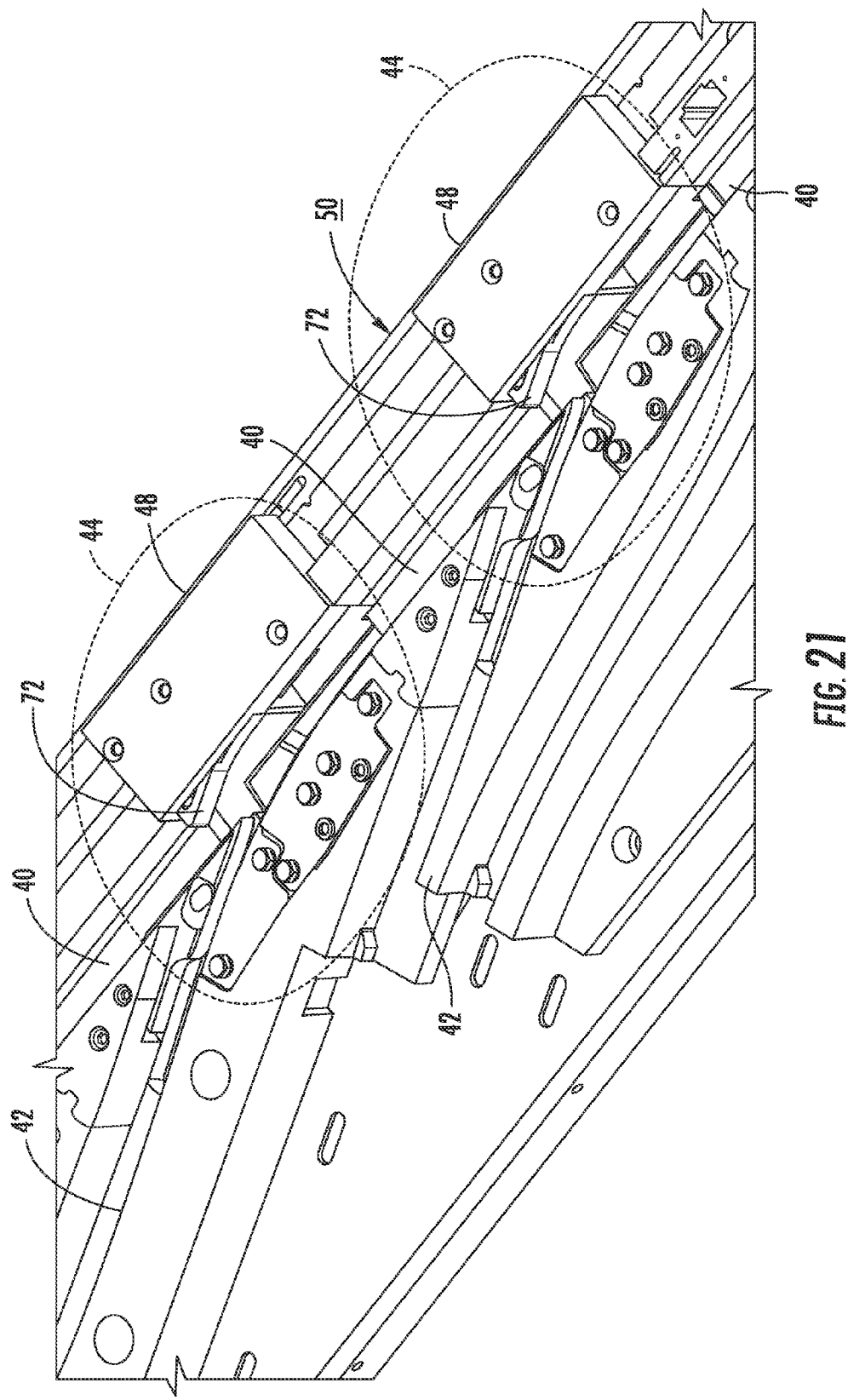
FIG. 21 is the same view as FIG. 20 with the mechanical diverters shown in a diverting state.
Figure 22:
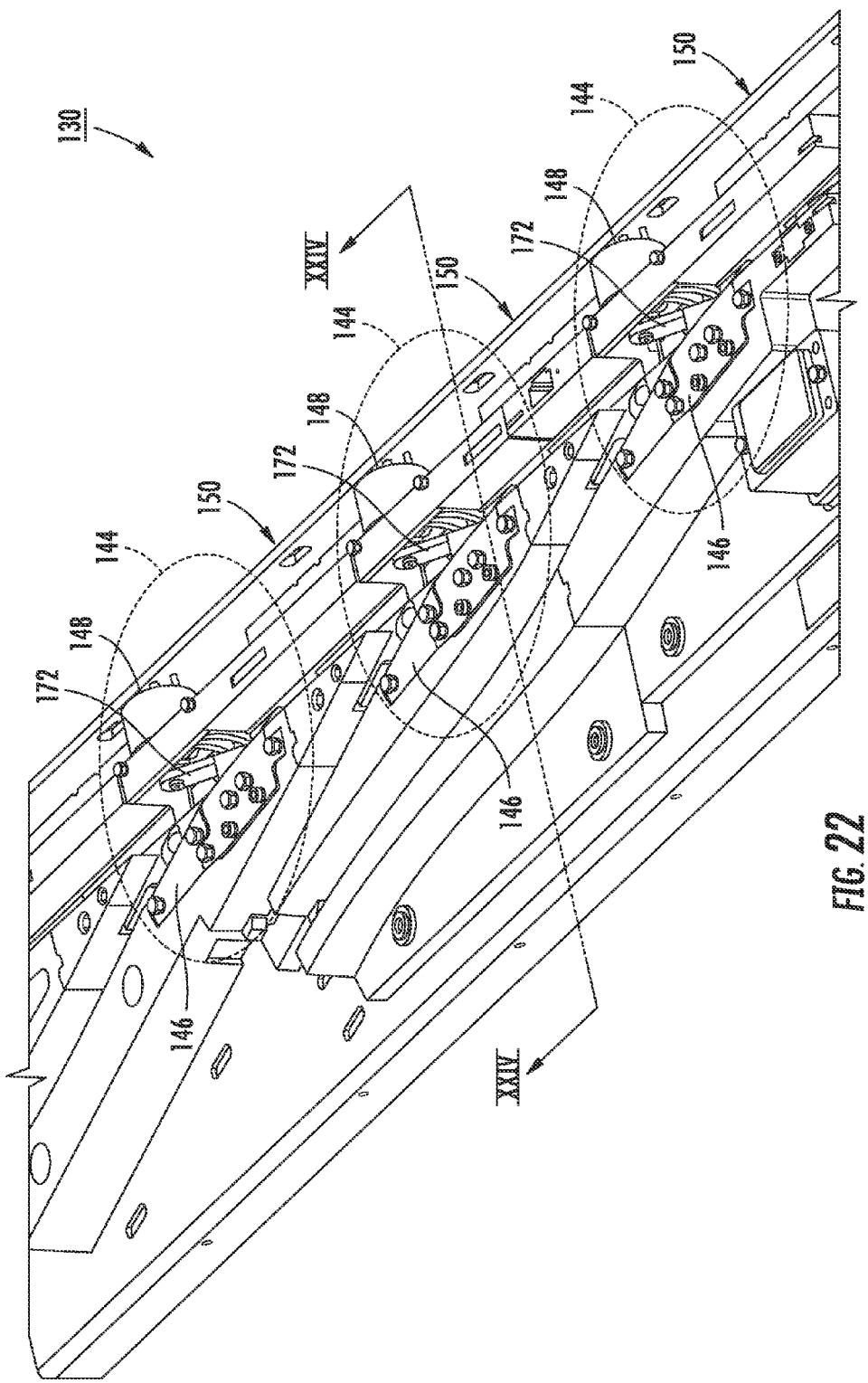
FIG. 22 is the same view as FIG. 20 of an alternative embodiment thereof.
Figure 23:
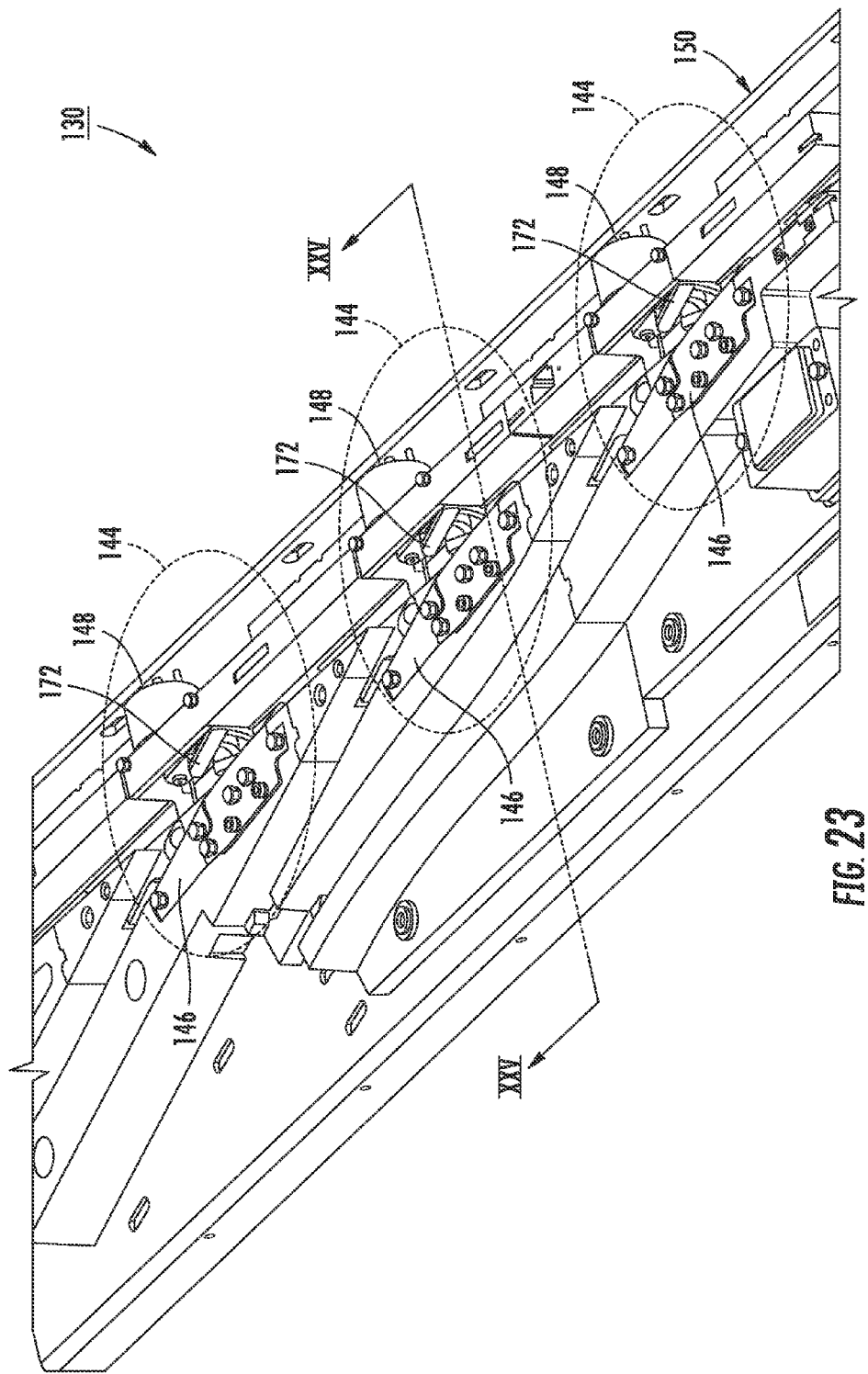
FIG. 23 is the same view as FIG. 22 with the mechanical diverters shown in a diverting state.
Figure 24:
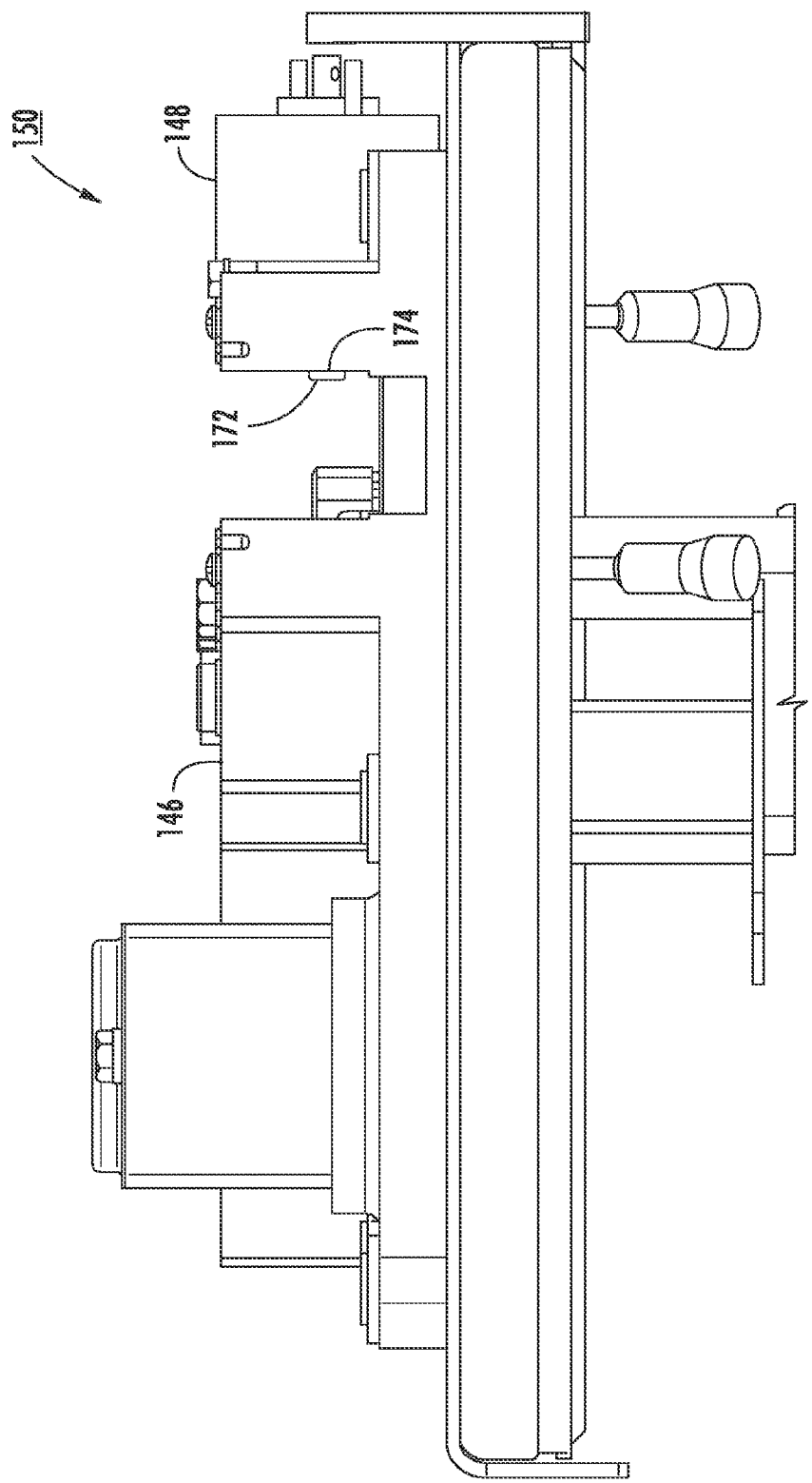
FIG. 24 is a sectional view taken along the lines XXIV-XXIV in FIG. 22.
Figure 25:
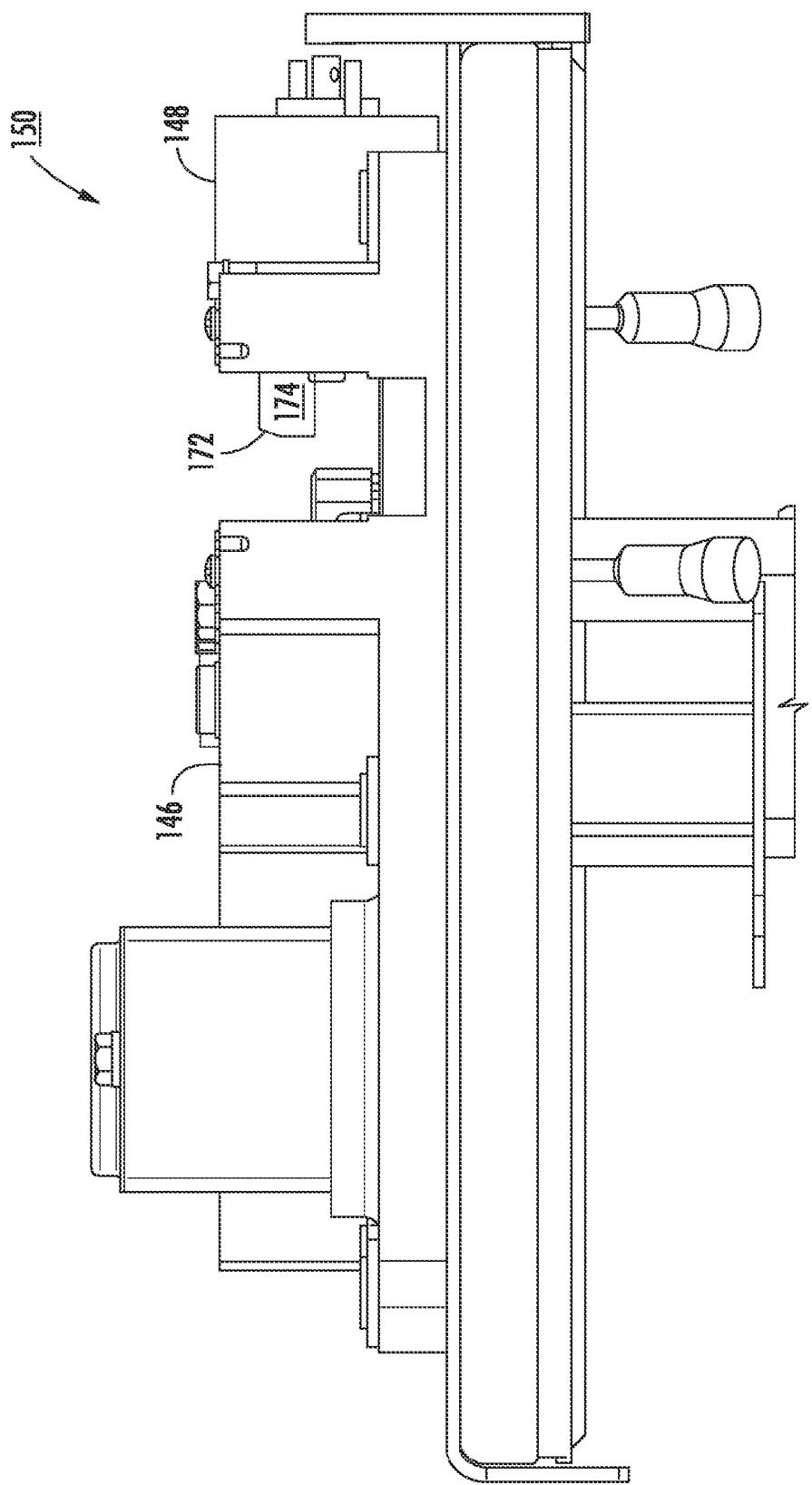
FIG. 25 is a sectional view taken along the lines XXV-XXV in FIG. 23.

Diverter 43 may be used in a diverter assembly 44 as a redundant diverter 48 in combination with another diverter 46, such as an electromagnetic diverter (FIGS. 20 and 21). Each redundant diverter 46, 48 is capable of selectively diverting one or more diverting members 39 from non-diverting path 40 to the associated diverting rail 42.

In the illustrated embodiments, first redundant diverter 46 is a magnetic diverter that utilizes magnetic force to at least partially divert the diverting members 39 in a diverting state from non-diverting path 40 to the associated diverting rail 42. An example of such a magnetic diverter that utilizes only magnetic force is disclosed in U.S. Pat. No. 5,409,095, the disclosure of which is hereby incorporated herein by reference. An example of such a magnetic diverter that initiates the divert magnetically, but completes the divert mechanically, is disclosed in commonly assigned U.S. Pat. No. 6,615,972, the disclosure of which is hereby incorporated herein by reference.

An advantage of the combination of redundant diverters for diverter assembly 44 is that, if the divert is carried out magnetically by the first redundant diverter 46, the divert may be quieter because there is minimal impact between diverting member 39 and diverter 46. However, second redundant diverter 48 is available to divert the diverting member, if for any reason the divert is not carried out by the first redundant diverter 46. This may be particularly useful in circumstances where increased friction between pusher shoes 38 and slats 36 may make diverting of the pusher shoes difficult to initiate. In the illustrated embodiment, both first and second redundant diverters 46, 48 are actuated for each divert, as will be described in more detail below. However, the skilled artisan will appreciate that the second redundant diverter may be actuated only under circumstances where the first redundant diverter fails to carry out a desired divert.

Electronic divert control 56 may have a first driver circuit 304 that selectively actuates first redundant diverter 48 and a second driver circuit 304 that selectively actuates second redundant divert 48. In one embodiment, both first and second driver circuits are operated together to ensure that if diverter 46 does not carry out the divert, diverter 48 will. In another embodiment, the first driver circuit 304 may operate as a master control and the second driver circuit 304 may operate as a slave control that responds to operation of the first driver circuit. In this embodiment, the first driver circuit would respond to a signal from slat sensor 61a and/or pin sensor 61b in order to initiate the divert and a divert sensor (not shown) to indicate that a divert occurred. In this embodiment, the second driver circuit responsive to the first driver circuit carries out the divert if the first driver circuit indicates that a divert did not occur. In this manner, second redundant diverter 48 is actuated only if first redundant diverter 48 fails. Thus, in either embodiment, diverter assembly 44 is capable of exceptionally reliable operation.

In an alternative embodiment, a positive displacement sorter 130 includes a diverter module 150 made up of a plurality of divert assemblies 144 having a first redundant diverter 146 and a second redundant diverter 148 (FIGS. 22-29). Second redundant diverter 148 may be in the form of a mechanical diverter 170 with a rotary actuator 176 having a generally horizontal axis generally laterally oriented (FIGS. 22-29). In particular, rotary actuator 176 has a laterally oriented shaft 196 that is generally perpendicular to the motion of the web (not shown) of sorter 130. It should be understood that although illustrated as a redundant diverter, mechanical diverter 170 may be used as a standalone diverter in the manner previously described.

Figure 26:
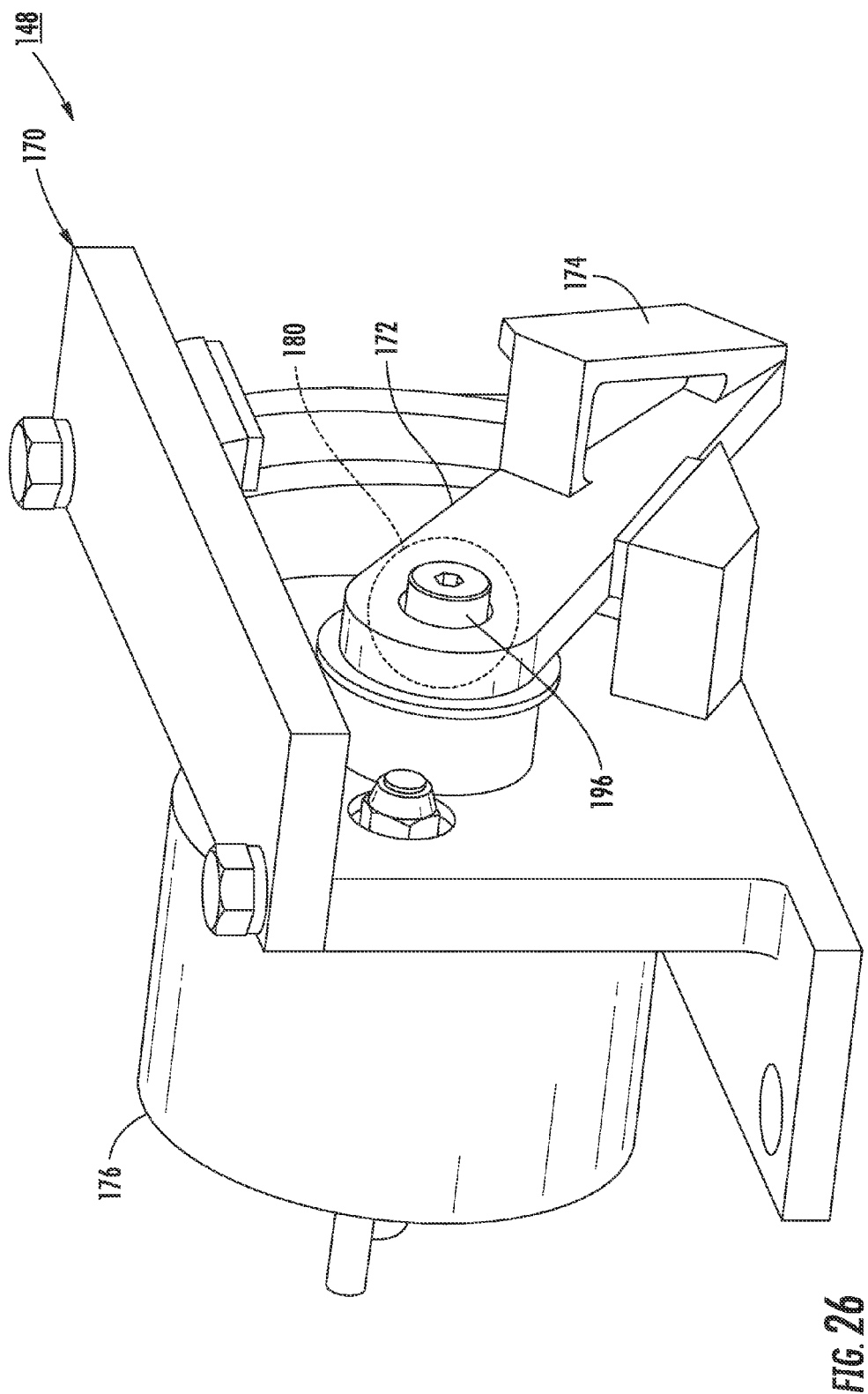
FIG. 26 is a perspective view of a diverter from the diverter assembly illustrated in FIG. 22 in a non-diverting state.
Figure 27:
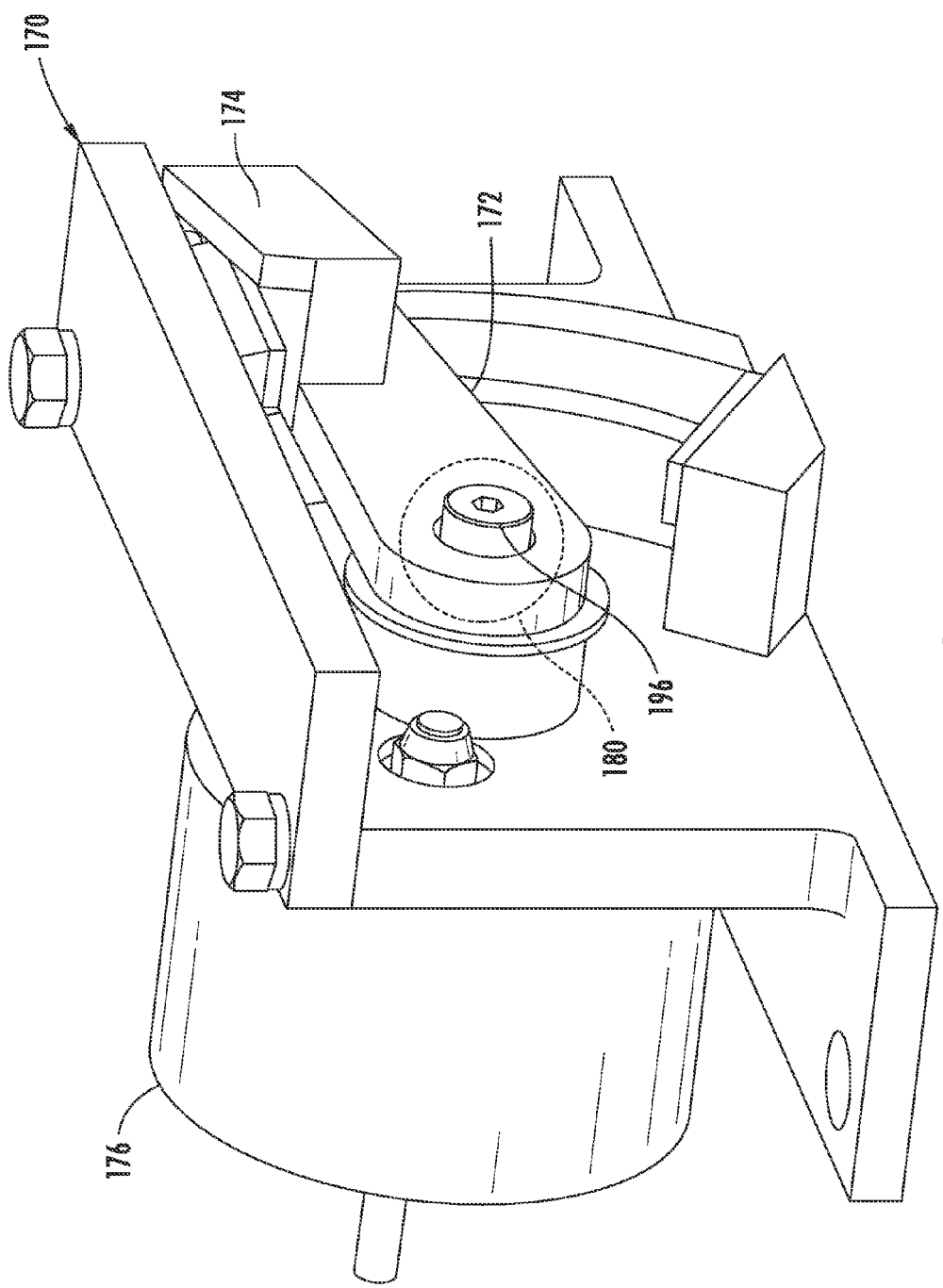
FIG. 27 is the same view as FIG. 26 with the diverter in a diverting state.
Figure 28:
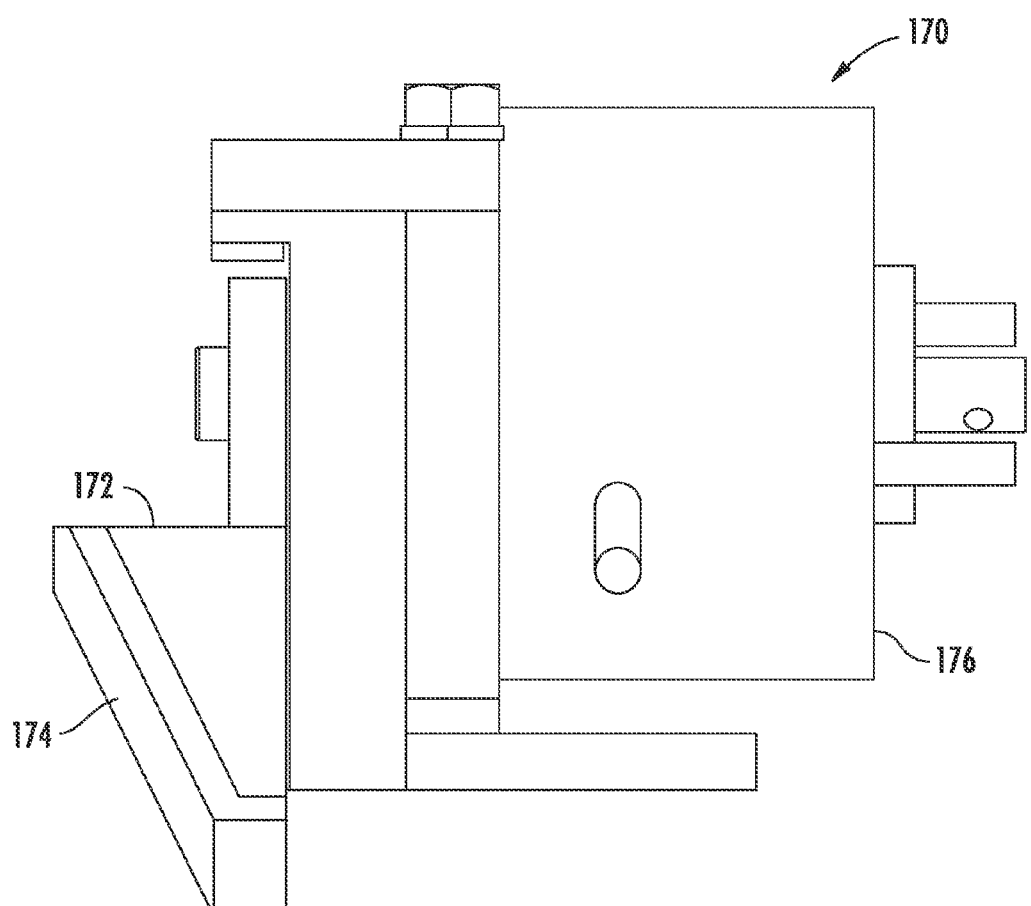
FIG. 28 is an end elevation of the diverter and in the diverting state in FIG. 26.
Figure 29:
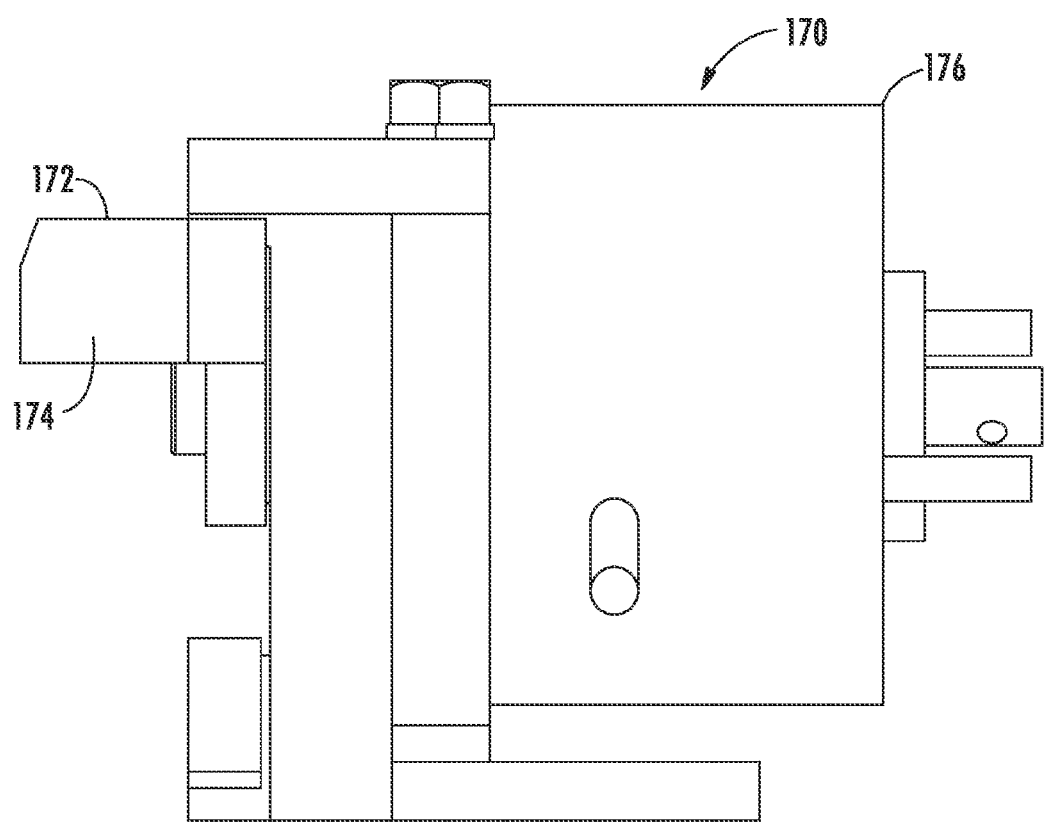
FIG. 29 is the same view as FIG. 28 of the diverter in the diverting state in FIG. 27.

Mechanical diverter 170 includes a gate 72 that is rotatable between a non-diverting orientation, illustrated in FIGS. 26 and 28, and a diverting orientation, illustrated in FIGS. 27 and 29. Gate 172 defines a diverting surface 174 that diverts diverting members 39 when in the diverting orientation. Diverter 170 may further include a slip joint 180 in the form of an elongated slot and paddle in the slot that allows relative movement of gate 172 with respect to the shaft of rotary actuator 176. Gate 172 is configured to position diverting surface 174 to engage bearing 52 of diverting member 39 when in the diverting orientation. Thus, in a similar manner to mechanical diverter 70, diverter 170 is capable of diverting a rotatable body thereby reducing wear on diverting surface 174.

In another alternative embodiment of positive displacement sorter 230 includes a diverter module 250 made up of a plurality of diverter assemblies 244, each having a first redundant diverter 246 and a second redundant diverter 248 (FIGS. 30-36). Second redundant diverter 248 may be in the form of a mechanical diverter 270 with a gate 272 and a rotary actuator 276 having a generally horizontal axis that is at an angle to the longitudinal direction and to the lateral direction of the sorter. In particular, rotary actuator 276 has a shaft 296 that is at an angle to the motion of the web (not shown) of sorter 230. It should be understood that although illustrated as a redundant diverter, mechanical diverter 270 may be used as a standalone diverter.

Figure 30:
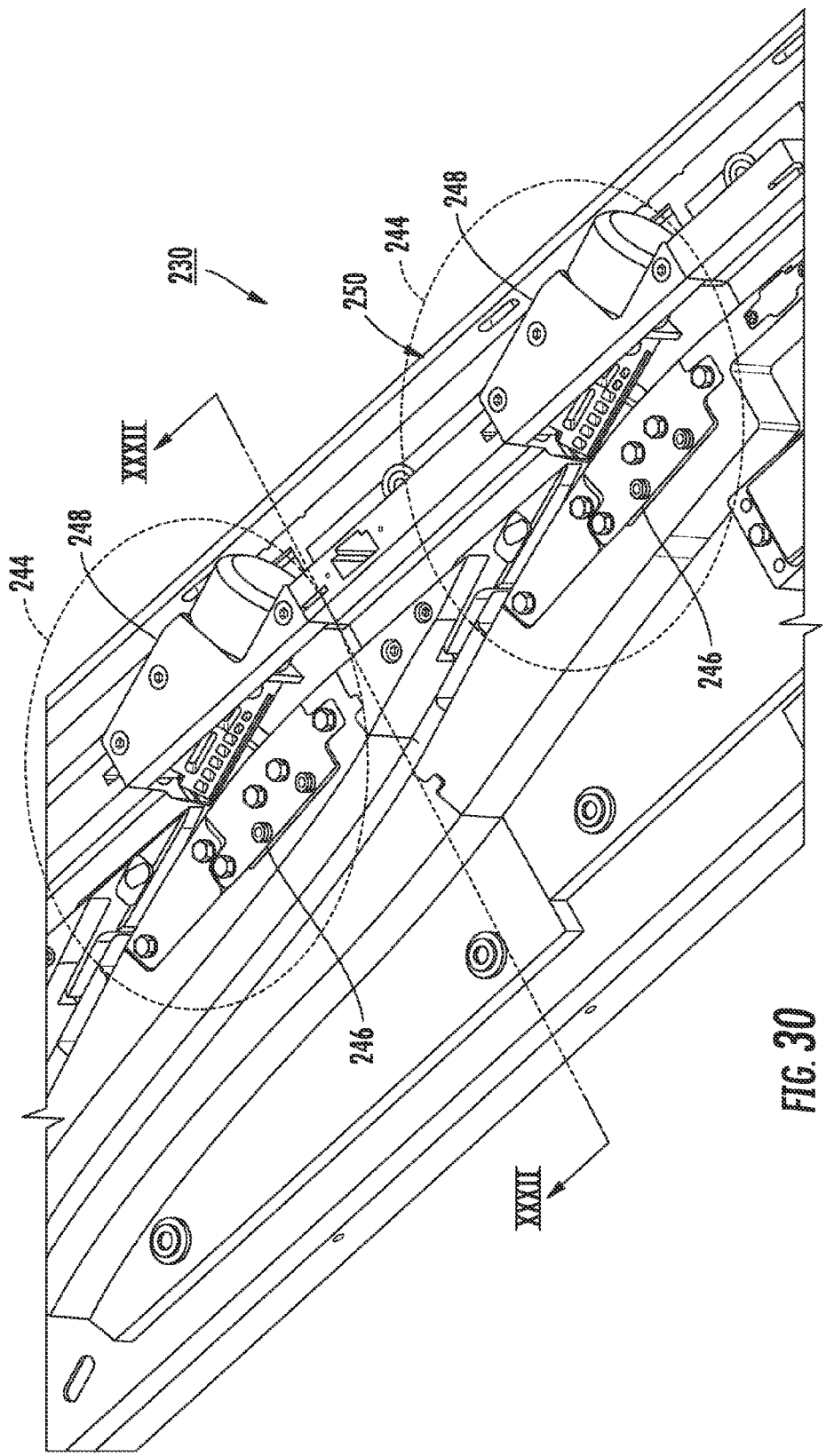
FIG. 30 is the same view as FIG. 20 of another alternative embodiment thereof.
Figure 31:
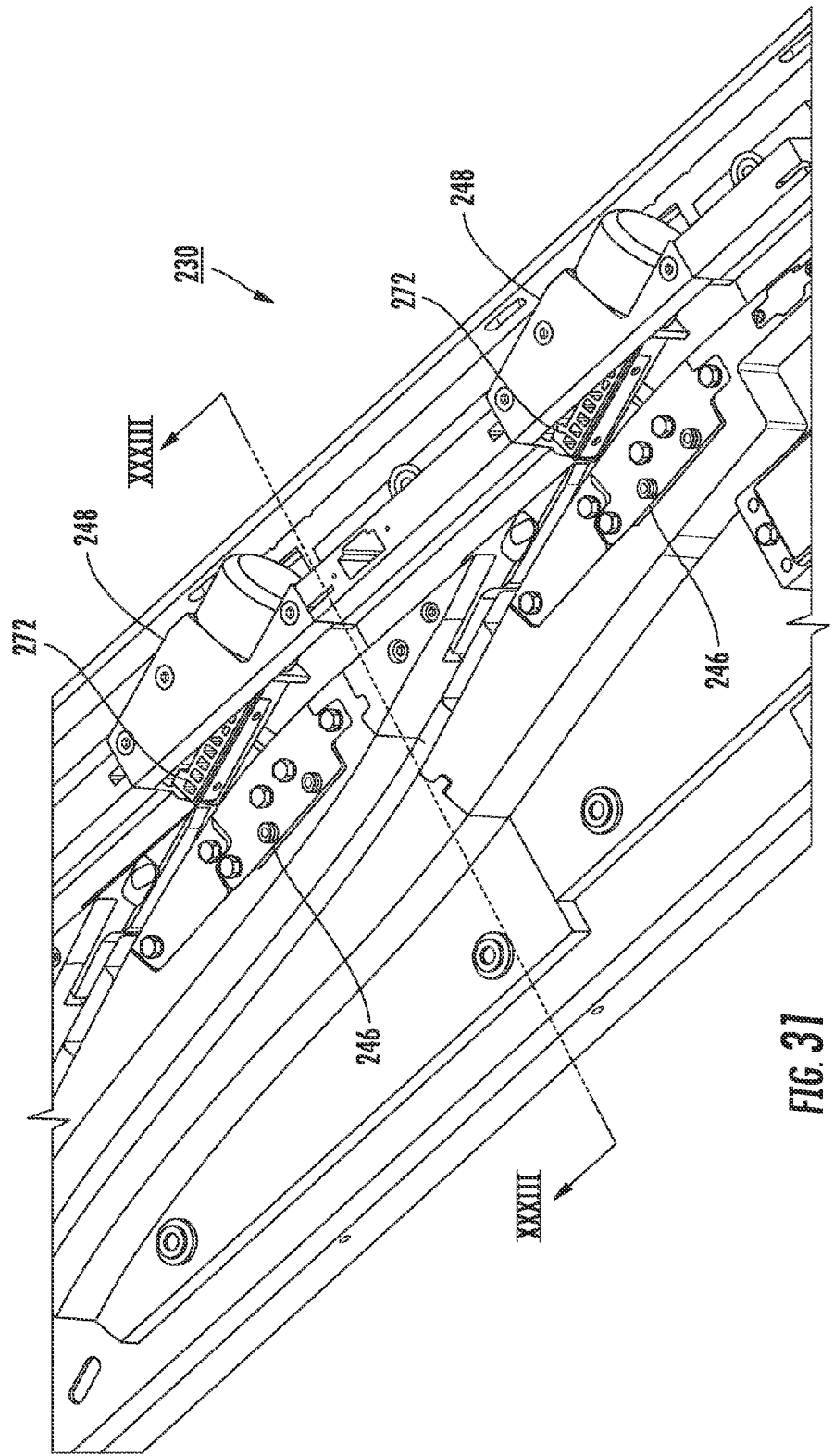
FIG. 31 is the same view as FIG. 30 with the mechanical diverters shown in a diverting state.
Figure 32:
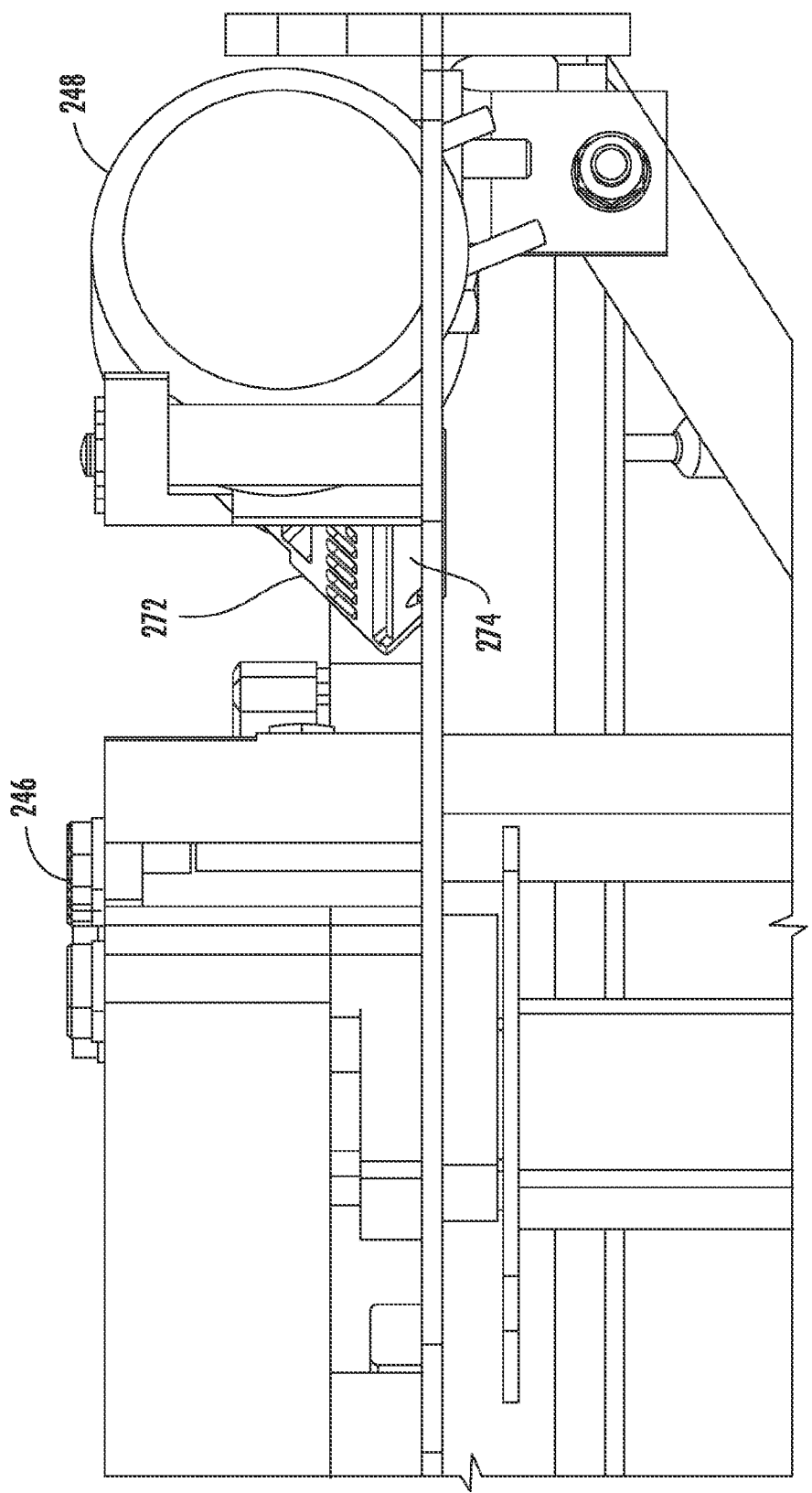
FIG. 32 is a sectional view taken along the lines XXXII-XXXII in FIG. 30.
Figure 33:
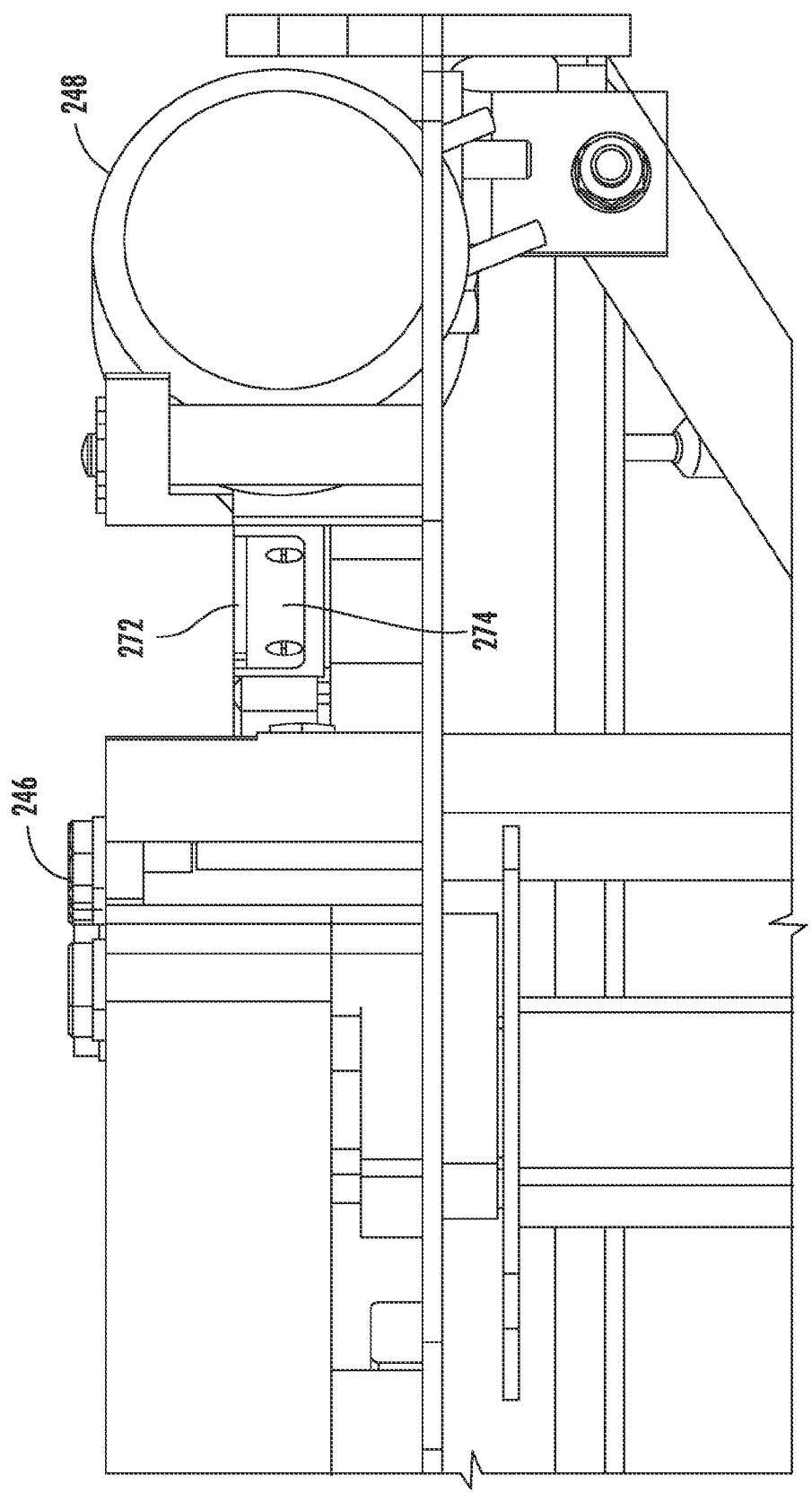
FIG. 33 is a sectional view taken along the lines XXXIII-XXXIII in FIG. 31.
Figure 34:
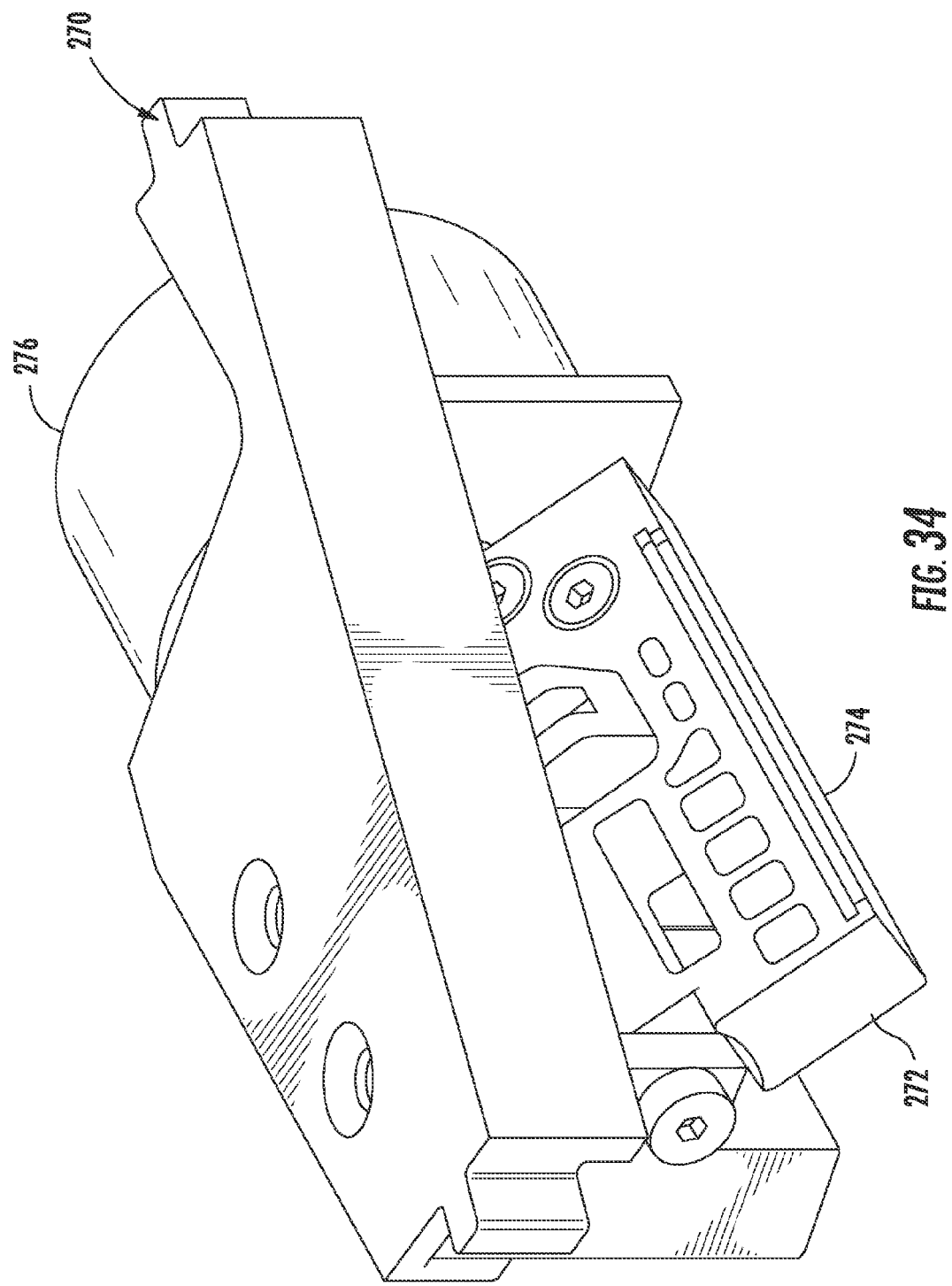
FIG. 34 is a perspective view of a mechanical diverter from the diverter assembly illustrated in FIG. 30.
Figure 35:
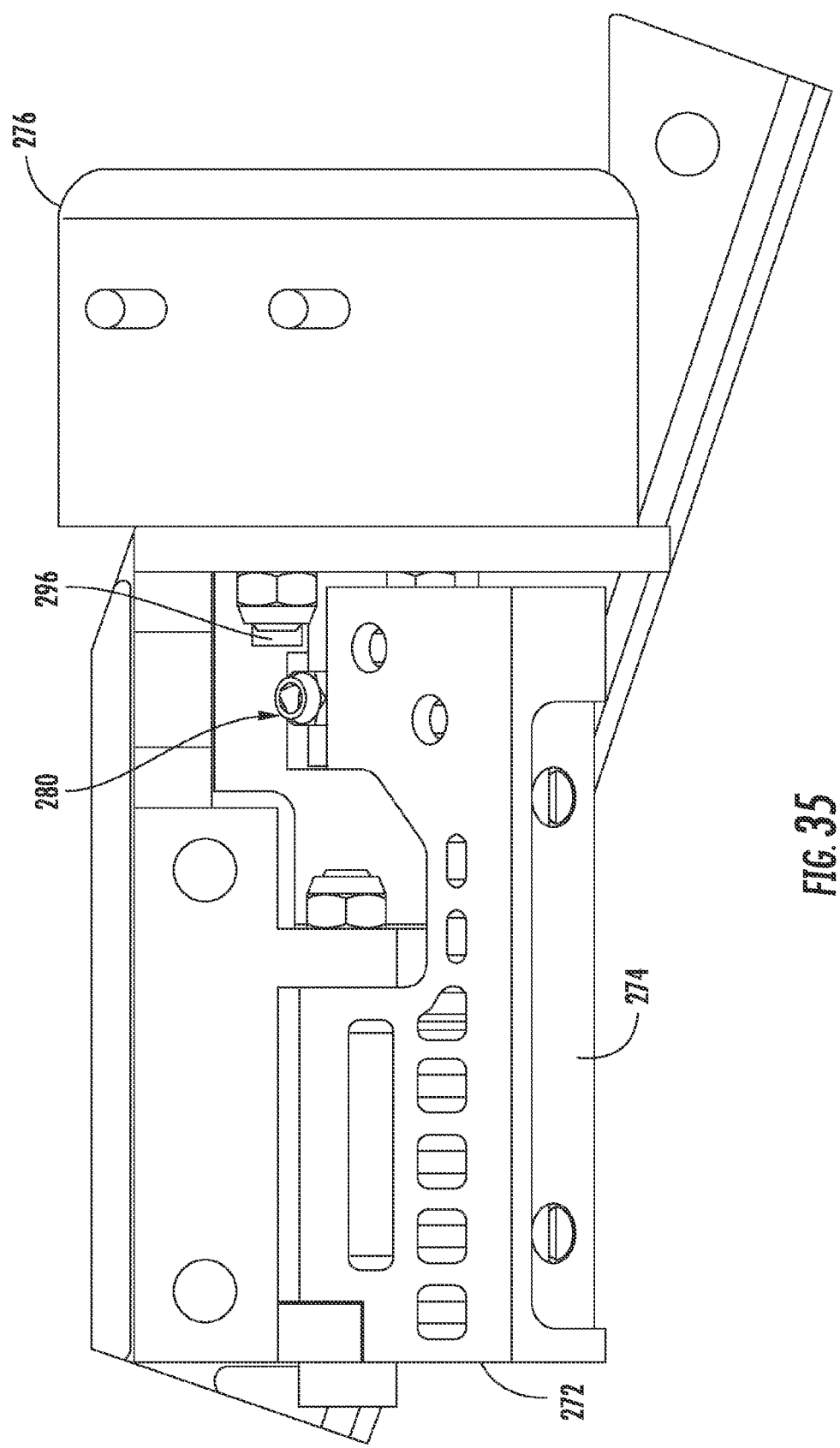
FIG. 35 is a bottom plan view of the diverter in FIG. 34 in a non-diverting state.
Figure 36:
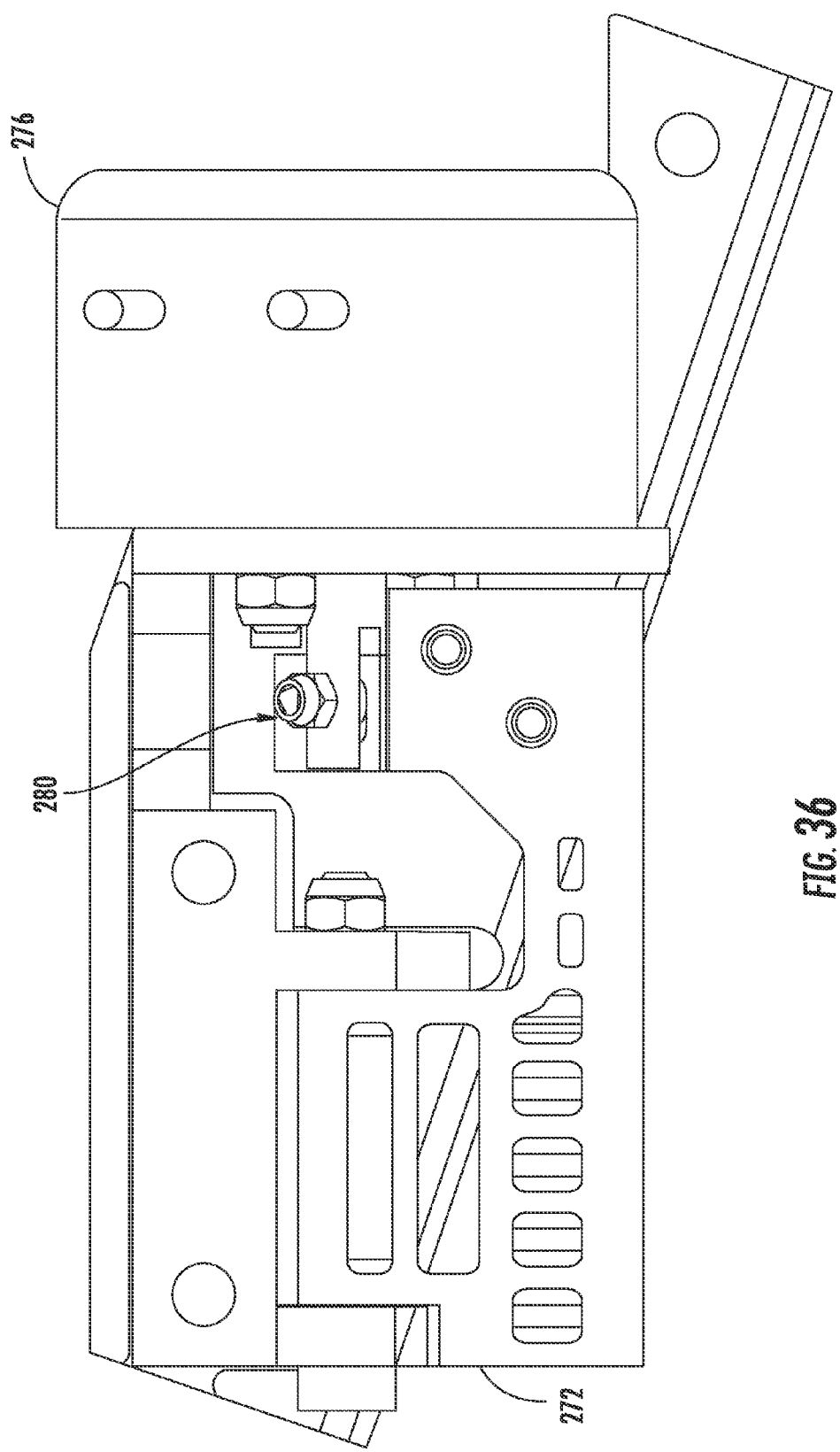
FIG. 36 is the same view as FIG. 35 in a diverting state.

Mechanical diverter 270 includes a gate 272 that is rotatable between a non-diverting orientation illustrated in FIGS. 30 and 32 and a diverting orientation illustrated in FIGS. 31 and 33. Gate 272 defines a diverting surface 274 that diverts diverting members 39 when in the diverting orientation. Diverter 270 may further include a slip joint 280 similar in configuration to slip joint 80. Gate 272 is configured to position diverting surface 274 to engage pin 54 of diverting member 39 when in the diverting orientation.

Figure 37:
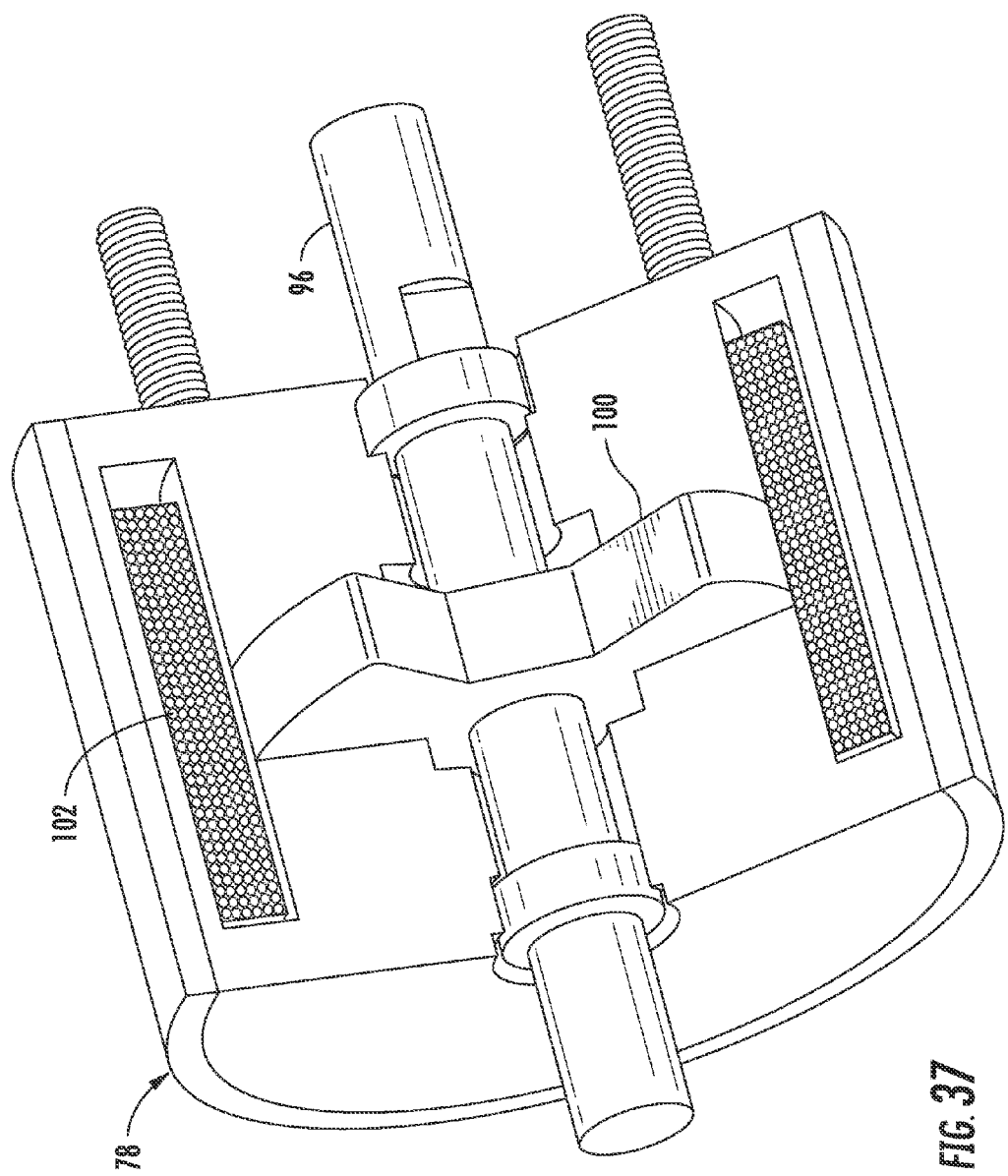
FIG. 37 is a cutaway perspective view of a brushless torque actuator useful with the embodiments of the invention.
Figure 38A:
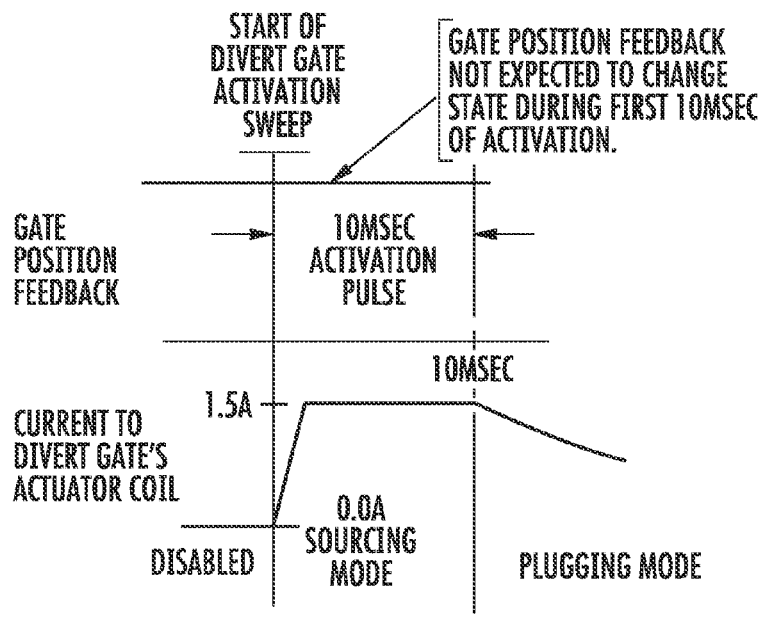
FIG. 38A is a signal diagram to illustrate the state of an activation control signal and return control signal corresponding to the flowchart on drawing FIG. 18C.
Figure 38B:
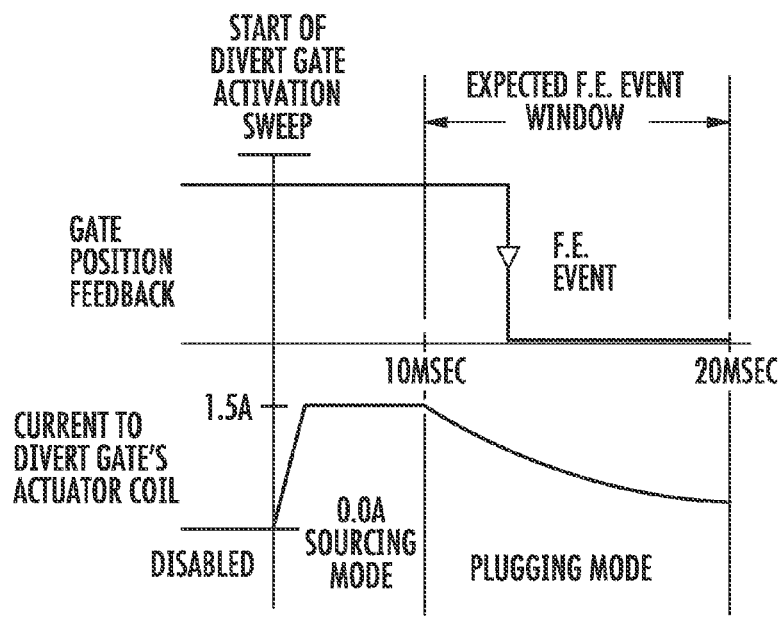
FIG. 38B is a signal diagram to illustrate the state of an activation control signal, and return control signal corresponding to the flowchart on drawing FIG. 18D.
Figure 38C:
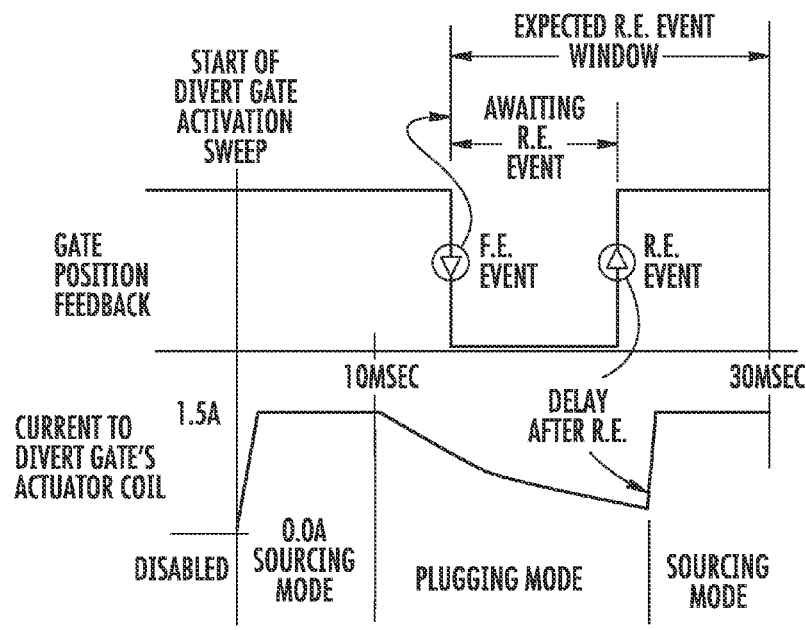
FIG. 38C is a signal diagram to illustrate the state of an activation control signal and return control signal corresponding to the flowchart on drawing FIG. 18E.
Figure 38D:
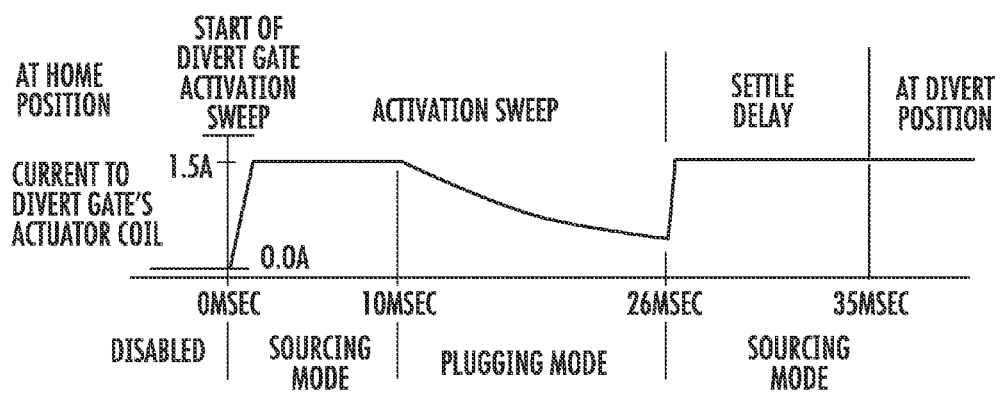
FIG. 38D is a signal diagram to illustrate the state of an activation control signal and return control signal corresponding to the flowchart on drawing FIG. 18G.
Figure 38E:
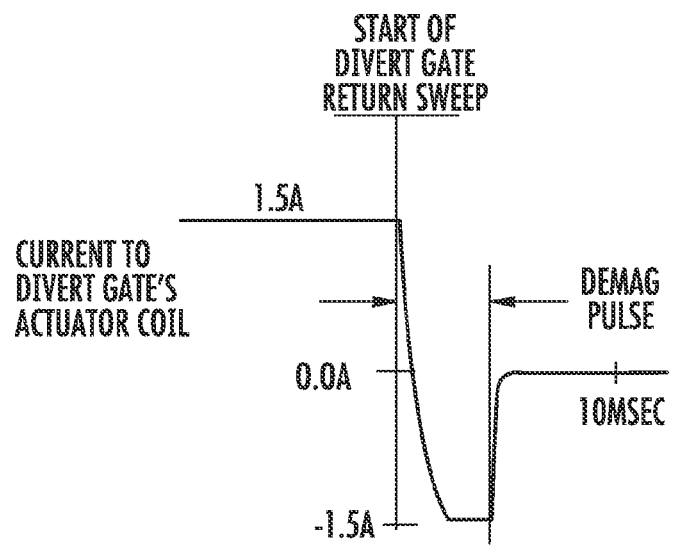
FIG. 38E is a signal diagram to illustrate the state of an activation control signal and return control signal corresponding to the flowchart on drawing FIG. 18I.
Figure 38F:
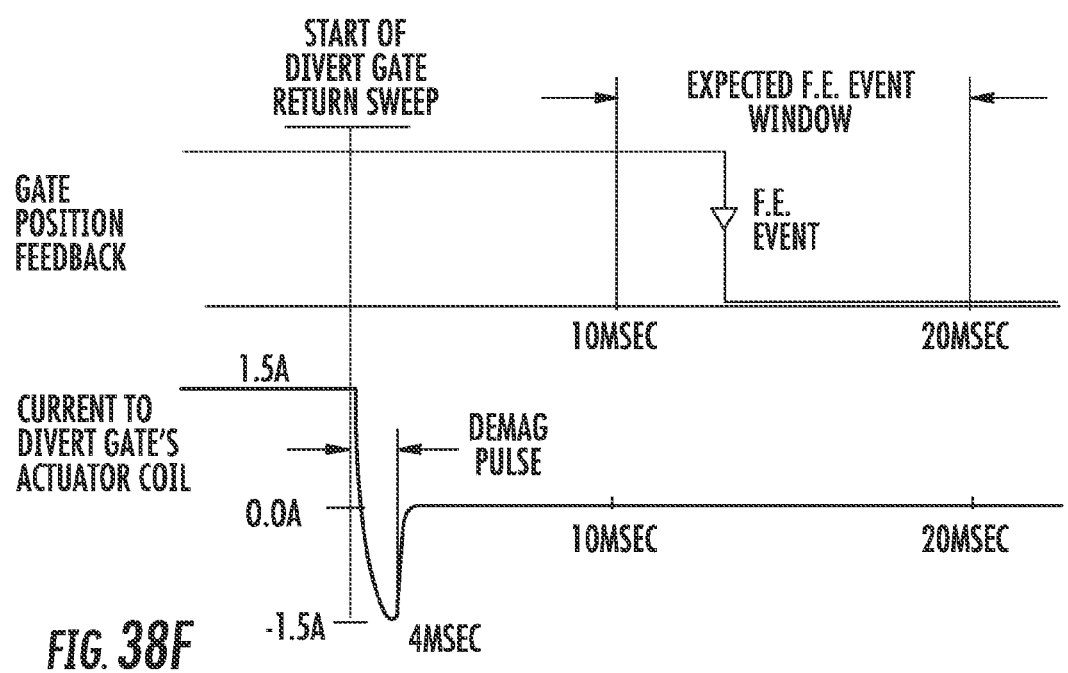
FIG. 38F is a signal diagram to illustrate the state of an activation control signal and return control signal corresponding to the flowchart on drawing FIG. 18J.
Figure 38G:
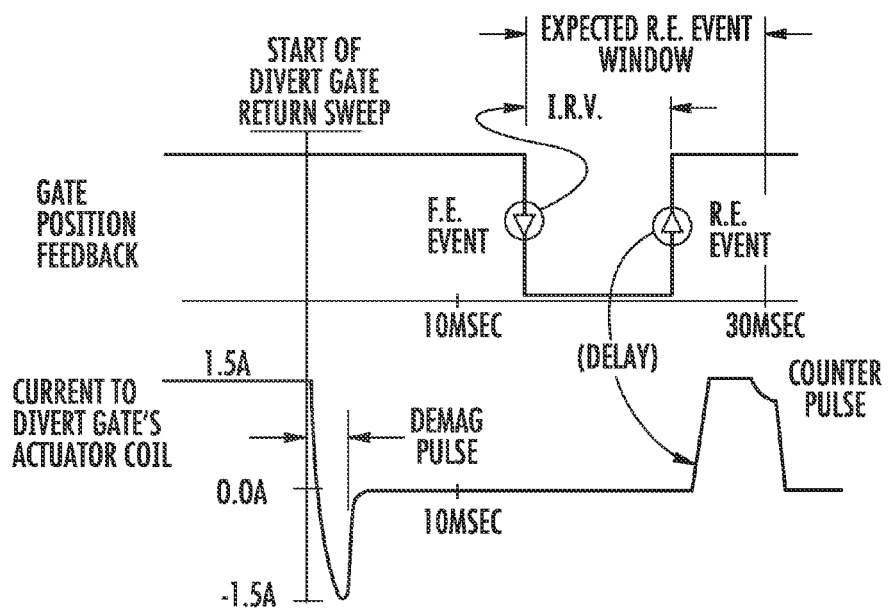
FIG. 38G is a signal diagram to illustrate the state of an activation control signal and return control signal corresponding to the flowchart on drawing FIG. 18K.
Figure 38H:
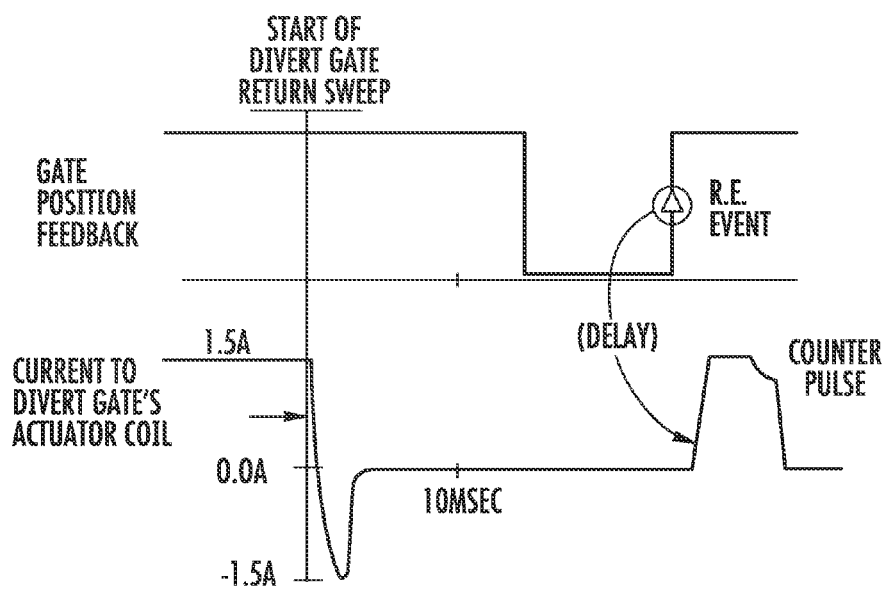
FIG. 38H is a signal diagram to illustrate the state of an activation control signal and return control signal corresponding to the flowchart on drawing FIG. 18L.
Figure 38I:
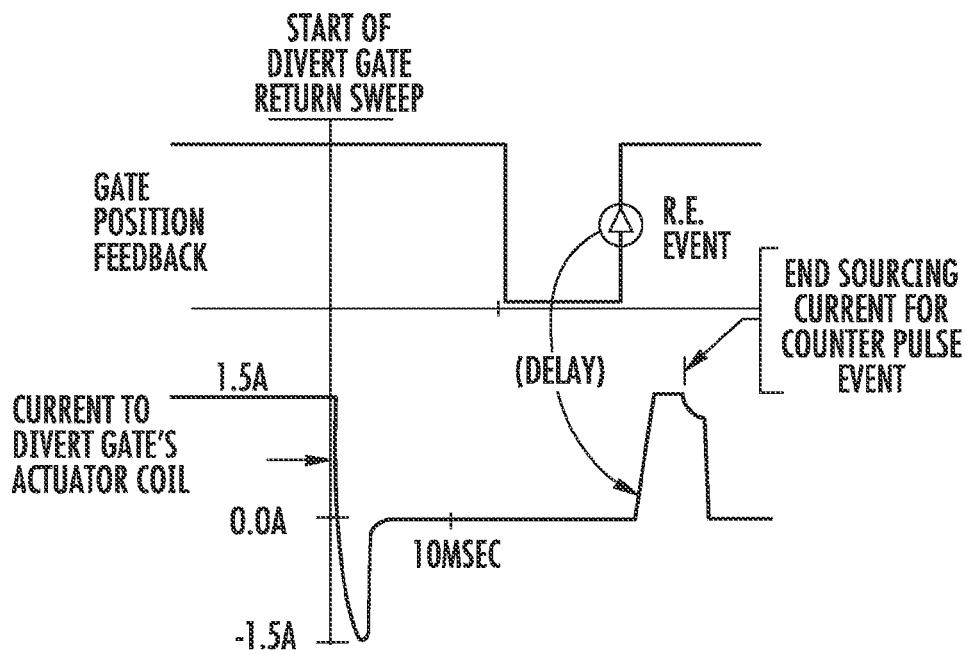
FIG. 38I is a signal diagram to illustrate the state of an activation control signal and return control signal corresponding to the flowchart on drawing FIG. 18M.
Figure 38J:
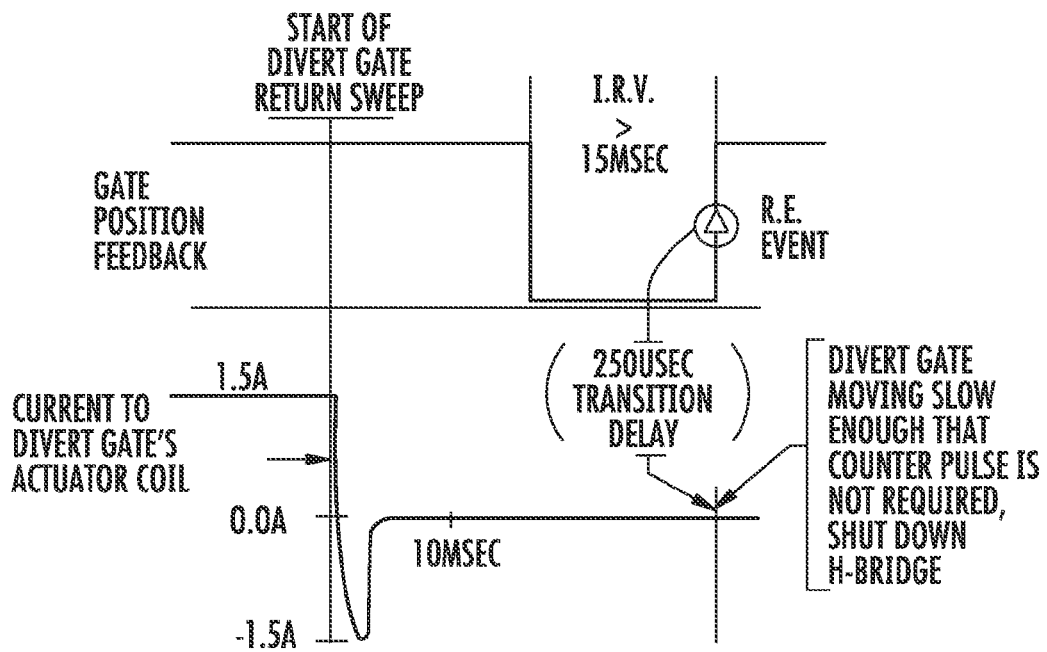
FIG. 38J is a signal diagram to illustrate the state of an activation control signal and return control signal corresponding to the flowchart on drawing FIG. 18N.
Figure 38K:
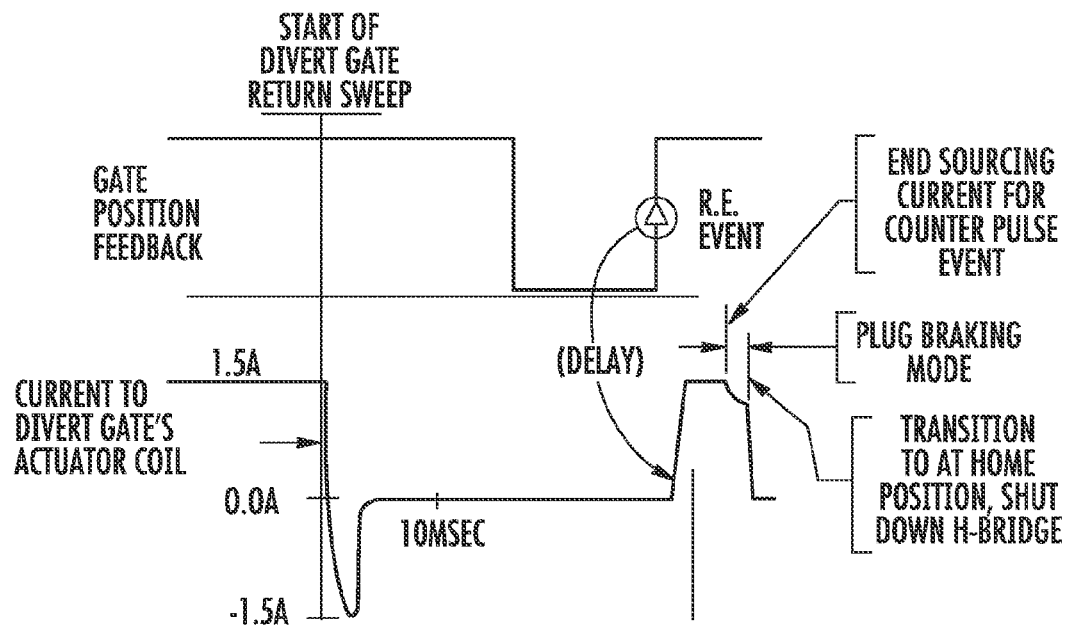
FIG. 38K is a signal diagram to illustrate the state of an activation control signal and return control signal corresponding to the flowchart on drawing FIG. 18P.
Figure 38L:
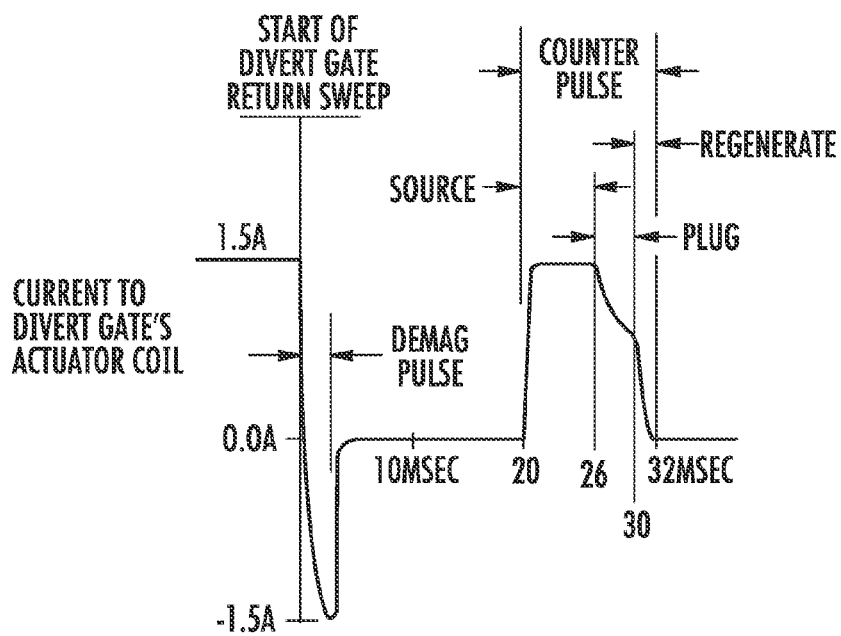
FIGS. 38L and 38M are signal diagrams to illustrate the state of an activation control signal and return control signal corresponding to the flowchart on drawing FIG. 18Q.
Figure 38M:
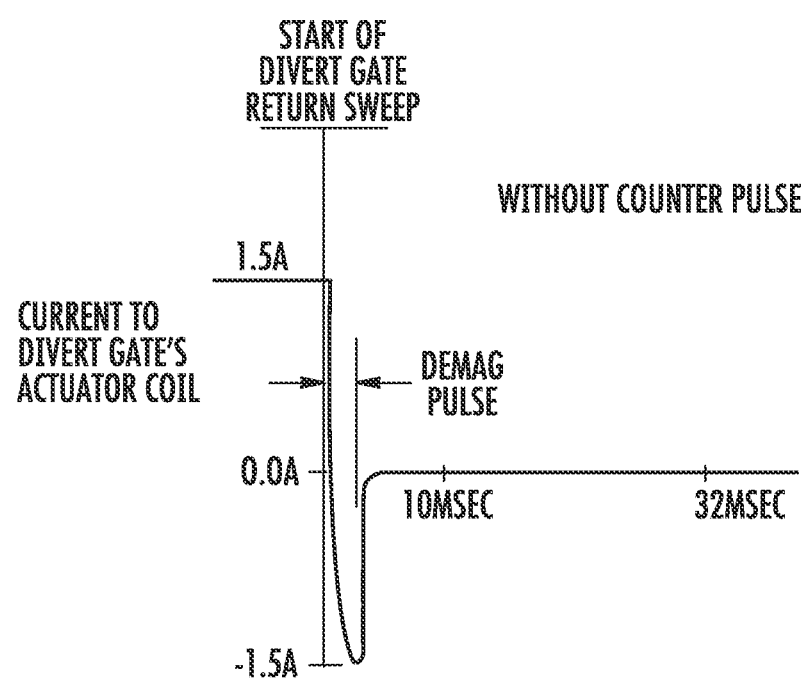

As may be seen in FIG. 37, brushless torque actuator 78 includes a rotor 100 that is rotated by electrical energy applied to a winding 102 and includes an internal biasing device 332 (not shown in FIG. 37).

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A positive displacement sorter, comprising:
    a plurality of interconnected parallel slats defining an endless web that travels in a longitudinal direction, an upper surface of said web defining an article-conveying surface;
    a plurality of pusher shoes, each of said shoes travelling along at least one of said slats in order to laterally divert articles on said conveying surface, each of said shoes having a diverting member extending below said conveying surface wherein said diverting member comprises a rotary bearing;
    a plurality of diverting rails below said conveying surface, each of said diverting rails capable of engaging said diverting member to cause the associated shoe to travel laterally to divert an article;
    a plurality of diverters, each for selectively diverting at least one of said diverting members from a non-diverting path extending longitudinally along said sorter to one of said diverting rails in a diverting state;
    at least one of said diverters comprising a gate having a diverting surface, said gate selectively rotatable between the diverting state and a non-diverting state about a generally horizontal axis, wherein said gate positions said diverting surface to engage said bearing in the diverting state; and
    an actuator moving said gate between the non-diverting state and the diverting state, said actuator comprising an electrically operated rotary actuator that is rotatable about another generally horizontal axis of rotation.

2. The positive displacement sorter as claimed in claim 1 wherein said rotary actuator comprises one chosen from a rotary solenoid and a brushless torque actuator.

3. The positive displacement sorter as claimed in claim 1 wherein said generally horizontal axis is generally concentric with said another horizontal axis of rotation.

4. The positive displacement sorter as claimed in claim 3 including a slip joint between said rotary actuator and said gate, said slip joint resisting diverting motion being transferred from said gate to said rotary actuator.

5. The positive displacement sorter as claimed in claim 1 comprising a sensor, said sensor monitoring operation of said diverter.

6. The positive displacement sorter as claimed in claim 5 wherein said sensor senses at least one chosen from the diverting state of said gate and the non-diverting state of said gate.

7. The positive displacement sorter as claimed in claim 6 including an electronic divert control applying an activation control signal to said actuator to operate said gate between one of the states and the other of the states, wherein said control monitors said sensor and adjusts the activation control signal applied to said actuator as a function of the movement of said gate.

8. The positive displacement sorter as claimed in claim 7 wherein said control adjusts the activation control signal applied to said actuator to provide critical damping of movement of said gate between the one of the states and the other of the states.

9. The positive displacement sorter as claimed in claim 7 wherein said gate includes a mechanical bias tending to return said gate to the one of the states and wherein said control provides a return control signal when said gate is moving to the one of the states, the return control signal counteracting said bias.

10. The positive displacement sorter as claimed in claim 9 wherein said control adjusts the return control signal as a function of movement of said gate.

11. The positive displacement sorter as claimed in claim 10 wherein said control adjusts the return control signal in order to provide critical damping of movement of said gate between the other of the states and the one of the states.

12. The positive displacement sorter as claimed in claim 1 wherein said gate includes a flexible member defining said diverting surface, said flexible member adapted to absorb impact from contact between said diverting member and said diverting surface.

13. The positive displacement sorter as claimed in claim 1 wherein said diverting member comprises a pin extending below said bearing.

14. The positive displacement sorter as claimed in claim 1 wherein said diverting surface comprises a curved surface.

15. The positive displacement sorter as claimed in claim 1 wherein said generally horizontal axis is oriented at least partially in the longitudinal direction.

16. The positive displacement sorter as claimed in claim 1 wherein said generally horizontal axis is oriented at least partially in the lateral direction.

17. The positive displacement sorter as claimed in claim 1 including a slip joint between said gate and said actuator to reduce force imparted to said diverting surface from being transferred to said actuator.

18. A sorter diverter that is adapted to selectively divert at least one of a plurality of pusher shoes, each of said shoes travelling along at least one of a plurality of slats in order to laterally divert articles on a conveying surface defined by said slats, each of said shoes having a diverting member extending below said conveying surface wherein said diverting member comprises a rotary bearing, said diverter comprising:
a gate having a diverting surface, said gate selectively rotatable between a diverting state and a non-diverting state about a generally horizontal axis, wherein said gate positions said diverting surface to engage said bearing in the diverting state; and
an actuator moving said gate between the non-diverting state and the diverting state, said actuator comprising an electrically operated rotary actuator that is rotatable about another generally horizontal axis of rotation.

19. A positive displacement sorter, comprising:
a plurality of interconnected parallel slats defining an endless web that travels in a longitudinal direction, an upper surface of said web defining an article-conveying surface;
a plurality of pusher shoes, each of said shoes travelling along at least one of said slats in order to laterally divert articles on said conveying surface, each of said shoes having a diverting member extending below said conveying surface;
a plurality of diverting rails below said conveying surface, each of said diverting rails capable of engaging said diverting member to cause the associated shoe to travel laterally to divert an article;
a plurality of diverter assemblies, each for selectively diverting at least one of said diverting members from a non-diverting path extending longitudinally along said sorter to one of said diverting rails;
at least one of said diverter assemblies comprising first and second redundant diverters, each of said redundant diverters capable of selectively diverting at least one of said diverting members from said non-diverting path to one of said diverting rails wherein said first redundant diverter comprises a magnetic diverter that utilizes magnetic force to attract at least one of said diverting members from said non-diverting path to one of said diverting rails, wherein said second redundant diverter comprises a mechanical diverter that utilizes mechanical force to at least partially divert at least one of said diverting members from said non-diverting path to one of said diverting rails, wherein said second redundant diverter diverts at least one of said diverting members if said first redundant member fails to divert that at least one of said diverting members.

20. A positive displacement sorter, comprising:
a plurality of interconnected parallel slats defining an endless web that travels in a longitudinal direction, an upper surface of said web defining an article-conveying surface;
a plurality of pusher shoes, each of said shoes travelling along at least one of said slats in order to laterally divert articles on said conveying surface, each of said shoes having a diverting member extending below said conveying surface;
a plurality of diverting rails below said conveying surface, each of said diverting rails capable of engaging said diverting member to cause the associated shoe to travel laterally to divert an article;
a plurality of diverters, each for selectively diverting at least one of said diverting members from a non-diverting path extending longitudinally along said sorter to one of said diverting rails in a diverting state;
at least one of said diverters comprising a gate having a diverting surface, said gate selectively moveable between the diverting state and a non-diverting state;
an actuator moving said gate between the non-diverting state and the diverting state; and
an electronic divert control applying an activation control signal to said actuator to move said gate between one of the states and the other of the states to divert at least one of said pusher shoes wherein said control monitors movement of said gate during an occurrence of the activation control signal and adjusts that particular occurrence of the activation control signal as a function of the movement of said gate.

21. The positive displacement sorter as claimed in claim 20 wherein said control adjusts the activation control signal to provide critical damping of movement of said gate between said one of the states and the other of the states.

22. The positive displacement sorter as claimed in claim 20 wherein said control adjusts the activation control signal in order to apply a minimal duration of actuation current that is capable of causing said gate to change states.

23. The positive displacement sorter as claimed in claim 20 wherein said activation control signal includes an actuation signal applied to the actuator and wherein said control discontinues the actuation signal before said gate reaches the other of the states and commences a gate hold signal approximately when the gate reaches the other of the states.

24. The positive displacement sorter as claimed in claim 23 wherein said control adjusts either the actuation signal or the gate hold signal as function of the comparison of time it takes said gate to change from the one of the states to the other of the states.

25. The positive displacement sorter as claimed in claim 24 wherein said control compares recent time that it takes said gate to move between the one of the states and the other of the states to a historic time that it takes said gate to move between the one of the states and the other of the states and indicates an error condition if the recent time is substantially different than the historic time.

26. The positive displacement sorter as claimed in claim 20 wherein said gate includes a mechanical bias tending to return said gate to the one of the states and wherein said control provides a return control signal when said gate is moving to the one of the states, said return control signal at least partially counteracting said bias.

27. The positive displacement sorter as claimed in claim 26 wherein said control adjusts the return control signal as a function of movement of said gate.

28. The positive displacement sorter as claimed in claim 27 wherein said control adjusts the return control signal in order to provide critical damping of movement of said gate between the other of the states and the one of the states.

29. The positive displacement sorter as claimed in claim 27 wherein said control adjusts the return control signal in order to apply a minimal duration of a de-actuation current that is capable of causing said gate to substantially avoid mechanical shock when said gate returns to the one of the states.

30. The positive displacement sorter as claimed in claim 26 wherein said control adjusts the return control signal as a function of comparison of time it takes said gate to change from the other of the states to the one of the states.

31. A sorter diverter, comprising:
a gate having a diverting surface, said gate selectively moveable between a diverting state and a non-diverting state;
an actuator moving said gate between the non-diverting state and the diverting state; and
an electronic divert control applying an activation control signal to said actuator to move said gate between one of the states and the other of the states to divert at least one of said pusher shoes, wherein said control monitors movement of said gate during an occurrence of the activation control signal and adjusts that particular occurrence of the activation control signal as a function of the movement of said gate.

32. A positive displacement sorter, comprising:
a plurality of interconnected parallel slats defining an endless web that travels in a longitudinal direction, an upper surface of said web defining an article-conveying surface;
a plurality of pusher shoes, each of said shoes travelling along at least one of said slats in order to laterally divert articles on said conveying surface, each of said shoes having a diverting member extending below said conveying surface;
a plurality of diverting rails below said conveying surface, each of said diverting rails capable of engaging said diverting member to cause the associated shoe to travel laterally to divert an article;
a plurality of diverters, each for selectively diverting at least one of said diverting members from a non-diverting path extending longitudinally along said sorter to one of said diverting rails in a diverting state;
at least one of said diverters comprising a gate having a diverting surface, said gate selectively moveable between the diverting state and a non-diverting state;
an actuator moving said gate between said non-diverting state and the diverting state; and
an electronic divert control controlling said actuator to operate said gate between one of the states and the other of the states, wherein said gate includes a mechanical bias tending to return said gate to the one of the states and wherein said control provides a return control signal when said gate is moving to the one of the states, the return control signal at least partially counteracting said bias.

33. The positive displacement sorter as claimed in claim 32 wherein said control adjusts the return control signal as a function of movement of said gate.

34. The positive displacement sorter as claimed in claim 33 wherein said control adjusts the return control signal in order to provide critical damping of movement of said gate between the other of the states and the one of the states.

35. The positive displacement sorter as claimed in claim 33 wherein said control adjusts the return control signal in order to apply a minimal duration of a de-actuation current that is capable of causing said gate to substantially avoid mechanical shock when said gate returns to the one of the states.

36. The positive displacement sorter as claimed in claim 33 wherein said control adjusts the return control signal as a function of comparison of time it takes said gate to change from the other of the states to the one of the states.

37. A sorter diverter, comprising:
a gate having a diverting surface, said gate selectively moveable between a diverting state and a non-diverting state;
an actuator moving said gate between the non-diverting state and the diverting state; and
an electronic divert control controlling said actuator to move said gate between one of the states and the other of the states, wherein said gate includes a mechanical bias tending to return said gate to the one of the states and wherein said control provides a return control signal when said gate is moving to the one of the states, the return control signal at least partially counteracting said bias.

38. A method of diverting articles with a positive displacement sorter having a plurality of interconnected parallel slats defining an endless web that travels in a longitudinal direction, an upper surface of said web defining an article-conveying surface and a plurality of pusher shoes, each of said shoes travelling along at least one of said slats in order to laterally divert articles on said conveying surface, each of said shoes having a diverting member extending below said conveying surface, wherein said diverting member comprises a rotary bearing;
said sorter further having a plurality of diverting rails below said conveying surface, each of said diverting rails capable of engaging said diverting member to cause the associated shoe to travel laterally to divert an article and a plurality of diverters, each for selectively diverting at least one of said diverting members from a non-diverting path extending longitudinally along said sorter to one of said diverting rails in a diverting state, wherein said method comprises:
at least one of said diverters having a gate, said gate having a diverting surface, said gate selectively rotatable between the diverting state and a non-diverting state about a generally horizontal axis, wherein said gate positions said diverting surface to engage said bearing in the diverting state; and
selectively moving said gate between the diverting state and the non-diverting state by electrically actuating a rotary actuator that is rotatable about another generally horizontal axis of rotation.

39. A method of diverting articles with a positive displacement sorter having a plurality of interconnected parallel slats defining an endless web that travels in a longitudinal direction, an upper surface of said web defining an article-conveying surface and a plurality of pusher shoes, each of said shoes travelling along at least one of said slats in order to laterally divert articles on said conveying surface, each of said shoes having a diverting member extending below said conveying surface, said sorter further including a plurality of diverting rails below said conveying surface, each of said diverting rails capable of engaging said diverting member to cause the associated shoe to travel laterally to divert an article and a plurality of diverter assemblies, each for selectively diverting at least one of said diverting members from a non-diverting path extending longitudinally along said sorter to one of said diverting rails, wherein said method comprises:

provldlng first and second redundant diverters, each of said diverters capable of selectively diverting at least one of said diverting members from said non-diverting path to one of said diverting rails; and generally simultaneously diverting said at least one of said diverting members with both said first and second redundant diverters, wherein said first redundant diverter comprises a magnetic diverter that utilizes magnetic force to attract at least one of said diverting members from said non-diverting path to one of said diverting rails, wherein said second redundant diverter comprises a mechanical diverter that utilizes mechanical force to at least partially divert at least one of said diverting members from said non-diverting path to one of said diverting rails, including diverting with said second redundant diverter at least one of said diverting members if said first redundant diverter fails to divert that at least one of said diverting members.

40. A method of diverting articles with a positive displacement sorter having a plurality of interconnected parallel slats defining an endless web that travels in a longitudinal direction, an upper surface of said web defining an article-conveying surface and a plurality of pusher shoes, each of said shoes travelling along at least one of said slats in order to laterally divert articles on said conveying surface, each of said shoes having a diverting member extending below said conveying surface, said sorter further having a plurality of diverting rails below said conveying surface, each of said diverting rails capable of engaging said diverting member to cause the associated shoe to travel laterally to divert an article and a plurality of diverters, each for selectively diverting at least one of said diverting members from a non-diverting path extending longitudinally along said sorter to one of said diverting rails in a diverting state, wherein said method comprises:

at least one of said diverters having a gate and an actuator for said gate, said gate having a diverting surface, said gate selectively moveable between the diverting state and a non-diverting state; and applying an activation control signal to said actuator to move said gate between one of the states and the other of the states to divert at least one of said pusher shoes, including monitoring movement of said gate during an occurrence of the activation control signal and adjusting that particular occurrence of the activation control signal as a function of the movement of said gate.

41. A method of diverting articles with a positive displacement sorter having a plurality of interconnected parallel slats defining an endless web that travels in a longitudinal direction, an upper surface of said web defining an article-conveying surface and a plurality of pusher shoes, each of said shoes travelling along at least one of said slats in order to laterally divert articles on said conveying surface, each of said shoes having a diverting member extending below said conveying surface, said sorter further having a plurality of diverting rails below said conveying surface, each of said diverting rails capable of engaging said diverting member to cause the associated shoe to travel laterally to divert an article and a plurality of diverters, each for selectively diverting at least one of said diverting members from a non-diverting path extending longitudinally along said sorter to one of said diverting rails in a diverting state, wherein said method comprises:

providing a gate having a diverting surface, said gate selectively moveable between a diverting state and a non-diverting state;

providing an actuator and applying an activation control signal to said actuator to move said gate between the one of the states and the other of the states and providing a mechanical bias tending to return said gate to the one of the states from the other of the states; and providing a return control signal when said gate is moving to the one of the states from the other of the states, said return control signal at least partially counteracting said bias.

* * * * *